US012620064B2

(12) United States Patent
Su et al.

(10) Patent No.: US 12,620,064 B2
(45) Date of Patent: May 5, 2026

(54) IMAGE OPTIMIZATION IN MOBILE CAPTURE AND EDITING APPLICATIONS

(71) Applicant: DOLBY LABORATORIES LICENSING CORPORATION, San Francisco, CA (US)

(72) Inventors: Guan-Ming Su, Fremont, CA (US); Harshad Kadu, Santa Clara, CA (US); Tsung-Wei Huang, Sunnyvale, CA (US); Jon Scott Mcelvain, Manhattan Beach, CA (US); Tao Chen, Palo Alto, CA (US); Samir N. Hulyalkar, Los Gatos, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 18/847,969

(22) PCT Filed: Mar. 17, 2023

(86) PCT No.: PCT/US2023/015494
§ 371 (c)(1),
(2) Date: Sep. 17, 2024

(87) PCT Pub. No.: WO2023/177863
PCT Pub. Date: Sep. 21, 2023

(65) Prior Publication Data
US 2025/0363595 A1      Nov. 27, 2025

Related U.S. Application Data

(60) Provisional application No. 63/321,390, filed on Mar. 18, 2022.

(30) Foreign Application Priority Data

Mar. 18, 2022      (EP) ..................................... 22162983

(51) Int. Cl.
*G06T 5/50*          (2006.01)
*G06T 3/067*          (2024.01)
(Continued)

(52) U.S. Cl.
CPC ................ *G06T 5/50* (2013.01); *G06T 3/067* (2024.01); *G06T 7/90* (2017.01); *G06V 10/56* (2022.01);
(Continued)

(58) Field of Classification Search
CPC .. G06T 5/50; G06T 3/067; G06T 7/90; G06T 2207/10024; G06T 2207/20208; G06V 10/56
See application file for complete search history.

(56) References Cited

U.S. PATENT DOCUMENTS 8,811,490  B2      8/2014  Su
9,961,237  B2      5/2018  Atkins
(Continued)

FOREIGN PATENT DOCUMENTS

CN          105684412  A      6/2016
JP          2016536873  A      11/2016
(Continued)

OTHER PUBLICATIONS

"Dynamic Metadata for Color Volume Transform—Core Components", SMPTE ST 2094-1:2016. 15 pages.
(Continued)

*Primary Examiner* — Ibrahim A Khan

(57)          ABSTRACT

HDR color patches are sampled throughout an HDR color space parameterized by a parameter. Reference SDR color patches, input HDR color patches and reference HDR color patches are generated from the sampled HDR color patches. An optimization algorithm is executed to generate an optimized forward reshaping mapping and an optimized back-
(Continued)

402 — BUILD SAMPLED HDR COLOR SPACE POINTS

404 — GENERATE INPUT TO A CHAINED RESHAPING OPTIMIZATION ALGORITHM

406 — EXECUTE THE ALGORITHM TO GENERATE OPTIMIZED FORWARD AND BACKWARD RESHAPING MAPPINGS ward reshaping mapping. The optimized forward reshaping mapping is used to forward reshape input HDR images into forward reshaped SDR images, whereas the optimized backward reshaping mapping is used to backward reshape the forward reshaped SDR images into backward reshaped HDR images.

13 Claims, 27 Drawing Sheets

(51) Int. Cl.
*G06T 7/90* (2017.01)
*G06V 10/56* (2022.01)
*H04N 19/98* (2014.01)

(52) U.S. Cl.
CPC .............. *G06T 2207/10024* (2013.01); *G06T 2207/20208* (2013.01)

(56) References Cited

U.S. PATENT DOCUMENTS

| | | | | |
|---|---|---|---|---|
| 11,277,627 | B2 | 3/2022 | Song | |
| 11,587,491 | B1 * | 2/2023 | DeFilippis | H04N 9/3158 |
| 11,962,760 | B2 | 4/2024 | Su | |
| 2013/0314495 | A1 * | 11/2013 | Chen | H04N 19/597 |
| | | | | 348/43 |
| 2014/0037205 | A1 * | 2/2014 | Su | H04N 1/6027 |
| | | | | 382/238 |
| 2015/0117551 | A1 * | 4/2015 | Su | H04N 19/34 |
| | | | | 375/240.27 |
| 2016/0134872 | A1 * | 5/2016 | Su | H04N 19/192 |
| | | | | 375/240.03 |
| 2016/0253792 | A1 | 9/2016 | Xu | |
| 2017/0085889 | A1 * | 3/2017 | Baylon | G06T 5/90 |
| 2017/0094279 | A1 * | 3/2017 | Piramanayagam | G09G 5/10 |
| 2017/0111643 | A1 * | 4/2017 | Bugdayci Sansli | H04N 19/184 |
| 2017/0140513 | A1 * | 5/2017 | Su | H04N 25/60 |
| 2018/0007356 | A1 * | 1/2018 | Kadu | H04N 19/182 |
| 2018/0098094 | A1 * | 4/2018 | Wen | H04N 19/136 |
| 2018/0124399 | A1 * | 5/2018 | Su | H04N 19/30 |
| 2018/0124400 | A1 * | 5/2018 | He | H04N 19/117 |
| 2018/0242006 | A1 * | 8/2018 | Kerofsky | H04N 19/85 |
| 2019/0110054 | A1 * | 4/2019 | Su | H04N 19/154 |
| 2019/0208173 | A1 * | 7/2019 | Kadu | G06T 5/94 |
| 2019/0281267 | A1 * | 9/2019 | Fuchie | H04N 19/109 |
| 2019/0364288 | A1 * | 11/2019 | Ström | G09G 5/026 |
| 2020/0351524 | A1 * | 11/2020 | Lee | H04N 19/182 |
| 2020/0389648 | A1 * | 12/2020 | Shingala | H04N 19/176 |
| 2020/0413099 | A1 * | 12/2020 | Su | H04N 19/132 |
| 2021/0195221 | A1 * | 6/2021 | Song | H04N 19/154 |
| 2022/0046245 | A1 * | 2/2022 | Kadu | H04N 19/98 |
| 2022/0301124 | A1 | 9/2022 | Su | |
| 2022/0408081 | A1 * | 12/2022 | Su | H04N 19/463 |
| 2023/0007294 | A1 * | 1/2023 | Kadu | H04N 19/109 |
| 2023/0164366 | A1 | 5/2023 | Su | |
| 2023/0300381 | A1 | 9/2023 | Guan-Ming | |
| 2024/0267530 | A1 | 8/2024 | Su | |
| 2025/0166547 | A1 * | 5/2025 | Carbonara | G09G 5/10 |

FOREIGN PATENT DOCUMENTS

| | | |
|---|---|---|
| JP | 2018510574 A | 4/2018 |
| KR | 20170091744 A | 8/2017 |
| WO | 2017019818 A1 | 2/2017 |
| WO | 2017024042 A2 | 2/2017 |
| WO | 2017053432 A1 | 3/2017 |
| WO | 2019217751 A1 | 11/2019 |
| WO | 2021067204 A1 | 4/2021 |
| WO | 2021076822 A1 | 4/2021 |
| WO | 2021202933 A1 | 10/2021 |
| WO | 2021216767 A1 | 10/2021 |
| WO | 2023039112 A1 | 3/2023 |

OTHER PUBLICATIONS

"High Dynamic Range EOTF of Mastering Reference Displays", SMPTE ST, vol. 2084, p. 2014. 14 pages.
"High dynamic range television for production and international programme exchange", BT.2390-10, Nov. 2021. 41 pages.
"Image parameter values for high dynamic range television for use in production and international programme exchange", Rec. ITU-R BT.2100, Jun. 2017. 16 pages.
"Parameter values for the HDTV standards for production and international programme exchange" Recommendation ITU-R BT.709-6, Jun. 2015, 19 pages.
"Parameter values for ultra-high definition television systems for production and international programme exchange", ITU-R BT.2020-1, Jun. 2014, 8 pages.
"Reference electro-optical transfer function for flat panel displays used in HDTV studio production", ITU Rec. ITU-R BT.1886, Mar. 2011. 7 pages.
Kutschbach Pascal: "A Color Volume Mapping System for Perception—Accurate Reproduction of HDR Imagery in SDR Production Workflows", A SMPTE Motion Imaging Journal vol. 130, No. 7, Aug. 1, 2021 (Aug. 1, 2021), pp. 12-21. 10 pages.

\* cited by examiner

CURRENT TPB COVERED COLOR

CURRENT TPB COVERED COLOR

CURRENT TPB COVERED COLOR

CURRENT TPB COVERED COLOR

3% VALUE OF CHROMA WITH
DIFFERENT A COLOR SPACE

97% VALUE OF CHROMA WITH
DIFFERENT A COLOR SPACE

FIG. 2H
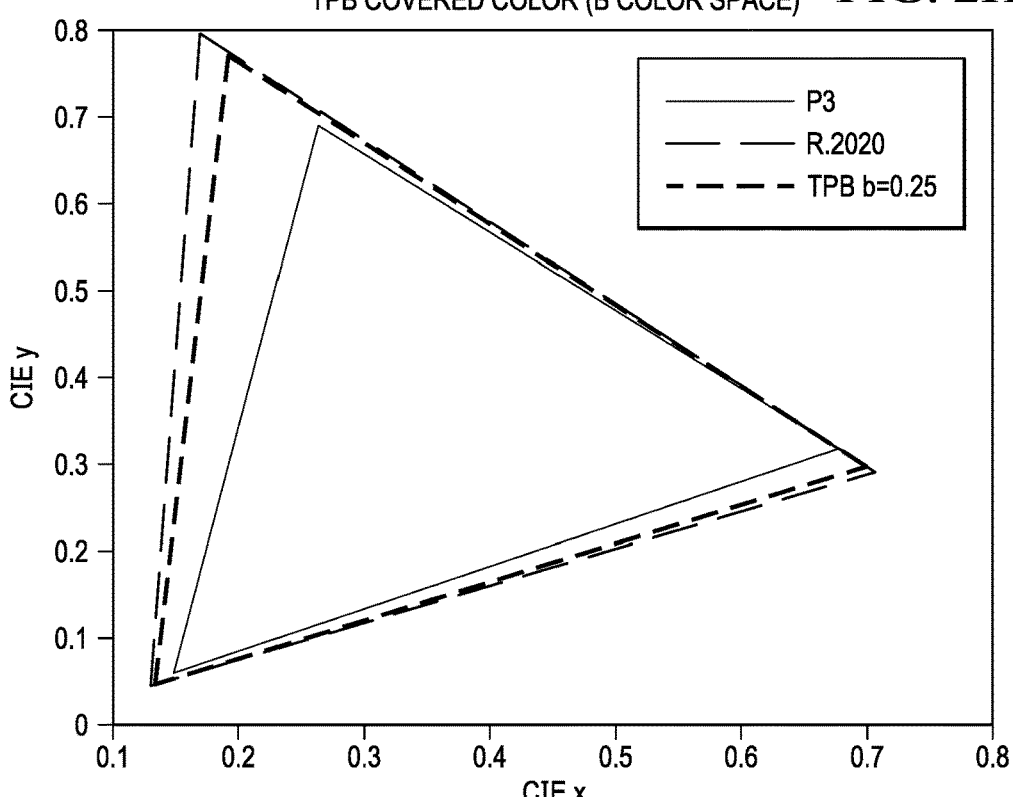
FIG. 2I
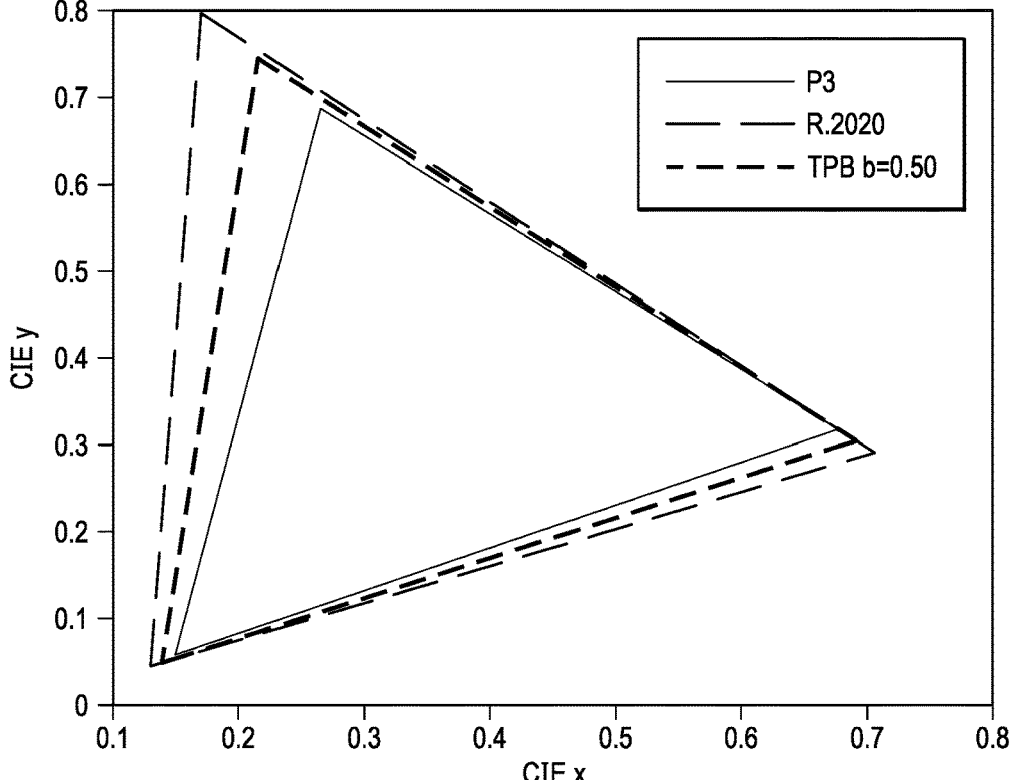

(a)
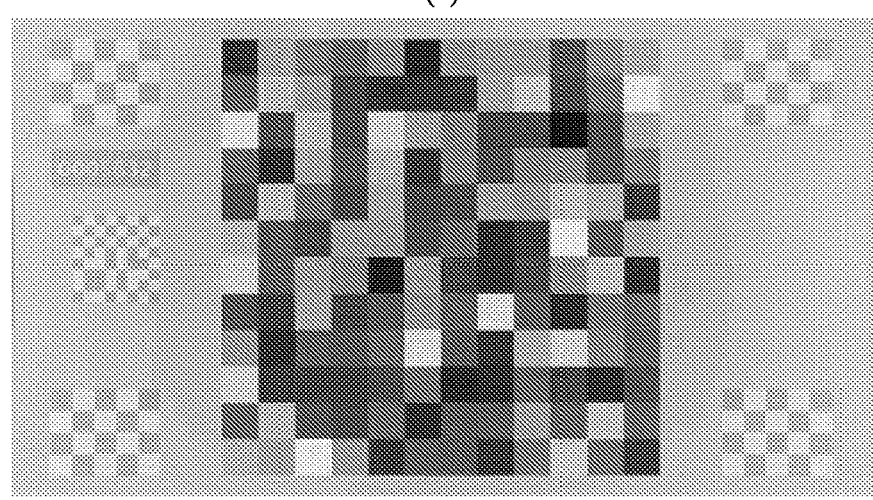
(b)
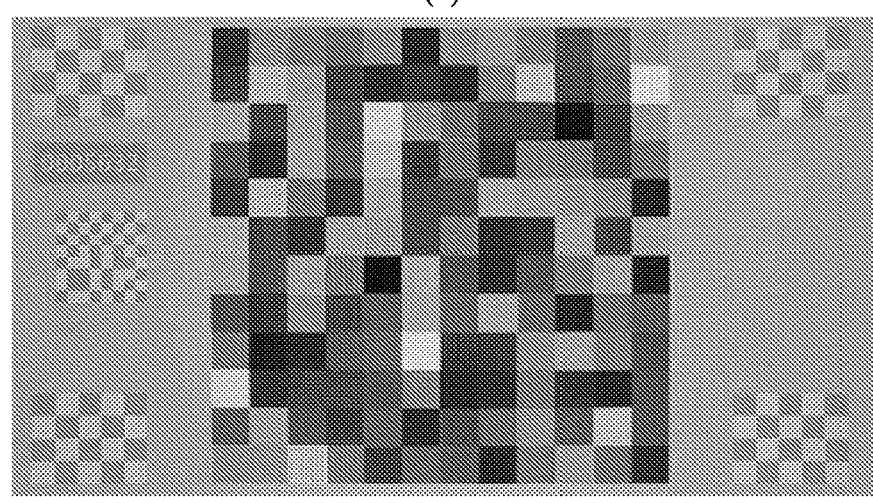
(c)
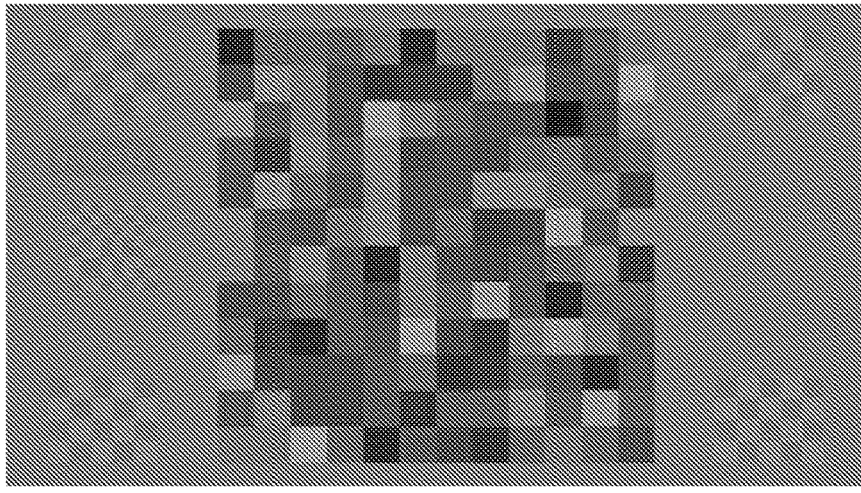
FIG. 2O

MAPPED RGB VALUE USING FORWARD TPB

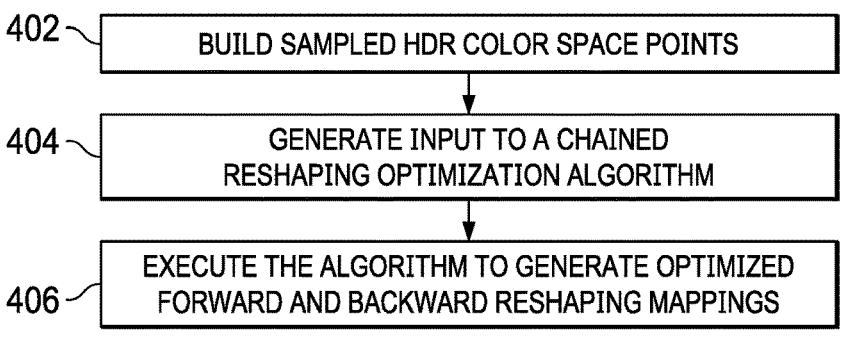

402 — BUILD SAMPLED HDR COLOR SPACE POINTS

404 — GENERATE INPUT TO A CHAINED RESHAPING OPTIMIZATION ALGORITHM

406 — EXECUTE THE ALGORITHM TO GENERATE OPTIMIZED FORWARD AND BACKWARD RESHAPING MAPPINGS

FIG. 4A

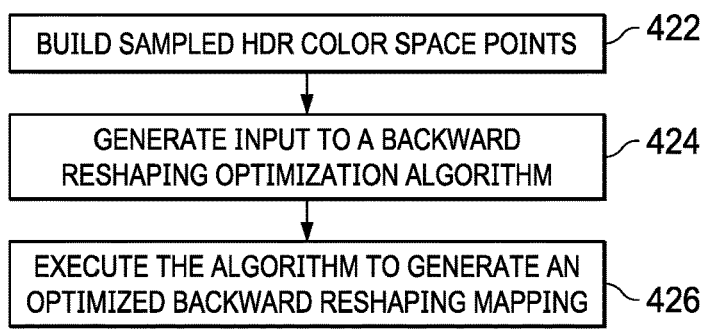

BUILD SAMPLED HDR COLOR SPACE POINTS — 422

GENERATE INPUT TO A BACKWARD RESHAPING OPTIMIZATION ALGORITHM — 424

EXECUTE THE ALGORITHM TO GENERATE AN OPTIMIZED BACKWARD RESHAPING MAPPING — 426

FIG. 4B

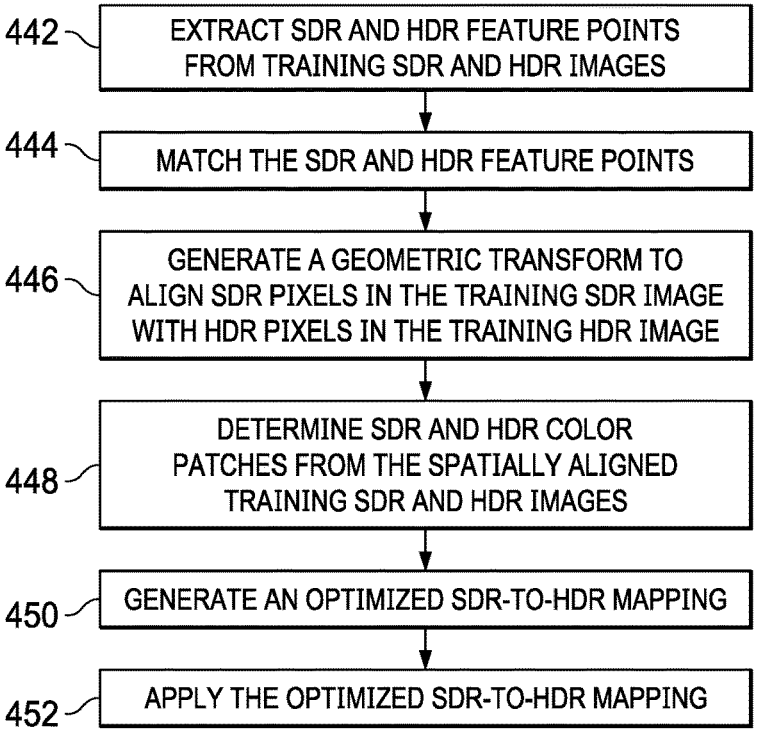

442 — EXTRACT SDR AND HDR FEATURE POINTS FROM TRAINING SDR AND HDR IMAGES

444 — MATCH THE SDR AND HDR FEATURE POINTS

446 — GENERATE A GEOMETRIC TRANSFORM TO ALIGN SDR PIXELS IN THE TRAINING SDR IMAGE WITH HDR PIXELS IN THE TRAINING HDR IMAGE

448 — DETERMINE SDR AND HDR COLOR PATCHES FROM THE SPATIALLY ALIGNED TRAINING SDR AND HDR IMAGES

450 — GENERATE AN OPTIMIZED SDR-TO-HDR MAPPING

452 — APPLY THE OPTIMIZED SDR-TO-HDR MAPPING

FIG. 4C

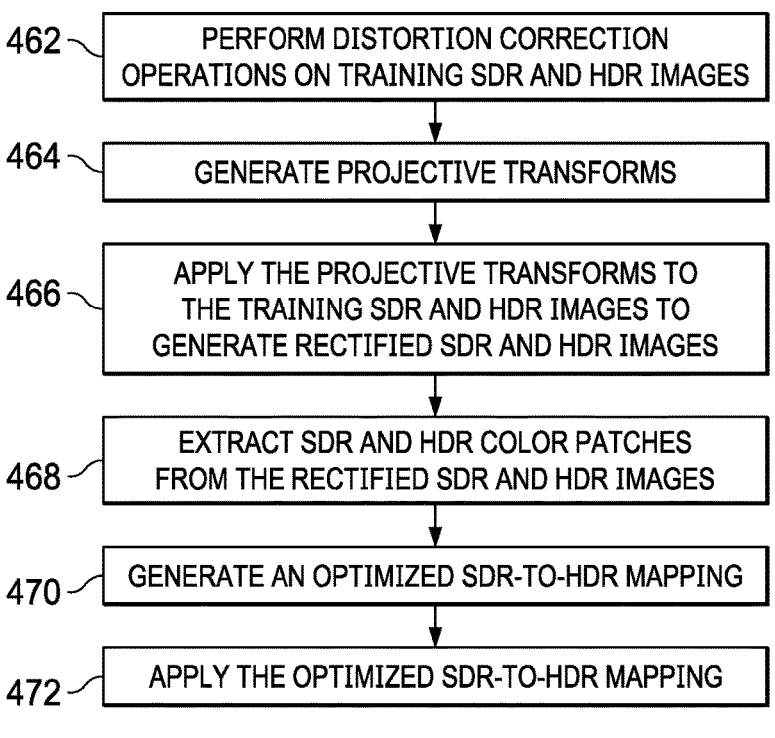

462 — PERFORM DISTORTION CORRECTION OPERATIONS ON TRAINING SDR AND HDR IMAGES

464 — GENERATE PROJECTIVE TRANSFORMS

466 — APPLY THE PROJECTIVE TRANSFORMS TO THE TRAINING SDR AND HDR IMAGES TO GENERATE RECTIFIED SDR AND HDR IMAGES

468 — EXTRACT SDR AND HDR COLOR PATCHES FROM THE RECTIFIED SDR AND HDR IMAGES

470 — GENERATE AN OPTIMIZED SDR-TO-HDR MAPPING

472 — APPLY THE OPTIMIZED SDR-TO-HDR MAPPING

FIG. 4D

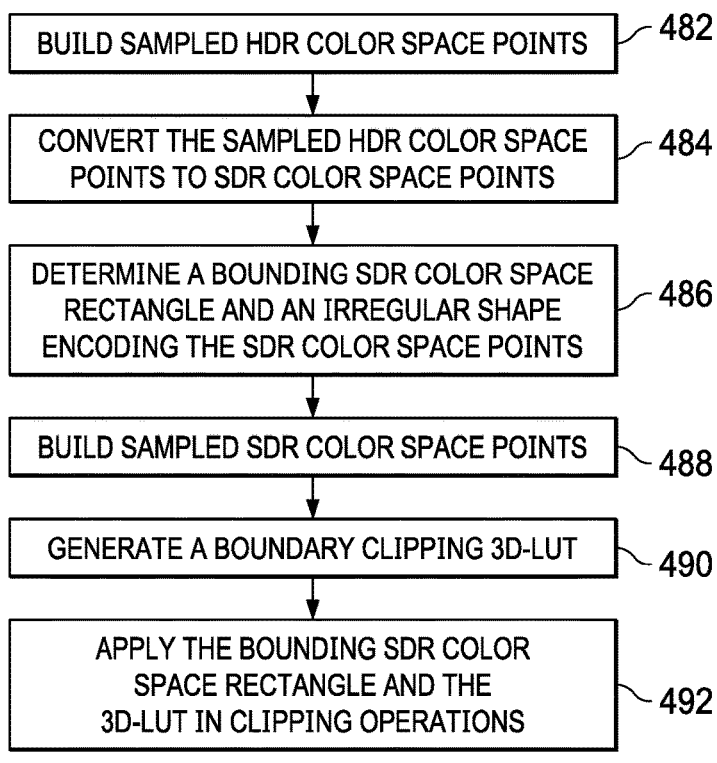

BUILD SAMPLED HDR COLOR SPACE POINTS — 482

CONVERT THE SAMPLED HDR COLOR SPACE POINTS TO SDR COLOR SPACE POINTS — 484

DETERMINE A BOUNDING SDR COLOR SPACE RECTANGLE AND AN IRREGULAR SHAPE ENCODING THE SDR COLOR SPACE POINTS — 486

BUILD SAMPLED SDR COLOR SPACE POINTS — 488

GENERATE A BOUNDARY CLIPPING 3D-LUT — 490

APPLY THE BOUNDING SDR COLOR SPACE RECTANGLE AND THE 3D-LUT IN CLIPPING OPERATIONS — 492

FIG. 4E

IMAGE OPTIMIZATION IN MOBILE CAPTURE AND EDITING APPLICATIONS

CROSS-REFERENCE TO RELATED APPLICATIONS

This application is a U.S. National Stage application under U.S.C. 371 of International PCT Application No. PCT/US2023/15494, filed on Mar. 17, 2023, which claims the benefit of priority to U.S. Provisional Patent application Ser. No. 63/321,390 (reference: D21135AUSP1), filed on 18 Mar. 2022, and European patent application 22 162 983.5 (reference: D21135AEP), filed 18 Mar. 2022, each incorporated by reference in its entirety.

TECHNOLOGY

The present disclosure relates generally to images. More particularly, an embodiment of the present disclosure relates to video codecs used to process images.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT.1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m² or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, *"Image parameter values for high dynamic range television for use in production and international programme exchange,"* (June 2017). As appreciated by the inventors here, improved techniques for composing video content data that can be used to support display capabilities of a wide variety of SDR and HDR display devices are desired.

WO 2019/217751 A1 relates to image encoding and/or image decoding. As a non-limiting example, a technique is disclosed according to which 3D mapping statistics are generated for a first image of a first dynamic range and a second image of a second dynamic range different from the first dynamic range. In the example technique, multivariate multiple regression (MMR) coefficients are generated by solving an optimization problem formulated using an MMR matrix built with the 3D mapping statistics without a letterbox constraint, and used to generate chroma mappings for predicting chroma codeword values of the second image. Further according to the example technique, it is determined whether a letterbox exists in the images, and, if so, it is determined whether the chroma mappings accurately predict chroma codeword values in the second image. According to a further non-limiting example, a reconstructed image generated by a recipient device by backward reshaping one of the images is rendered by a display device operating in conjunction with the recipient device.

WO 2021/076822 A1 relates to image encoding and/or image decoding. As a non-limiting example, a technique is disclosed according to which a backward reshaping mapping table is initially generated as an inverse of a forward reshaping mapping table. In the example technique, the backward reshaping mapping table is updated by replacing the content-mapped luminance codewords with forward reshaped luminance codewords generated by applying a luminance forward mapping to the sampled luminance codewords. Further according to the example technique, the luminance forward mapping is constructed from the forward reshaping mapping table, and the backward reshaping mapping table and the luminance forward mapping are used to generate backward reshaping mappings for creating a reconstructed image from a forward reshaped image. Yet further according to the example technique, the forward reshaped image is encoded, in a video signal, along with image metadata specifying the backward reshaping mappings. According to a further non-limiting example, a recipient device of the video signal applies the backward reshaping mappings to the forward reshaped image to create the reconstructed image of the second dynamic range.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 2B through FIG. 2E and FIG. 2H through FIG. 2K illustrate example parameterized color spaces in the R.2020 color space; FIG. 2O illustrates an example original color chart image displayed on the reference image display, an example captured image from the color chart image and a rectified captured image generated from the captured image.

FIG. 4A through FIG. 4E illustrate example process flows; and

DESCRIPTION OF EXAMPLE EMBODIMENTS

Figure 1A:
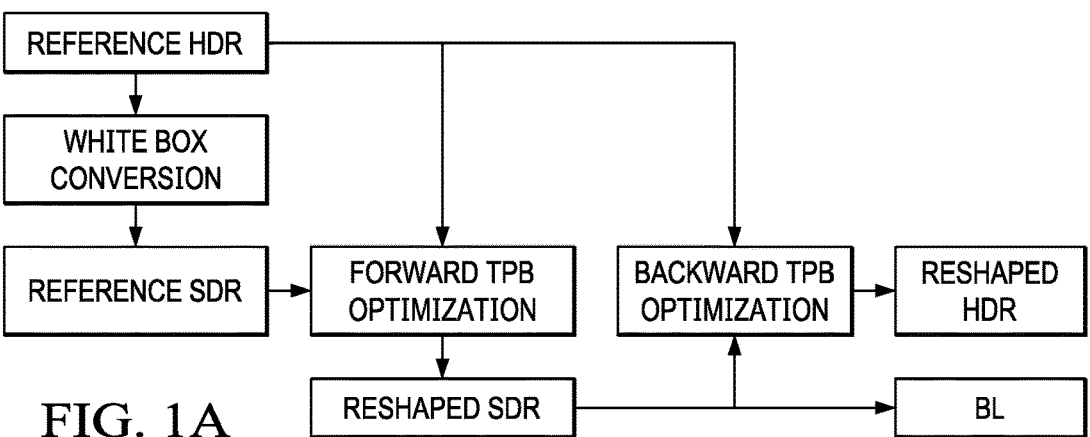
FIG. 1A through FIG. 1E illustrate example process flows for applying optimized reshaping operations.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Image optimizations such as those relating to tensor-product B-Spline (TPB) based image reshaping solutions are described herein for video capture applications including but not limited to mobile (video) capture applications. The TPB based solutions can provide or generate relatively accurate reconstructed images using robust predictors implemented with video codecs such as backward compatible video codecs. These predictors can operate with static mapping to gracefully handle or recover from transmission errors such as frame dropping, minimize power consumption such as battery power consumption, reduce data overheads and/or processing/transmission latencies, etc. In some operational scenarios, some or all of the TPB based solutions as described herein may be implemented with mobile applications that are to comply with relatively harsh battery or power constraint.

The TPB based image reshaping solutions can be adapted to operating in different use cases. Some of the use cases allow freedom to design and/or apply HDR-to-SDR mappings to generate SDR images to be encoded in (base layers of) video signals as described herein. Some of the use cases rely on mobile image signal processors (ISPs) with relatively limited programmable registers to generate SDR images to be encoded in (base layers of) video signals. Different architectures may be used to implement the TPB based solutions as described herein. Additionally, optionally or alternatively, these architectures or the TPB based solutions can be used to provide or support backward compatibility.

Given reference SDR images represented in an SDR color space or a color space in an SDR domain), the TPB-based solutions can use a TPB optimization process to achieve or determine a maximum or widest HDR color space or a color space in an HDR domain to represent corresponding reconstructed HDR images predicted from the SDR images. The wider the HDR color space, the more color deviations introduced in the SDR color space. The TPB optimization process can be implemented to achieve or determine an optimized balance point or tradeoff between achieving the maximum or widest HDR color space on one hand and introducing SDR color deviations on the other. Additionally, optionally or alternatively, the TPB optimization process as described herein can be implemented to incorporate neutral color processing or perform constraint optimization to help preserve gray levels represented in the SDR images in the reconstructed HDR images predicted from the SDR images.

As more and more videos are being captured by various camera-equipped computing or mobile devices in practice, video editing are also becoming more and more popular. Users operating these devices may be allowed to adjust the look of captured videos manually or simply apply default theme templates to the captured videos. Depending on available computation resources and/or preferences of video editing tool designers/providers, video editing may be done in either a source domain such as a source HDR domain in which source images are represented or a non-source domain such as a generated SDR domain to which pre-edited images may be converted from the source images in the source domain.

In operational scenarios in which SDR images are to be encoded in a video signal, video editing operations in the HDR domain or the source domain will not adversely impact downstream devices of the video signal to reconstruct HDR images from the SDR images decoded from the video signal at the decoder side. This is so because these video editing operations do not interfere HDR-to-SDR mappings to generate the SDR images from HDR images or source images in the HDR domain at the encoder side, and also do not interfere SDR-to-HDR mappings to map back to or reconstruct an approximation of, the HDR images at the decoder side.

However, in these operational scenarios, video editing operations in the SDR domain will likely adversely impact revertability between the SDR domain and the HDR domain. For example, the edited SDR images may not be able to be mapped back to the original or source HDR images. Furthermore, a color space to represent the SDR images may be limited with pre-defined ranges such as SMPTE ranges that pixel values or codewords cannot exceed. Color space conversion such as YUV-to-RGB conversion used for video editing operations may cause pixel values or codewords to be clipped and hence damaging or harming the reversibility. Clipping techniques as described herein can be used to reduce or prevent adverse editing impacts on video editing operations including but not limited to those performed with mobile devices. A two-level TPB boundary clipping may be implemented in the RGB domain to support or preserve maximum edited colors in the SDR domain that can be used to propagate or map back to reconstructed images in the HDR domain.

Example embodiments described herein relate to image generation. Sampled HDR color space points distributed throughout an HDR color space are built. The HDR color space is parameterized by a color primary scaling parameter with a candidate value selected from among a plurality of candidate values. The color primary scaling parameter is used to compute color space coordinates of at least one of multiple color primaries delineating the HDR color space. Reference SDR color space points represented in a reference SDR color space, input HDR color space points represented in an input HDR color space, and reference HDR color space points represented in a reference HDR color space, are generated from the sampled HDR color space points in the HDR color space. A reshaping operation optimization algorithm is executed to generate a chain of an optimized forward reshaping mapping and an optimized backward reshaping mapping. The reshaping operation optimization algorithm uses the reference SDR color space points, the input HDR color space points and the reference HDR color space points as input. The optimized forward reshaping mapping is used to forward reshape input HDR images in the input HDR color space into forward reshaped SDR images in a forward reshaped SDR color space, whereas the optimized backward reshaping mapping is used to backward reshape the forward reshaped SDR images in the forward reshaped SDR color space into backward reshaped HDR images.

Example embodiments described herein relate to image generation. Sampled HDR color space points distributed throughout an HDR color space are built. The HDR color space is parameterized by a color primary scaling parameter with a candidate value selected from among a plurality of candidate values. The color primary scaling parameter is used to compute color space coordinates of at least one of multiple color primaries delineating the HDR color space. Input SDR color space points represented in an input SDR color space and reference HDR color space points represented in a reference HDR color space are generated from the sampled HDR color space points in the HDR color space. A reshaping operation optimization algorithm is executed to generate an optimized backward reshaping mapping. The reshaping operation optimization algorithm receives the input SDR color space points and the reference HDR color space points as input. The backward reshaping mapping is used to backward reshape SDR images in the input SDR color space into backward reshaped HDR images.

Example embodiments described herein relate to image generation. A set of SDR image feature points is extracted from a training SDR image, whereas a set of HDR image feature points is extracted from a training HDR image. A subset of one or more SDR image feature points in the set of SDR image feature points is matched with a subset of one or more HDR image feature points in the set of HDR image feature points. The subset of one or more SDR image feature points and the subset of one or more HDR image feature points are used to generate a geometric transform to spatially align a set of SDR pixels in the training SDR image with a set of HDR pixels in the training HDR image. A set of pairs of SDR and HDR color patches is determined from the set of SDR pixels in the training SDR image and the set of HDR pixels in the training HDR image after the training SDR and HDR images have been spatially aligned by the geometric transform. An optimized SDR-to-HDR mapping is generated based at least in part on the set of pairs of SDR and HDR color patches derived from the training SDR image and the training HDR image. The optimized SDR-to-HDR mapping is applied to one or more non-training SDR images to generate one or more corresponding non-training HDR images.

Example embodiments described herein relate to image generation. Respective camera distortion correction operations are performed on each training image in a pair of a training standard dynamic range (SDR) image and a training high dynamic range (HDR) image to generate a respective undistorted image in a pair of an undistorted training SDR image and an undistorted training HDR image. A respective projective transform, in a pair of an SDR image projective transform and an HDR image projective transform, is generated using corner pattern marks detected from each undistorted image in the pair of the undistorted training SDR image and the undistorted training HDR image. Each projective transform in the pair of the SDR image projective transform and the HDR image projective transform is applied to a respective undistorted image in the pair of the undistorted training SDR image and the undistorted training HDR image to generate a respective rectified image in a pair of a rectified training SDR image and a rectified training HDR image. A set of SDR color patches is extracted from the rectified training SDR image, whereas a set of HDR color patches is extracted from the rectified training HDR image. An optimized SDR-to-HDR mapping is generated based at least in part on the set of SDR color patches and the set of HDR color patches derived from the training SDR image and the training HDR image. The optimized SDR-to-HDR mapping is applied to one or more non-training SDR images to generate one or more corresponding non-training HDR images.

Example embodiments described herein relate to clipping operations on edited images. Sampled HDR color space points distributed throughout an HDR color space used to represent reconstructed HDR images are built. The sampled HDR color space points are converted into SDR color space points in a first SDR color space in which SDR images to be edited by an editing device are represented. A bounding SDR color space rectangle is determined based on extreme SDR codeword values of the SDR color space points in the first SDR color space. An irregular three-dimensional (3D) shape is determined from a distribution of the SDR color space points. Sampled SDR color space points distributed throughout the bounding SDR color space rectangle in the first SDR color space are built. The sampled SDR color space points and the irregular shape are used to generate a boundary clipping 3D lookup table (3D-LUT). The boundary clipping 3D-LUT uses the sampled SDR color space points as lookup keys. Clipping operations are performed, based at least in part on the boundary clipping 3D-LUT, on an edited SDR image in the first SDR color space to generate a boundary clipped edited SDR image in the first SDR color space.

Reshaping Optimization in Image/Video Capture Applications

Reshaping optimization processes such as TPB and/or non-TPB optimization processes can be implemented or incorporated in video capture applications running on computing devices such as mobile devices in a variety of operational scenarios. The video capture applications with the reshaping optimization processes can be used to generate or output video signals such as base layer or SDR images encoded therein. The reshaping optimization processes can implement different solutions in different operational scenarios to generate or optimize reshaping operational parameters such as TPB and/or non-TPB coefficients to be used with the base layer or SDR images to generate, construct or reconstruct non-base-layer or HDR images with optimized picture quality.

For the purpose of illustration, the reshaping optimization processes, or the solutions implemented therein, may be classified into different types based on specific SDR generation processes or sub-processes adopted by the video capturing applications as well as based on specific reshaping path(s)—forward (reshaping) path and/or backward (reshaping) path—subjected to reshaping optimization.

FIG. 1A illustrates a first example reshaping optimization process implementing a white-box joint forward and backward TPB optimization design/solution (referred to as "WFB") with a (single) video capture device. The white-box joint forward and backward TPB optimization design/solution may be implemented for operational scenarios in which a SDR generation process or sub-process converts reference HDR images into reference SDR images with white-box conversion operations and in which both forward and backward (reshaping) paths can be subjected to TPB optimization.

As used herein, "white-box conversion" refers to HDR-to-SDR mapping or conversion with well-defined conversion or mapping functions/equations such as those (e.g., publicly, etc.) specified or documented in standard-based or proprietary video coding specifications. In comparison, "black-box conversion" refers to HDR-to-SDR mapping or conversion with conversion or mapping operations not based on the well-defined conversion or mapping functions/equations. For example, black-box conversion may be implemented as internal image signal processes performed by image signal processors with no or little reliance on any well-defined conversion or mapping functions or equations (e.g., publicly, etc.) specified or documented in standard-based or proprietary video coding specifications.

By way of example but not limitation, in FIG. 1A, an input video signal including the HDR images may be represented in an input color space such as a full R.2020 color space. A generated SDR signal including the reference SDR images may be represented in a reference SDR color space. The reference SDR images can be images generated from the HDR images with publicly known HDR-to-SDR mapping processes, functions and/or equations.

As shown in FIG. 1A, in the forward reshaping path, the reference HDR images may be forward reshaped into (forward) reshaped SDR images approximating the reference SDR images, based at least in part on optimized forward reshaping operational parameters (denoted as "forward TPB optimization") generated from a joint forward-and-backward TPB optimization solution. The reshaped SDR images may be represented in a reshaped SDR color space and generated by an upstream device to be included/encoded in a video signal—or a base layer (BL) thereof—outputted by the upstream device.

A downstream recipient device or a video decoder of the video signal can decode the reshaped SDR images from the video signal. The decoded reshaped SDR images at the decoder side may be the same as the reshaped SDR images at the encoder side, subject to errors introduced in compression/decompression, coding operations and/or data transmissions.

In the backward reshaping path as implemented by the downstream device, the reshaped SDR images may be backward reshaped into (backward) reshaped HDR images based at least in part on optimized backward reshaping operational parameters (denoted as "backward TPB optimization") generated from the same joint forward-and-backward TPB optimization solution. The reshaped HDR images—generated with the optimized backward reshaping operational parameters in an output HDR color space—represent an approximation to or reconstructed version of the reference HDR images.

The joint forward-and-backward TPB optimization solution can generate the optimized forward and backward reshaping operational parameters to cover as wide as possible in the output HDR color space in which the reshaped or reconstructed HDR images generated at the decoder side are represented.

One or both of the optimized forward and backward reshaping operational parameters such as optimized forward and backward TPB coefficients can be implemented or represented in three-dimensional look-up table(s) or 3D-LUT(s) to reduce processing times in reshaping operations.

Since the forward and backward reshaping operational parameters such as forward and backward TPB coefficients are jointly or concurrently designed or optimized in the joint forward and backward TPB optimization process, the supported reshaped SDR and HDR color spaces used to represent the reshaped SDR and HDR images can be jointly or concurrently designed or optimized in the same process.

In some operational scenarios, the optimized forward and backward reshaping operational parameters generated from the joint forward and backward TPB optimization process may be applied in a static single-layer backward compatible (SLBC) framework. Under this static framework, there is no need to (e.g., dynamically, etc.) obtain optimize image-specific or image-dependent optimized forward and backward operational parameters such as image-specific or image-dependent (or content-dependent) forward and backward TPB coefficients, for example on the fly while images are being processed.

Rather, under the static SLBC framework, the same or static optimized forward and backward operational parameters such as the same optimized forward and backward TPB coefficients can be obtained or generated once—for example, offline or before performing reshaping operations on any of the (input) reference HDR images or the reshaped SDR images—for forward reshaping all the (input) reference HDR images and backward reshaping the reshaped SDR images. In an example, a single set of static optimized forward and backward operational parameters can be generated offline by a system as described herein and configured/deployed in or used by a capturing device as described herein to perform image reshaping or reconstruction operations. In another example, multiple sets of static optimized forward and backward operational parameters can be generated offline by a system as described herein and configured/deployed in or used by a capturing device as described herein to select a specific set of static optimized forward and backward operational parameters to perform image reshaping or reconstruction operations.

Thereafter, the optimized static forward TPB coefficients can be applied by the upstream device to forward reshape some or all of the (input) reference HDR images (e.g., a sequence of consecutive or sequential (input) reference HDR images, etc.) to generate the reshaped SDR images to be encoded in the (SLBC) video signal, whereas the optimized static backward TPB coefficients can be applied by the downstream recipient device of the video signal to some or all of the reshaped SDR images (e.g., a sequence of consecutive or sequential reshaped SDR images, etc.) decoded from the video signal to generate or reconstruct the reshaped HDR images.

Figure 1B:
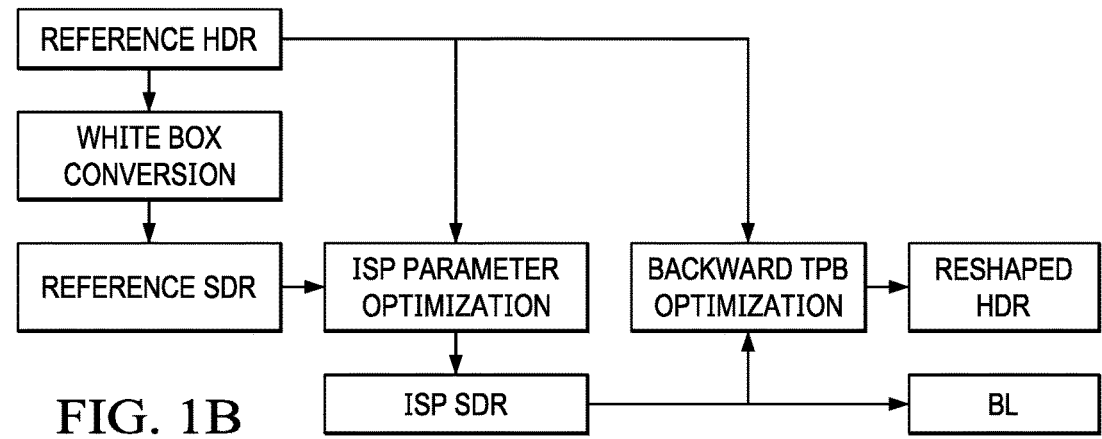

FIG. 1B illustrates a second example reshaping optimization process implementing a white-box backward only TPB optimization design/solution (referred to as "WB") with a (single) video capture device. The white-box backward only TPB optimization design/solution may be implemented for operational scenarios in which a SDR generation process or sub-process converts reference HDR images into reference SDR images with white-box conversion operations and in which only the backward (reshaping) path is subjected to TPB optimization.

By way of example but not limitation, in FIG. 1B, an input video signal including the HDR images may be represented in an input color space such as a P3 color space. A generated SDR signal including the reference SDR images may be represented in a reference SDR color space. The reference SDR images can be images generated from the HDR images with publicly known HDR-to-SDR mapping processes, functions and/or equations.

As shown in FIG. 1B, the reference HDR images may be processed by a programmable image signal processor or ISP (e.g., with given image signal processing functions/equations/operations, etc.) into ISP SDR images approximating the reference SDR images, based at least in part on optimized ISP operational parameters (denoted as "ISP parameter optimization") generated from an ISP optimization solution. The ISP SDR images may be represented in an ISP SDR color space and generated by an upstream device to be included/encoded in a video signal—or a base layer (BL) thereof—outputted by the upstream device.

A downstream recipient device or a video decoder of the video signal can decode the ISP SDR images from the video signal. The decoded ISP SDR images at the decoder side may be the same as the ISP SDR images at the encoder side, subject to errors introduced in compression/decompression, coding operations and/or data transmissions.

In the backward reshaping path as implemented by the downstream device, the ISP SDR images may be backward reshaped into (backward) reshaped HDR images based at least in part on optimized backward reshaping operational parameters (denoted as "backward TPB optimization") generated from the backward only TPB optimization solution. The reshaped HDR images—generated with the optimized backward reshaping operational parameters in an output HDR color space—represent an approximation to or reconstructed version of the reference HDR images.

The backward only TPB optimization solution can generate the optimized backward reshaping operational parameters to cover as wide as possible in the output HDR color space in which the reshaped or reconstructed HDR images generated at the decoder side are represented.

The optimized backward reshaping operational parameters such as optimized backward TPB coefficients can be implemented or represented in a three-dimensional look-up table or 3D-LUT to reduce processing times in reshaping operations.

In some operational scenarios, the backward reshaping operational parameters generated from the backward only TPB optimization process may be applied in a static single-layer inverse display mapping (SLiDM) framework. Under this static framework, there is no need to (e.g., dynamically, etc.) obtain optimize image-specific or image-dependent optimized backward operational parameters such as image-specific or image-dependent (or content-dependent) backward TPB coefficients.

Rather, under the static SLiDM framework, the same or static optimized backward operational parameters such as the same optimized backward TPB coefficients can be obtained or generated once—for example, offline or before performing reshaping operations on any of the reshaped SDR images—for backward reshaping the ISP SDR images. In an example, a single set of static optimized backward operational parameters can be generated offline by a system as described herein and configured/deployed in or used by a capturing device as described herein to perform image reshaping or reconstruction operations. In another example, multiple sets of static optimized backward operational parameters can be generated offline by a system as described herein and configured/deployed in or used by a capturing device as described herein to select a specific set of static optimized backward operational parameters to perform image reshaping or reconstruction operations.

Thereafter, the optimized static backward TPB coefficients can be applied by the downstream recipient device of the video signal to some or all of the ISP SDR images (e.g., a sequence of consecutive or sequential ISP SDR images, etc.) decoded from the video signal to generate or reconstruct the reshaped HDR images.

The ISP SDR images encoded in the video signal may or may not be identical to a desired SDR look such as represented by the reference images. The operational parameters or settings thereof in the programmable ISP can be optimized to approximate the reference images. Hence, in the "WB" operational scenarios of FIG. 1B, the SDR images for backward reshaping into the reshaped HDR images are given or fixed as the ISP SDR images. By way of comparison, in the WFB operational scenarios of FIG. 1A, the SDR images for backward reshaping into the reshaped HDR images are the forward reshaped SDR images, which can be optimized by applying the optimized forward reshaping operational parameters generated in the joint forward and backward TPB optimization process that generates both the optimized forward and backward reshaping parameters. In other words, TPB optimization is not used in the forward path to generate the ISP SDR images for the purpose of improving or enhancing both the desired look of the SDR images encoded in the video signal and the desired look of the reshaped HDR images. Relatively large deviations from the desired looks may occur in these operational scenarios.

Figure 1C:
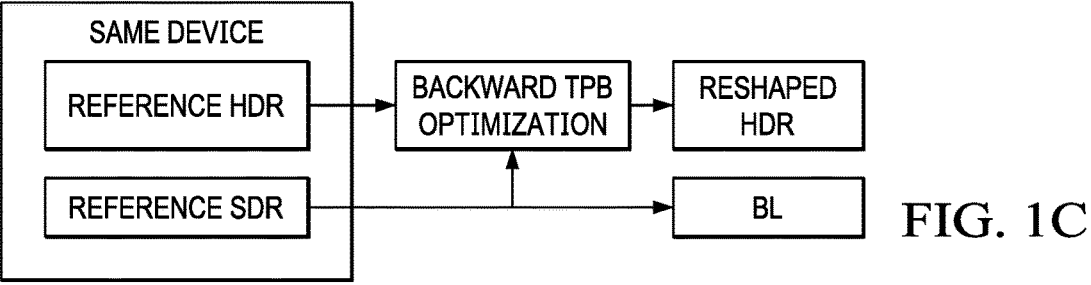

FIG. 1C illustrates a third example reshaping optimization process implementing a black-box backward only TPB optimization design/solution (referred to as "BB1") with a (single) video capture device. The black-box backward only TPB optimization design/solution may be implemented for operational scenarios in which SDR images are not generated from HDR images using white-box conversion operations and in which only the backward (reshaping) path is subjected to TPB optimization.

Reshaping operational parameters in these operational scenarios can be generated with training SDR images and training HDR images generated or acquired by the same video capture device such as the same mobile device. These training SDR images and training HDR images form a plurality of SDR and HDR image pair each of which includes a training SDR image and a training HDR image corresponding to the training SDR image.

A training SDR image and a training HDR image in the same SDR and HDR image pair may be acquired at different time instances/points (e.g., a few milliseconds apart, a few fractional seconds apart, a few seconds apart, etc.) using the same capturing device using the same ISP. The training SDR and HDR images may not be exactly spatially aligned or temporally aligned with each other, as it is difficult if not impossible to maintain the same shooting positions at the different time instances/points and process the training SDR and HDR images identically. For example, the training SDR image can be local tone mapped or local enhanced, whereas the training HDR image may be generated or obtained from multiple camera exposures. Accordingly, in the "BB1" operational scenarios, relationships between pixel or codeword values in the training SDR image and corresponding pixel or codeword values in the training HDR image in the same image pair may be treated as, or assumed to be, a black box.

Training SDR and HDR images in each of the image pairs may be first spatially aligned. Spatially aligned training SDR and HDR images in the image pairs may be used to determine or find out matching color pairs. These matching color pairs can then be used to generate the optimized reshaping operational parameters such as the optimized TPB and/or non-TPB coefficients for reshaping or mapping (e.g., non-training, reference, etc.) SDR images back to backward reshaped or reconstructed HDR images approximating (e.g., non-training, reference, etc.) HDR images.

As shown in FIG. 1C, SDR images such as reference SDR images may be generated by an upstream device such as a capture device) to be included/encoded in a video signal—or a base layer (BL) thereof—outputted by the upstream device. Example reference SDR images as described herein may include, but are not necessarily limited to only, SDR images generated from a programmable image signal processor of the upstream device or a capture device operating in conjunction with the upstream device.

A downstream recipient device or a video decoder of the video signal can decode the reference SDR images from the video signal. The decoded reference SDR images at the decoder side may be the same as the reference SDR images at the encoder side, subject to errors introduced in compression/decompression, coding operations and/or data transmissions.

In the backward reshaping path as implemented by the downstream device, the reference SDR images may be backward reshaped into (backward) reshaped HDR images based at least in part on optimized backward reshaping operational parameters (denoted as "backward TPB optimization") generated from the black-box backward only TPB optimization design/solution. The reshaped HDR images—generated with the optimized backward reshaping operational parameters in an output HDR color space—represent an approximation to or reconstructed version of reference HDR images that can or could be generated by the same capture device.

The black-box backward only TPB optimization design/solution can generate the optimized backward reshaping operational parameters to cover as wide as possible in the output HDR color space in which the reshaped or reconstructed HDR images generated at the decoder side are represented.

The optimized backward reshaping operational parameters such as optimized backward TPB coefficients can be implemented or represented in a three-dimensional look-up table or 3D-LUT to reduce processing times in reshaping operations.

In some operational scenarios, the backward reshaping operational parameters generated from the black-box backward only TPB optimization design/solution may be applied in a SLiDM framework. Under this static framework, there is no need to (e.g., dynamically, etc.) obtain optimize image-specific or image-dependent optimized backward operational parameters such as image-specific or image-dependent (or content-dependent) backward TPB coefficients.

Rather, under the static SLiDM framework, the same or static optimized backward operational parameters such as the same optimized backward TPB coefficients can be obtained or generated once—for example, offline or before performing reshaping operations on any of the reshaped SDR images—for backward reshaping the spatially aligned training SDR images generated by the upstream capture device to reshaped or reconstructed HDR images approximating the spatially aligned training HDR images generated by the same capture device.

Thereafter, the optimized static backward TPB coefficients can be applied by the downstream recipient device of the video signal to some or all of the (e.g., non-training, etc.) reference SDR images (e.g., a sequence of consecutive or sequential reference SDR images, etc.) decoded from the video signal to generate or reconstruct reshaped HDR images approximating reference HDR images that can or could be generated from the same upstream capture device that generate or capture the reference SDR images.

As TPB optimization is only used in the backward path, the resultant look of the reshaped HDR images generated from backward reshaping the reference SDR images may have relatively large deviations from a desired look of the reference HDR images in the "BB1" operational scenarios.

Figure 1D:
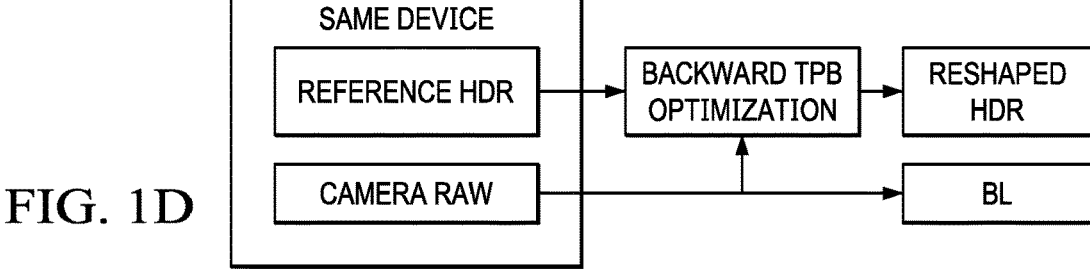

In some "BB1" operational scenarios, as illustrated in FIG. 1D, camera raw images generated from a camera ISP instead of reference SDR images generated from a programmable image signa processor may be directly encoded in the video signal outputted by the upstream (capture) device. In a training phase, training camera raw images, which may or may not be SDR images, can be spatially and/or temporally aligned with training HDR images int the same image pairs of camera raw and HDR images. Matching color pairs from the image pairs of spatially aligned camera raw and HDR images can be used to optimize backward reshaping operational parameters such as backward TPB coefficients. In a non-training or deployment phase, the optimized backward reshaping operational parameters can be used by a downstream device of a video signal encoded with non-training camera raw images to backward reshape decoded non-training camera raw images from the video signal into backward reshaped or reconstructed (non-training) HDR images that approximate reference HDR images that can or could be generated by the same upstream (capture) device.

Figure 1E:
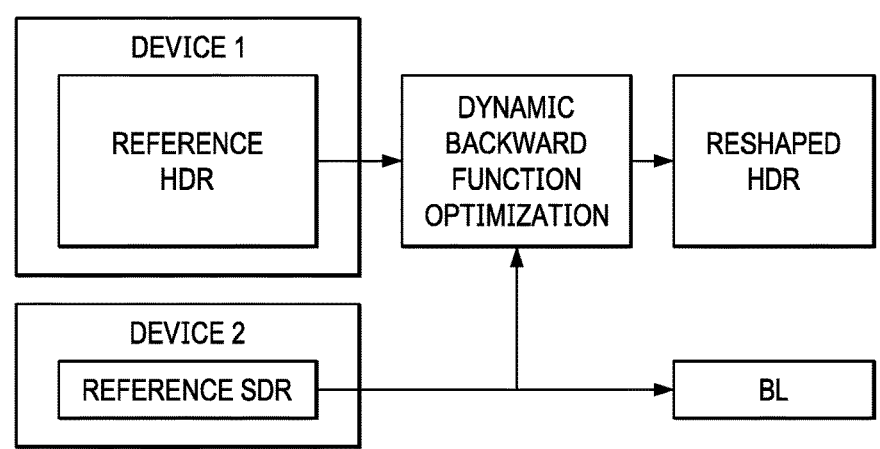

FIG. 1E illustrates a fourth example reshaping optimization process implementing a black-box backward only reshaping optimization design/solution (referred to as "BB2") with different video capture devices. The "BB2" reshaping optimization design/solution may be implemented for operational scenarios in which SDR images are generated by a first capture device and HDR images to be generated from the SDR images are (e.g., intended to be, etc.) generated by a second different capture device and in which only the backward (reshaping) path is subjected to reshaping optimization. In addition, the reshaping optimization in the "BB2" operational scenarios may or may not be TPB optimization.

Reshaping operational parameters in the "BB2" operational scenarios can be generated with training SDR images and training HDR images generated or acquired respectively by the two video capture devices such as two mobile devices of different makes and/or models. These training SDR images and training HDR images form a plurality of SDR and HDR image pair each of which includes a training SDR image and a training HDR image corresponding to the training SDR image.

A training SDR image and a training HDR image in the same SDR and HDR image pair may be acquired using the same image such as the same checkerboard image rendered on the same or similar image display(s). In the "BB1" operational scenarios, relationships between pixel or codeword values in the training SDR image and corresponding pixel or codeword values in the training HDR image in the same image pair may be treated as, or assumed to be, a black box.

Training SDR and HDR images in each of the image pairs may be first spatially aligned. Spatially aligned training SDR and HDR images in the image pairs may be used to determine or find out matching color patches rendered with test images such as checkerboard images on the same image display or the same image display type. These matching color patches can then be used to construct three-dimensional look-up tables (3D-LUTs) to map SDR pixel or codeword values of color patches in the test images to corresponding HDR pixel or codeword values of the same color patches.

The 3D-LUTs derived based in part or in whole on the test images can be used to generate optimized static or dynamic reshaping operational parameters for reshaping or mapping (e.g., non-training, reference, etc.) SDR images back to backward reshaped or reconstructed HDR images approximating (e.g., non-training, reference, etc.) HDR images.

As shown in FIG. 1E, SDR images such as reference SDR images may be generated by an upstream device such as a first capture device to be included/encoded in a video signal—or a base layer (BL) thereof—outputted by the upstream device. Example reference SDR images as described herein may include, but are not necessarily limited to only, SDR images generated from a programmable image signal processor of the first capture device or upstream device.

A downstream recipient device or a video decoder of the video signal can decode the reference SDR images acquired with the first capture device from the video signal. The decoded reference SDR images at the decoder side may be the same as the reference SDR images at the encoder side, subject to errors introduced in compression, decompression, coding operations and/or data transmissions.

In the backward reshaping path as implemented by the downstream device, the reference SDR images may be backward reshaped into (backward) reshaped HDR images based at least in part on optimized backward reshaping operational parameters (denoted as "Dynamic backward function optimization") generated from the "BB2" reshaping optimization design/solution. The reshaped HDR images—generated with the optimized backward reshaping operational parameters in an output HDR color space—represent an approximation to or reconstructed version of reference HDR images that can or could be generated by a second different capture device.

The "BB2" reshaping optimization design/solution can generate the optimized backward reshaping operational parameters to cover as wide as possible in the output HDR color space in which the reshaped or reconstructed HDR images generated at the decoder side are represented.

In some operational scenarios, the backward reshaping operational parameters generated from the "BB2" reshaping optimization design/solution may be applied in a static or dynamic SLiDM framework.

As the "BB2" reshaping optimization is only used in the backward path, the resultant look of the reshaped HDR images generated from backward reshaping the reference SDR images may have relatively large deviations from a desired look of the reference HDR images. The first and second capture devices may be mobile devices that can operate differently in their respective video capturing application, for example with different exposure times, different video processing operations, different mapping functions/relationships, etc.

A dynamic SLiDM frame in which dynamic mapping with image-dependent or image-specific reshaping operational parameters may be used to backward reshape SDR images of the first capture device to HDR images that can or could be generated by the second capture device, especially in operational scenarios in which the first and second capture devices operate with relatively large differences between respective video/image capture applications running on the first and second capture devices and/or between respective ISPs used in the first and second capture devices. For example, in a training phase, multiple sets of training SDR and HDR images or image pairs can be used to derive multiple sets of optimized reshaping operational parameters respectively for the multiple sets of training SDR and HDR images or image pairs. In a deployment or application phase, specific image characteristics such as overall brightness of some or all regions of a specific image can be dynamically evaluated when the specific image is being processed. A specific set of optimized reshaping operational parameters can be adaptively and/or dynamically selected for the specific image from among the multiple sets of optimized reshaping operational parameters based on the specific image characteristics of the specific image in relation to or in comparison with respective image characteristics of the multiple sets of training SDR and HDR images or image pairs.

White Box Joint TPB Forward and Backward Optimization (WFB)

A number of design factors may be considered for reshaping optimization to help increase coverage of a supported color space in which reshaped images are to be represented. First, tensor-product bi-spline (TPB) predictors with optimized TPB coefficients generated from reshaping optimization may be used to obtain or achieve a relative high prediction accuracy than other types of predictors including but not limited to MMR predictors. Multi-knot and continuity properties of tensor-product bi-spline predictors or prediction functions can be exploited or used to cover a relatively wide color range or color space portion with relatively high accuracy. Example TPB predictors can be found in U.S. Provisional Patent Application Ser. No. 62/908,770, "Tensor-product B-spline predictor," by Guan-Ming Su, Harshad Kadu, Qing Song and Neeraj J. Gadgil, filed on Oct. 1, 2019, the contents of which are entirely incorporated herein by reference as if fully set forth herein.

In comparison, while multi-piece MMR predictors or prediction functions might be better than single-piece MMR predictors or prediction functions, discontinuity between different MMR pieces would likely be introduced with the multi-piece MMR predictors or prediction functions, thereby negatively impacting and even prohibiting usage of the multi-piece MMR predictors or prediction functions in many operational scenarios. Example MMR based operations are described in U.S. Pat. No. 8,811,490, which are incorporated by reference in its entirety as if fully set forth herein.

TPB predictors can be advantageously used in SLBC based video codec. More specifically, forward TPB predictors can be used to generate forward reshaped SDR images approximating reference SDR images, whereas backward TPB predictors can be used to generate backward reshaped or reconstructed HDR images approximating reference HDR images. Example usage of TPB predictors with SLBC based video codec can be found in U.S. Provisional Patent Application Ser. No. 63/255,057, "Tensor-product B-spline prediction for HDR video in mobile applications," by H. Kadu et al., filed on Oct. 13, 2021, the contents of which are entirely incorporated herein by reference as if fully set forth herein. In addition, a BESA (Backward Error Subtraction for signal Adjustment) algorithm/method with modification to support neutral color preservation can be used in a pipeline of chained reshaping functions to optimize the forward and backward TPB predictors together to achieve a relatively high reversibility to or a relatively accurate approximation of the reference HDR images by the backward reshaped or reconstructed HDR images. Example BESA algorithm/method can be found in U.S. Provisional Patent Application Ser. No. 63/013,063, "Reshaping functions for HDR imaging with continuity and reversibility constraints," by G-M. Su, filed on Apr. 21, 2020, U.S. Provisional Patent Application Ser. No. 63/013,807, "Iterative optimization of reshaping functions in single-layer HDR image codec," by G-M. Su and H. Kadu, filed on Apr. 22, 2020, and PCT Application Ser. No. PCT/US2021/028475, filed on Apr. 21, 2021, the contents of which are entirely incorporated herein by reference as if fully set forth herein.

While TPB predictors have better prediction accuracy than other types of predictors, a relatively large signal or bitrate overhead may be incurred to transmit TPB coefficients in a video signal. In addition, a relatively large computational cost may be incurred to construct TPB equations or basis functions used in the TPB predictors.

In some operational scenarios, to avoid or reduce the signal or bitrate overhead and computational cost, built-in or static TPB predictors may be used to reshape some or all images in an entire video sequence without changing TPB coefficients used in the static TPB predictors during playing back the video sequence. More specifically, some or all of the (built-in or static) TPB coefficients can be cached or stored in a video application such as a video capture/editing application without needing to transmit these TPB coefficients explicitly through or in a video signal or bitstream encoded with images to be reshaped by the built-in or static TPB predictors. In an example, some or all of the TPB coefficients can be pre-loaded or preconfigured in a downstream recipient device before the video signal or bitstream is received and processed by the downstream recipient device. Additionally, optionally or alternatively, multiple sets of TPB coefficients can be pre-loaded or preconfigured in a downstream recipient device before the video signal or bitstream is received and processed by the downstream recipient device. The video applications can simply choose or select a specific set of TPB coefficients to use with the static TPB predictors from among the multiple sets of TPB coefficients, for example based on a simple indicator (e.g., a binary indicator, a multi-bit indicator, etc.) signaled or transmitted in the video signal or bitstream. Example static TPB predictors or prediction functions can be found in in the previously mentioned U.S. Provisional Patent Application Ser. No. 63/255,057.

In some operational scenarios, mobile devices may be used to host and run video capture and/or editing applications. Users of the mobile devices can edit captured images in these video capture and/or editing applications. The edited images such as edited HDR images—which, for example, may be intended to be displayed or viewed on image displays of non-mobile devices with display capabilities higher or larger than those of image displays of the mobile devices—can have luminance ranges and/or color ranges or color distributions higher, larger, wider and/or broader than those of the (original) captured images such as HDR images originally captured from camera sensors of the mobile devices. For example, the captured HDR images can often be limited by camera sensors and ISP outputs of the mobile devices to be represented in a relatively narrow color space or gamut such as P3, whereas the edited HDR images can be represented in a relatively wider color space or gamut such as the entire R.2020 color space.

To design a static mapping for reshaping operations, it is highly desired to optimize forward/backward TPB coefficients to cover dynamic range(s) as high as possible and color space(s) or gamut(s) as wide as possible while realizing bitrate and computational efficiency as much as possible.

A full HDR revertability between a reconstructed HDR image and a reference HDR image to which the reconstructed HDR is identical would need to distinguish colors in an original or reconstructed HDR domain (or color space) to be distinguished or distinguishable in a reshaped SDR domain (or color space), in order to enable the distinguished colors in the SDR domain to be mapped back to distinguishable colors in the HDR domain. Hence, the full revertability would likely need one-to-one mappings from HDR to SDR as well as from SDR back to HDR. The wider the HDR domain or color space is to support, the more codewords the SDR domain or color space needs to have. Given the total number of available SDR pixel or codeword values in the SDR domain (e.g., corresponding to a lower bit depth than that of the HDR domain, etc.) is typically smaller than the total number of needed HDR pixel or codeword values in the HDR domain, the full HDR revertability may not be possible in some operational scenarios. Indeed, some captured or edited images may contain combinations of diffusive and/or specular colors forming color distributions such as shown as an irregular shape in FIG. 2A that go beyond, and hence are not entirely representable by, the R.2020 color space ("BT.2020"), let alone a smaller color space or SDR color space such as the R.709 color space ("BT.709") or the (DCI) P3 color space.

In many operational scenarios, a non-linear reshaping mapping or function can be used to distribute available pixel or codeword values relatively efficiently and generate the (forward) reshaped SDR that approximates the reference SDR image as closely as possible and that helps the reconstructed HDR image to approximate the reference HDR image as closely as possible, albeit the reshaped SDR generated with the non-linear reshaping mapping or function may not be identical to the reference SDR image but rather may contain some deviations from the reference SDR image.

Additionally, optionally or alternatively, in some operational scenarios, to maintain the same or similar looks of the reference SDR and HDR images in the reshaped SDR and HDR images, reshaping optimization as described herein can be performed with neutral color constraints that preserve neutral colors in color mapping performed with the reshaping operations.

Given their capabilities to approximate functions with relatively high non-linearities, TPB predictors or functions can be incorporated in the reshaping operations to support or realize a relatively wide HDR color space for representing the backward reshaped or reconstructed HDR images.

A potential downside is that the TPB predictors may need a relatively large number of TPB coefficients to represent or approximate non-linear SDR-to-HDR and/or HDR-to-SDR mapping functions. In order to prevent possible ill-defined conditions, numerical instabilities, slow convergence issues, etc., that may occur in solving optimization problems for TPB coefficients, static TPB predictors may be generated beforehand and deployed with video codecs such as those used by upstream devices and/or downstream devices before these video codecs are used to process video sequences such as capture and/or edited video sequences.

Figure 2A:
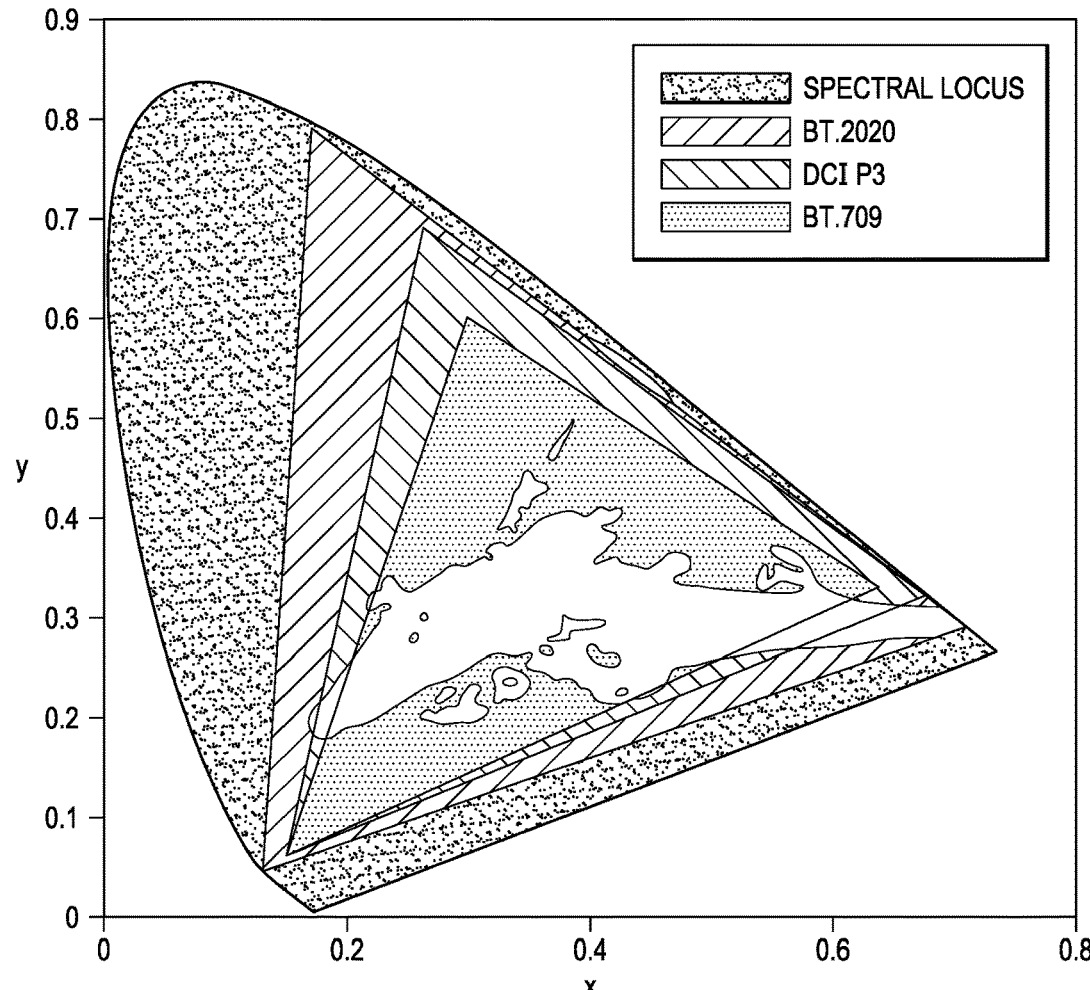
FIG. 2A illustrates an example color distribution of an irregular shape in relation to HDR and SDR color spaces such as R.2020, P3 and R.709 color spaces.

For the purpose of illustration only, in the operational scenarios as shown in FIG. 1A, the (forward reshaped) SDR domain or color space may be that of R.709, whereas the (original or backward reshaped) HDR domain or color space may be that of R.2020. As illustrated in FIG. 2A, the R.2020 color space is much larger than the R.709 color space. Hence, while it may be difficult to map the entire R.2020 to R.709 and then map back R.709 to R.2020, reshaping optimization techniques as described herein can be used to optimize the coverage of the HDR color space for representing the backward reshaped or reconstructed HDR images as well as maintain the same or similar looks of the reference SDR and HDR images in the reshaped SDR and HDR images. These techniques can be used to concurrently optimize reshaping operational parameters such as TPB coefficient for both forward and backward reshaping operations.

While it may not be possible in all scenarios to cover the entire R.2020 color space, a subset or sub-space—e.g., a specific color gamut delineated as a triangle formed by color primaries in a color coordinate system, etc.—in the R.2020 color space may be selected or chosen by the reshaping optimization operations to maintain the HDR reversibility to the reference HDR images and acceptable SDR approximation of the reference SDR images in the reshaped HDR and SDR images.

By way of illustration but not limitation, the subset or sub-space in the R.2020 color space (or HDR color space for representing the reshaped HDR images) may be defined or characterized by a specific white point and three specific color primaries (red, green, blue). The specific white point may be selected or fixed to be the D65 white point. There may exist much design freedom to select the three specific color primaries from many possible color primary combinations for the subset or sub-space in the R.2020 to be supported by the reshaping operations. The reshaping optimization techniques as described herein can be used to determine or select the specific color primaries for the subset or sub-space in the R.2020 to be optimized color primaries for realizing or reaching maximum perceptual quality and/or color coding efficiency and/or revertability between SDR and HDR images.

A Macadam ellipse represents a just noticeable color difference in that the HVS may not be able to distinguish color differences within the same ellipse. The Pointer's gamut may represent all diffusive colors that can be perceived by the HVS. In Macadam ellipse and Pointer's gamut, green colors are less important or less distinguishable/perceptible by the HVS than red and blue colors. Hence, in some operational scenarios, the specific optimized color primaries for the subset or sub-space in the R.2020 to represent the reshaped or reconstructed HDR images can be selected to cover the red and blue colors more than the green colors, especially when the one-to-one mapping relations cannot be supported by SDR-to-HDR and HDR-to-SDR mappings in the reshaping operations.

As used herein, color primaries may also be referred to as primary colors and may be used to define corners of a polygon such as a triangle representing a specific color space or gamut such as a standard-specified color space, a display-supported color space, a video-signal-supported color space, etc. For example, a standard color space with a standard-specified white point can be represented by a triangle whose corners are specified by three standard-specified color primaries in the CIExy color space coordinate system or CIExy chromaticity diagram. CIExy coordinates of the color primaries (red or R, green or G, blue or B) and white points respectively defining the R.709, P3 and R.2020 color spaces are specified in TABLE 1 below.

TABLE 1

| | R | G | B | White point |
|---|---|---|---|---|
| R.709 | (0.6400 0.3300) | (0.3000 0.6000) | (0.1500 0.0600) | (0.3127 0.3290) |
| P3 | (0.6800 0.3200) | (0.2650 0.6900) | (0.1500 0.0600) | (0.3127 0.3290) |
| R.2020 | (0.7080 0.2920) | (0.1700 0.7970) | (0.1310 0.0460) | (0.3127 0.3290) |

CIExy coordinates of color primaries of each of the standard color spaces in TABLE 1 and the corresponding white point may be denoted as $$\left(R_x^{(c)}, R_y^{(c)}\right), \left(G_x^{(c)}, G_y^{(c)}\right), \left(B_x^{(c)}, B_y^{(c)}\right) \text{ and } \left(W_x^{(c)}, W_y^{(c)}\right),$$

respectively, where (c) is the standard color space.

Hence, the P3 color space may be characterized by CIExy coordinates of the P3 color primaries and the P3 white point as follows:

$$\left(R_x^{(P3)}, R_y^{(P3)}\right), \left(G_x^{(P3)}, G_y^{(P3)}\right), \left(B_x^{(P3)}, B_y^{(P3)}\right), \left(W_x^{(P3)}, W_y^{(P3)}\right).$$

Similarly, the R.2020 color space may be characterized by CIExy coordinates of the R.2020 color primaries and the R.2020 white point as follows:

$$\left(R_x^{(R2020)}, R_y^{(R2020)}\right), \left(G_x^{(R2020)}, G_y^{(R2020)}\right),$$
$$\left(B_x^{(R2020)}, B_y^{(R2020)}\right), \left(W_x^{(R2020)}, W_y^{(R2020)}\right).$$

Denote a backward reshaped HDR color space for representing backward reshaped or reconstructed HDR images as an (a) color space. Hence, CIExy coordinates of the color primaries and white point defining the (a) color space may be denoted as $$\left(R_x^{(a)}, R_y^{(a)}\right), \left(G_x^{(a)}, G_y^{(a)}\right), \left(B_x^{(a)}, B_y^{(a)}\right) \text{ and } \left(W_x^{(a)}, W_y^{(a)}\right),$$

respectively.

As noted, green colors are less important or less distinguishable/perceptible by the HVS than red and blue colors. In some operational scenarios, the red and blue color primaries of the (a) color space may be selected to match those of the R.2020 color space, as follows:

$$R_x^{(a)} = R_x^{(R2020)} \tag{1-1}$$

$$R_y^{(a)} = R_y^{(R2020)} \tag{1-2}$$

$$B_x^{(a)} = B_x^{(R2020)} \tag{2-1}$$

$$B_y^{(a)} = B_y^{(R2020)} \tag{2-2}$$

In addition, like all the R.709, P3 and R.2020 color spaces that are specified with the D65 white points, the (a) color space can also be specified with the D65 white point, as follows:

$$\left(W_x^{(a)}, W_y^{(a)}\right) = (0.3127 \ 0.3290) \tag{3}$$

The green color primary of the (a) color space can be selected along the line between the green color primary $$\left(G_x^{(P3)}, G_y^{(P3)}\right)$$

of the P3 color space and the green color primary $$\left(G_x^{(R2020)}, G_y^{(R2020)}\right)$$

of the R.2020 color space in the CIExy coordinate system or chromaticity diagram. Any point along the line between the two green color primaries of the P3 color space and the R.2020 color space can be represented as a linear combination of these two green color primaries with a weight factor a, as follows:

$$G_x^{(a)} = aG_x^{(P3)} + (1-a)G_x^{(R2020)} \tag{4-1}$$

$$G_y^{(a)} = aG_y^{(P3)} + (1-a)G_y^{(R2020)} \tag{4-2}$$

Figure 2B:
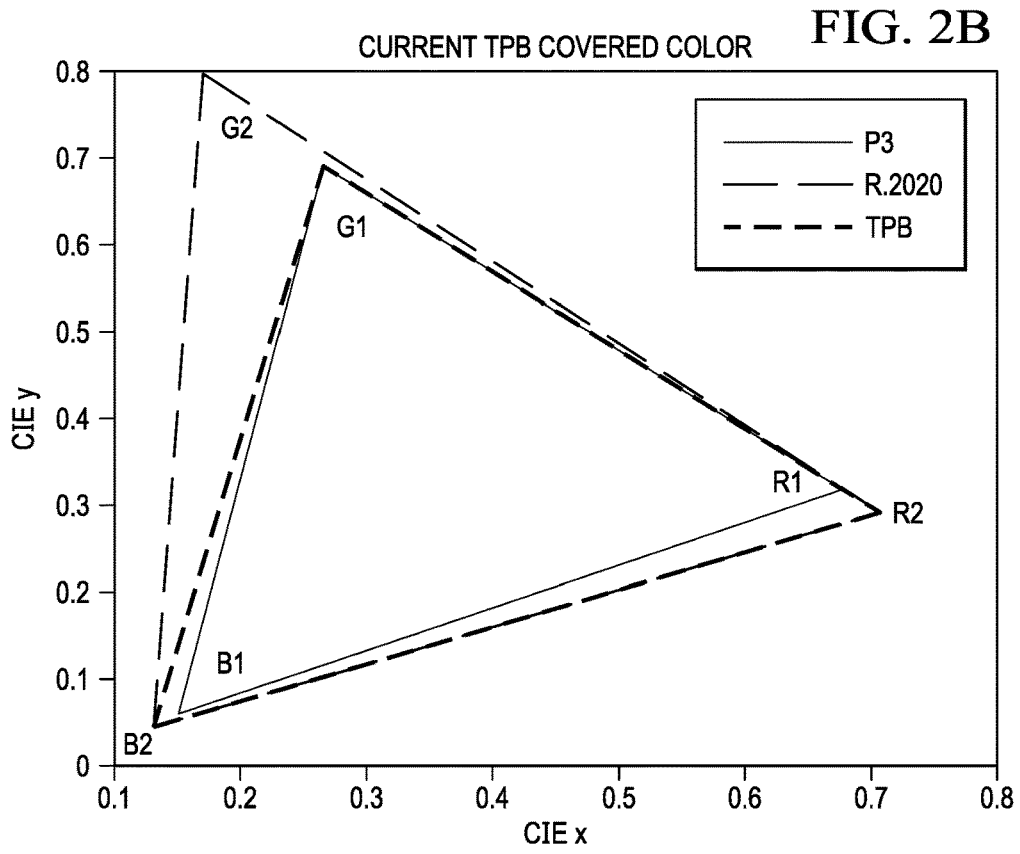
Figure 2C:
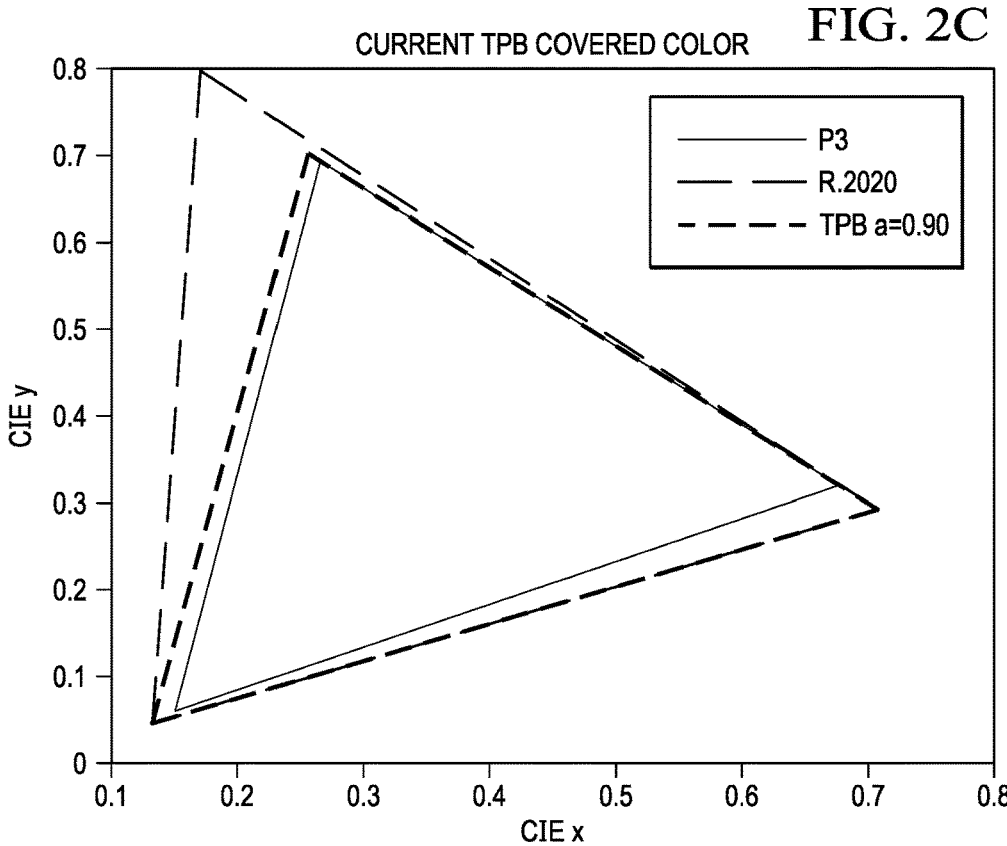
Figure 2D:
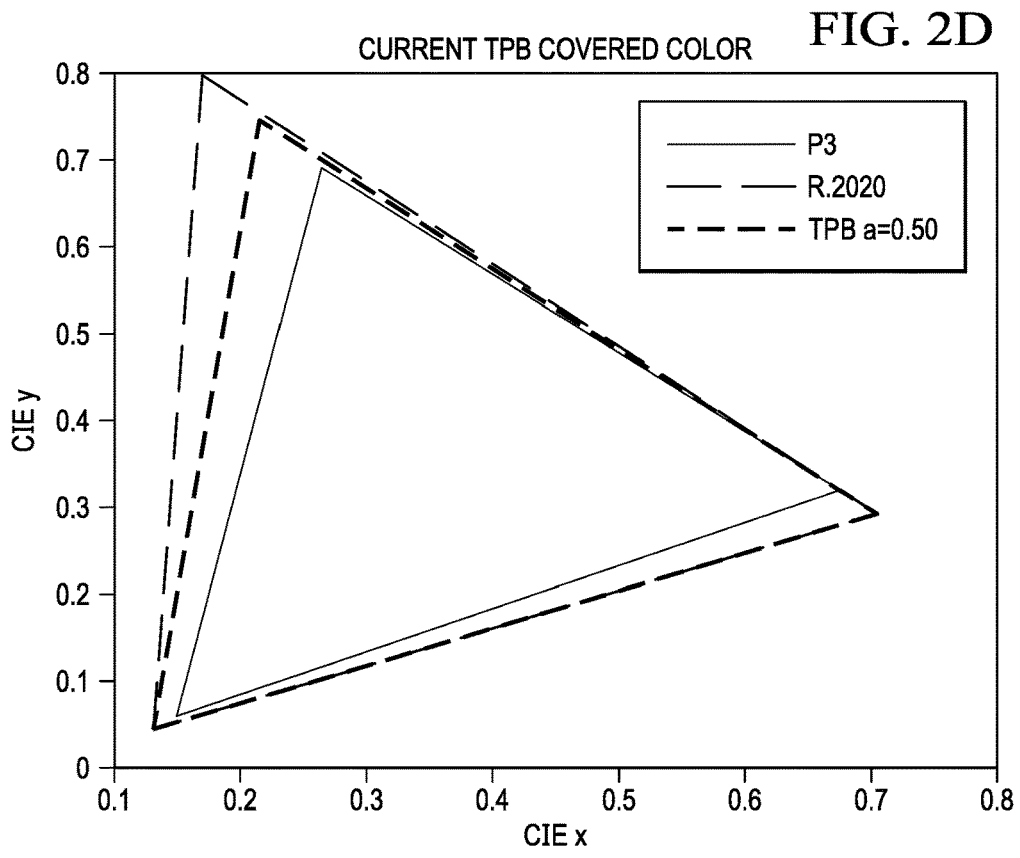
Figure 2E:
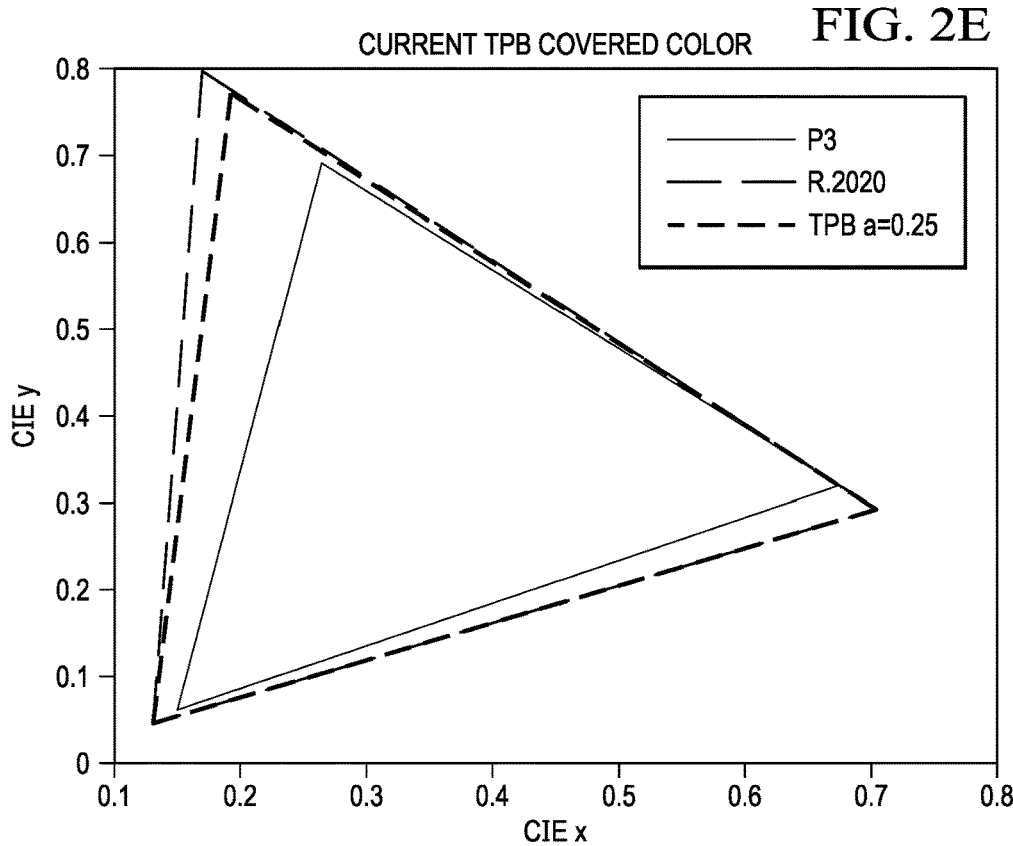

Hence, the optimization problem of finding the maximum support from the (a) color space for the R.2020 color space can be simplified as a problem to select the weight factor a. When a=0, the (a) color space becomes the entire R.2020 color space. When a=1, as illustrated in FIG. 2B (where the (a) color space is denoted as "TPB" or "current TPB covered color"), the red and blue corners or red and blue color primaries of the (a) color space are the same as the red and blue corners or red and blue color primaries of the R.2020 color space, whereas the green corner or green color primary of the (a) color space is the same as the green corner or green color primary in the P3 color space. FIG. 2C through FIG. 2E illustrate three example (a) color spaces for a=0.9, 0.5 and 0.25, respectively.

Joint Color Space and TPB Optimization

As the range or coverage by the backward reshaped (a) color space over the R.2020 color space may be controlled by the parameter a, an overall TPB (based reshaping) optimization problem becomes how to optimize TPB coefficients in both forward and backward paths, such that (i) the forward reshaped SDR domain (or color space) for representing reshaped SDR images is close to a reference SDR domain (or color space) for representing reference SDR images, especially in neutral colors or color space portions which are more sensitive to the HVS than non-neutral colors or color space portions, and (ii) the backward reshaped or reconstructed HDR domain (or color space) for representing backward reshaped or reconstructed HDR images is as closely identical as possible to the reference HDR domain (or color space) for representing reference HDR images. Ideally, the backward reshaped or reconstructed HDR images are identical to the reference HDR images if a perfect reconstruction or full revertability can be realized.

As illustrated in FIG. 2B through FIG. 2E, to cover as large the R.2020 color space as possible by the backward reshaped or reconstructed HDR domain or color space, the TPB optimization problem comes down to finding or searching for the smallest possible value for the parameter a such that the above SDR and HDR quality conditions are satisfied.

Figure 3A:
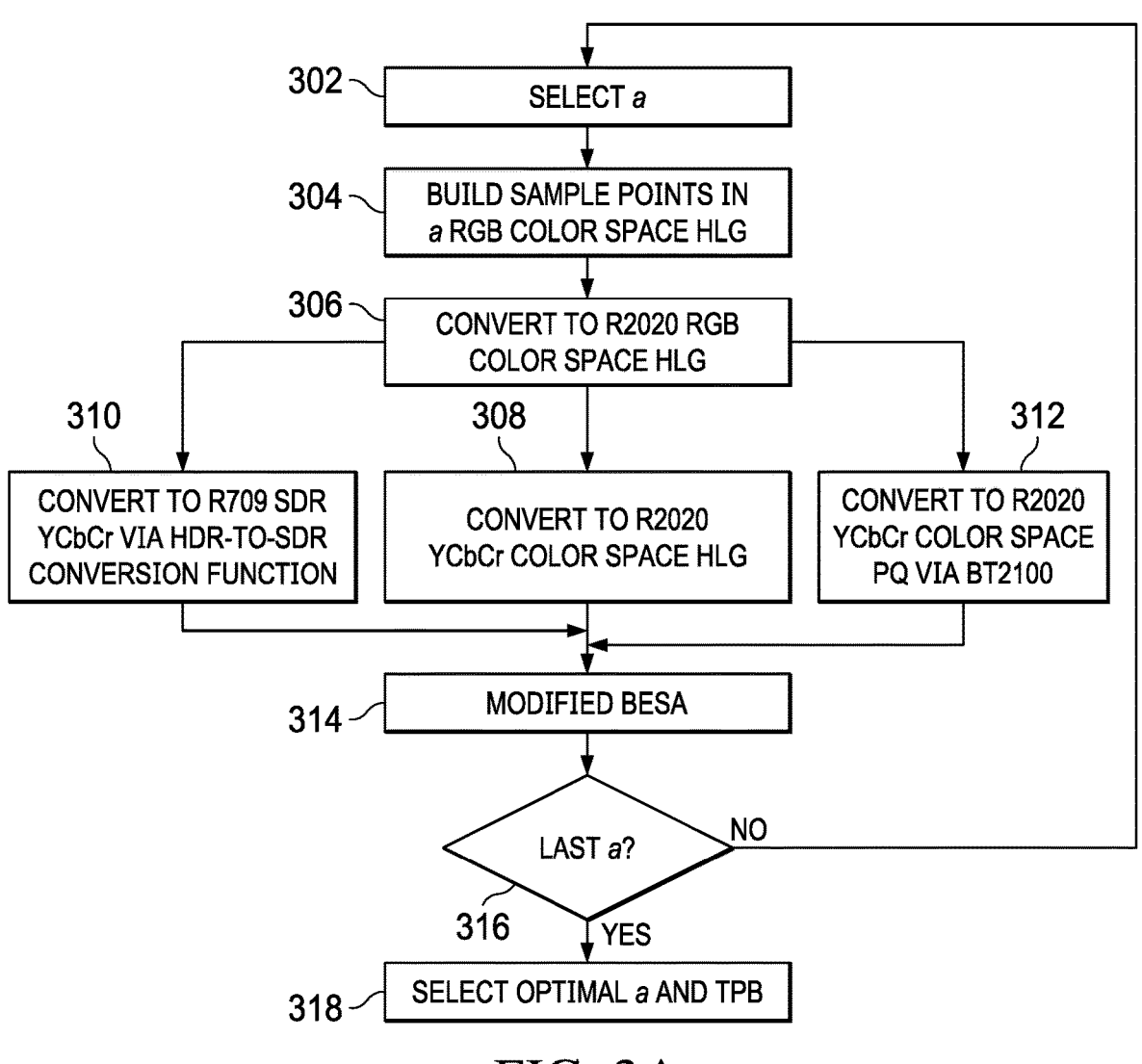
FIG. 3A and FIG. 3C illustrate example process flows for finding an optimized color space to represent HDR colors.

FIG. 3A illustrates an example process flow for finding the smallest possible value for the parameter a for the purpose of maximizing SDR and HDR quality in reshaped SDR and HDR images. The process flow of FIG. 3A may iterate through a plurality of candidate values for the parameter a in an iteration order which may be a sequential order or a non-sequential order.

Block 302 comprises selecting a current (e.g., to be iterated, etc.) value for the parameter a to the next candidate value (e.g., initially the first candidate value, etc.) in the plurality of candidate values for the parameter a. Given a candidate backward reshaped HDR color space with the current value for the parameter a, optimized reshaping operational parameters such as optimized TPB coefficients can be obtained in one or more subsequent process flow blocks of FIG. 3A.

Block 304 comprises building samples points, or prepare two sampled data sets, in the candidate backward reshaped HDR color space. By way of example but not limitation, the candidate backward reshaped HDR color space may be a Hybrid Log Gamma (HLG) RGB color space (referred to as the "(a) RGB color space HLG").

The first of the two sampled data set is a uniformly sampled data set of color patches. Each color patch in the uniformly sampled data set of color patches is characterized or represented by a respective RGB color (denoted as $$\hat{v}_{ijk}^{(u)})$$

uniformly sampled from the (a) RGB color space HLG, which includes three dimensions denoted as R-axis, G-axis, B-axis for R, G and B component colors, respectively. Each axis or dimension of the (a) RGB color space HLG is normalized to a value range of $[0, 1]$) and sampled by $N_R$, $N_G$, and $N_B$ units or divisions, respectively. Here, each of $N_R$, $N_G$, and $N_B$ represents a positive integer greater than one (1). Hence, the total number of color patches or sampled data points in the uniformly sampled data set of color patches is given as follows:

$$N_u = N_R N_G N_B \tag{4}$$

Each uniformly sampled data point or RGB color $$\hat{v}_{ijk}^{(u)}$$

in the uniformly sampled data set of color patches is given as follows:

$$\hat{v}_{ijk}^{(u)} = \left[ \frac{i}{N_R - 1} \quad \frac{j}{N_G - 1} \quad \frac{k}{N_B - 1} \right] \tag{5}$$

for $i \in [0, \ldots, N_R - 1]$, $j \in [0, \ldots, N_G - 1]$, $k \in [0, \ldots, N_B - 1]$ For simplicity, $(i, j, k)$ in expression (5) above can be vectorized or simply denoted as p. Correspondingly, the uniformly sampled data point or RGB color $$\hat{v}_{ijk}^{(u)}$$

can be simply denoted as $$\hat{v}_{p}^{(u)}.$$

All $N_u$ nodes (each of which represents a unique combination of a specific R-axis unit/partition, a specific B-axis unit/partition, a specific G-axis unit/partition) can be grouped or collected into a vector/matrix as follows:

$$\hat{V}^{(u)} = \begin{bmatrix} \hat{v}_0^{(u)} \\ \vdots \\ \hat{v}_{N_u-1}^{(u)} \end{bmatrix} \tag{6}$$

The second of the two sampled data set prepared or built in block 304 is a neutral color data set. This second data set includes a plurality of neutral colors or neutral color patches (also referred to as gray colors or gray color patches).

The second data set may be used to preserve input gray color patches in an input domain as output gray color patches in an output domain when the input gray color patches in the input domain are mapped or reshaped into the output gray color patches in reshaping operations as described herein. The input gray color patches in the input domain (or input color space) may be given increased weighting in the optimization problem as compared with other color patches to reduce the likelihood of these input gray color patches being mapped to non-gray color patches in the output domain (or output color space) by the reshaping operations.

The second data set—the gray color data set or the data set of gray colors—may be prepared or built by uniformly sampling the R, G, B values along the line connecting between a first gray color $(0, 0, 0)$ and a second gray color $(1, 1, 1)$ in the RGB domain (e.g., the (a) RGB color space HLG, etc.), giving rise to $N_n$ nodes or gray color patches, as follows:

$$\hat{v}_i^{(n)} = \left[ \frac{i}{N_n - 1} \quad \frac{i}{N_n - 1} \quad \frac{i}{N_n - 1} \right] \tag{7}$$

for $i \in [0, \ldots, N_n - 1]$

All the $N_n$ nodes in the second data set can be grouped or collected into a neutral color vector/matrix as follows:

$$\check{V}^{(n)} = \begin{bmatrix} \check{v}_0^{(n)} \\ \vdots \\ \check{v}_{N_n-1}^{(n)} \end{bmatrix} \qquad (8)$$

The neutral color vector/matrix in expression (8) above can be repeated $N_t$ (a positive integer no less than one (1)) times to generate $N_n N_t$ neutral color patches in the (now repeated) second data set, as follows:

$$\dot{V}^{(n)} = \begin{bmatrix} \check{V}^{(n)} \\ \vdots \\ \check{V}^{(n)} \end{bmatrix} \qquad (9)$$

The repetition of neutral colors in the repeated second data set of neutral colors increases weighting of the neutral or gray colors as compared with other colors. Accordingly, the neutral colors can be preserved more in the optimization problem than the other colors.

The first data set of (all sampled) colors and the second (repeated) data set of neutral colors in expressions (6) and (9) can be collected or placed together in a single combined vector/matrix, as follows:

$$\check{V}_{RGB}^{(a)} = \begin{bmatrix} \dot{V}^{(u)} \\ \dot{V}^{(n)} \end{bmatrix} \qquad (10)$$

The total number of vector/matrix elements (repeated and non-repeated color patches) in the combined vector/matrix $$\check{V}_{RGB}^{(a)}$$

is $N=N_n N_t + N_u$. Each vector/matrix element or color patch (row) in $$\check{V}_{RGB}^{(a)}$$

in expression (10) above may be denoted as follows:

$$\check{v}_i^{(a)} = \begin{bmatrix} \check{v}_{ir}^{(a)} & \check{v}_{ig}^{(a)} & \check{v}_{ib}^{(a)} \end{bmatrix} \qquad (11)$$

Block 306 comprises converting color values of the color patches (rows) represented in the vector/matrix elements of the combined vector/matrix $$\check{V}_{RGB}^{(a)}$$

in the (a) RGB color space (or the (a) RGB color space HLG) to corresponding color values in a standard-based R.2020 color space or an R.2020 RGB color space HLG.

The three red, green and blue primary colors in the (a) RGB color space HLG, which correspond to three corners or points of a triangle defining the (a) RGB color space HLG in the CIExy chromaticity diagram, can be converted from CIE xy values to CIE XYZ values via the following equations:

$$Y = 1 \qquad (12\text{-}1)$$

$$X = \frac{Y}{xy} \qquad (12\text{-}2)$$

$$Z = \frac{Y}{x(1-x-y)} \qquad (12\text{-}3)$$

Given $$\left(R_x^{(a)}, R_y^{(a)}\right), \left(G_x^{(a)}, G_y^{(a)}\right), \left(B_x^{(a)}, B_y^{(a)}\right)$$

as the red, green and blue primary colors in (x, y) or CIE xy values, the same red, green and blue primary colors in (X, Y, Z) or CIE XYZ values, respectively denoted as $$\left(R_X^{(a)}, R_Y^{(a)}, R_Z^{(a)}\right), \left(G_X^{(a)}, G_Y^{(a)}, G_Z^{(a)}\right), \left(B_X^{(a)}, B_Y^{(a)}, B_Z^{(a)}\right),$$

can be obtained using the conversion equations in expressions (12) above. Similarly, given $$\left(W_x^{(a)}, W_y^{(a)}\right)$$

as the white point in (x, y) or CIE xy values, the same white point in (X, Y, Z) or CIE XYZ values, denoted as $$\left(W_X^{(a)}, W_Y^{(a)}, W_Z^{(a)}\right),$$

can be obtained using the same conversion equations in expressions (12) above.

A 3×3 conversion matrix denoted as $P^{(a)\rightarrow XYZ}$ can be constructed to convert the color values of the color patches (rows) represented in the vector/matrix elements of the combined vector/matrix $$\check{V}_{RGB}^{(a)}$$

in (x, y) or CIE xy values to corresponding (X, Y, Z) or CIE XYZ values, as follows $$P^{(a)\rightarrow XYZ} = \left(W^{(a)\rightarrow XYZ} \otimes \check{P}^{(a)\rightarrow XYZ}\right)^T \qquad (13)$$

where $\otimes$ denotes elementwise dot multiplication between the two matrixes on the right hand side (RHS) in expression (13); and the two matrixes on the RHS in expression (13) can be constructed as follows:

$$\check{P}^{(a)\rightarrow XYZ} = \begin{bmatrix} R_X^{(a)} & R_Y^{(a)} & R_Z^{(a)} \\ G_X^{(a)} & G_Y^{(a)} & G_Z^{(a)} \\ B_X^{(a)} & B_Y^{(a)} & B_Z^{(a)} \end{bmatrix} \qquad (14)$$

$$W^{(a)\rightarrow XYZ} = \begin{bmatrix} \check{w}^{(a)\rightarrow XYZ} \\ \check{w}^{(a)\rightarrow XYZ} \\ \check{w}^{(a)\rightarrow XYZ} \end{bmatrix}^T \qquad (15)$$

-continued where $$\dot{w}^{(a)\rightarrow XYZ} = \begin{bmatrix} W_X^{(a)} & W_Y^{(a)} & W_Z^{(a)} \end{bmatrix} \tag{16-1}$$

$$\ddot{w}^{(a)\rightarrow XYZ} = \dot{w}^{(a)\rightarrow XYZ}(P^{(a)\rightarrow XYZ})^{-1} \tag{16-2}$$

An overall 3×3 conversion matrix denoted as $P^{(a)\rightarrow R2020}$ can be constructed to convert the color values of the color patches (rows) represented in the vector/matrix elements of the combined vector/matrix $$\tilde{V}_{RGB}^{(a)}$$

in the a RGB color space HLG to corresponding color values in the R.2020 RGB color space HLG, as follows:

$$P^{(a)\rightarrow R2020} = P^{(a)\rightarrow XYZ}P^{XYZ\rightarrow R2020} \tag{17}$$

where $P^{XYZ\text{-}R2020}$ denotes a 3×3 conversion matrix that converts XYZ color values to corresponding values in the R.2020 RGB color space HLG.

Hence, in block 306, the color values of the color patches (rows) represented in the vector/matrix elements of the combined vector/matrix $$\tilde{V}_{RGB}^{(a)}$$

in the a RGB color space (or the (a) RGB color space HLG) can be converted to the corresponding color values in a standard-based R.2020 color space or an R.2020 RGB color space HLG, as follows:

$$\tilde{V}_{RGB}^{(R2020)} = \tilde{V}_{RGB}^{(a)}P^{(a)\rightarrow R2020} \tag{18}$$

Block 308 comprises converting color values of the color patches (rows) represented in the vector/matrix elements of the vector/matrix $$\tilde{V}_{RGB}^{(R2020)}$$

in the R.2020 RGB color space HLG to corresponding color values (denoted as $$\tilde{V}_{YCbCr}^{(R2020)})$$

in an R.2020 YCbCr color space HLG, as follows:

$$\tilde{V}_{YCbCr}^{(R2020)} = f_{RGB\rightarrow YCbCr}^{R2020}(\tilde{V}_{RGB}^{(R2020)}) \tag{19}$$

where $$f_{RGB\rightarrow YCbCr}^{R2020}()$$

denotes a conversion function or matrix that converts the (R.2020 RGB) color values in the R.2020 RGB color space HLG to the corresponding (HDR R.2020 YCbCr) color values in the R.2020 YCbCr color space HLG.

Each color patch (row) in $$\tilde{V}_{YCbCr}^{(R2020)}$$

may be denoted as follows:

$$\tilde{v}_i^{(R2020)} = \begin{bmatrix} \tilde{v}_{i,Y}^{(R2020)} & \tilde{v}_{i,Cb}^{(R2020)} & \tilde{v}_{i,Cr}^{(R2020)} \end{bmatrix} \tag{20}$$

Block 310 comprises converting or content mapping color values of the color patches (rows) represented in the vector/matrix elements of the vector/matrix $$\tilde{V}_{RGB}^{(R2020)}$$

in the R.2020 RGB color space HLG to corresponding color values (denoted as $$\tilde{S}_{YCbCr}^{(R709)})$$

in an R.709 SDR YCbCr color space, as follows:

$$\tilde{S}_{RGB}^{(R709)} = f_{HLG\rightarrow W\_SDR}(\tilde{V}_{RGB}^{(R2020)}) \tag{21}$$

$$\tilde{S}_{YCbCr}^{(R709)} = f_{RGB\rightarrow YCbCr}^{R709}(\tilde{S}_{RGB}^{(R709)}) \tag{22}$$

where $f_{HLG\rightarrow W\_SDR}(\ )$ denotes a white box HDR-to-SDR mapping function that converts the HDR R.2020 RGB color values $$\tilde{V}_{RGB}^{(R2020)}$$

in the R.2020 RGB color space HLG to corresponding R.709 SDR RGB color values (denoted as $$\tilde{S}_{RGB}^{(R709)})$$

in the R.709 SDR RGB color space; and $$f_{RGB\rightarrow YCbCr}^{R709}()$$

denotes a conversion function or matrix that then converts the R.709 SDR RGB color values $$\tilde{s}_{RGB}^{(R709)}$$

in the R.709 SDR RGB color space to the corresponding color values $$\tilde{s}_{YCbCr}^{(R709)}$$

in the R.709 SDR YCbCr color space. A non-limiting example of the white box HDR-to-SDR mapping function is described in BT.2390-10, "High dynamic range television for production and international programme exchange," (November 2021), which is incorporated herein by reference in its entirety. Other examples of white-box HDR-to-SDR mapping functions may include, but are not necessarily limited to only, any of: standard based HDR-to-SDR conversion functions, proprietary HDR-to-SDR conversion functions, HDR-to-SDR conversion functions with linear and/or non-linear domains, HDR-to-SDR mapping functions using gamma functions, power functions, etc.

Each color patch (row) in $$\tilde{s}_{YCbCr}^{(R709)}$$

may be denoted as follows:

$$\tilde{s}_i^{(R709)} = \left[\; \tilde{s}_{i,Y}^{(R709)} \quad \tilde{s}_{i,Cb}^{(R709)} \quad \tilde{s}_{i,Cr}^{(R709)} \;\right] \qquad (23)$$

Block 312 comprises converting or content mapping color values of the color patches (rows) represented in the vector/matrix elements of the vector/matrix $$\tilde{V}_{RGB}^{(R2020)}$$

in the R.2020 RGB color space HLG to corresponding color values (denoted as $$\tilde{R}_{YCbCr}^{(R2020)})$$

in an R.2020 YCbCr color space PQ, as follows:

$$R_{RGB}^{(R2020)} = f_{HLG \to PQ}(\tilde{V}_{RGB}^{(R2020)}) \qquad (24)$$

$$\tilde{R}_{YCbCr}^{(R2020)} = f_{RGB \to YCbCr}^{R2020}(\tilde{R}_{RGB}^{(R2020)}) \qquad (25)$$

where $f_{HLG \to PQ}(\;)$ denotes an HLG-to-PQ conversion function that converts the HDR R.2020 RGB HLG color values $$\tilde{V}_{RGB}^{(R2020)}$$

in the R.2020 RGB color space HLG to corresponding HDR R.2020 RGB PQ color values (denoted as $$\tilde{R}_{RGB}^{(R2020)})$$

in the R.2020 HDR RGB color space PQ, for example using transfer functions described in the previously mentioned SMPTE 2084 and Rec. ITU-R BT.2100; and $$f_{RGB \to YCbCr}^{R2020}(\;)$$

denotes a conversion function or matrix that then converts the HDR R.2020 RGB PQ color values $$\tilde{R}_{RGB}^{(R2020)}$$

in the R.2020 HDR RGB color space PQ to the corresponding color values $$\tilde{s}_{YCbCr}^{(R709)}$$

in the R.2020 YCbCr color space PQ, for example using transfer functions described in the previously mentioned SMPTE 2084 and Rec. ITU-R BT.2100.

Each color patch (row) in $$\tilde{R}_{YCbCr}^{(R2020)}$$

may be denoted as follows $$\tilde{r}_i^{(R2020)} = \left[\; \tilde{r}_{i,Y}^{(R2020)} \quad \tilde{r}_{i,Cb}^{(R2020)} \quad \tilde{r}_{i,Cr}^{(R2020)} \;\right] \qquad (26)$$

Block 314 comprises taking $$\tilde{V}_{YCbCr}^{(R2020)}, \tilde{s}_{YCbCr}^{(R709)}, \text{ and } \tilde{R}_{YCbCr}^{(R2020)}$$

as input to a (TPB) BESA algorithm, which may be enhanced or modified with neutral color preservation, to obtain or generate forward and backward reshaping operational parameters such as forward and backward TPB coefficients.

A BESA algorithm is an iterative algorithm in which each current iteration may modify a reference SDR signal according to backward prediction errors measured or determined in a previous iteration.

A modified BESA algorithm as described herein may implement neutral color preservation and avoid modifying neutral color patches. To do so, a set of neutral color patch indexes that identify or correspond to neutral color patches may be generated as follows:

$$\Phi = \left\{ i \mid \left| \bar{v}_{i,Cb}^{(R2020)} - 0.5 \right| \le \delta \text{ and } \left| \bar{v}_{i,Cr}^{(R2020)} - 0.5 \right| \le \delta \right\} \quad (27)$$

where $\delta$ represents a neutral color value threshold that determines or specifies a maximum range of color deviation in absolute values within which color values qualify as neutral colors. Example values for the neutral color value threshold $\delta$ may include, but are not necessarily limited to only, any of: 1/2048, 1/1024, etc.

Let ch denote a channel in (e.g., three channels of, etc.) the forward reshaped SDR domain or color space. Let F denote forward reshaping or forward path. Let B denote backward reshaping or backward path.

A per-channel forward generation matrix (also referred to as a design matrix) denoted as SF can be used to predict forward reshaped SDR color patches as characterized by corresponding forward reshaped SDR codewords from input HDR color patches $$\bar{V}_{YCbCr}^{(R2020)}$$

as characterized by corresponding input HDR codewords derived with expression (19). The forward generation matrix can be generated or pre-calculated from cross-channel forward TPB basis functions $$B_{F,0}^{ch}()$$

through $$B_{F,D_F^{ch}-1}^{ch}(),$$

stored or cached in computer memory, and fixed in all iterations for the forward path, as follows:

$$S_F^{ch} = \begin{bmatrix} B_{F,0}^{ch}\left(\bar{v}_{0,Y}^{(R2020)}, \bar{v}_{0,Cb}^{(R2020)}, \bar{v}_{0,Cr}^{(R2020)}\right) & B_{F,1}^{ch}\left(\bar{v}_{0,Y}^{(R2020)}, \bar{v}_{0,Cb}^{(R2020)}, \bar{v}_{0,Cr}^{(R2020)}\right) & \cdots & B_{F,D_F^{ch}-1}^{ch}\left(\bar{v}_{0,Y}^{(R2020)}, \bar{v}_{0,Cb}^{(R2020)}, \bar{v}_{0,Cr}^{(R2020)}\right) \\ B_{F,0}^{ch}\left(\bar{v}_{1,Y}^{(R2020)}, \bar{v}_{1,Cb}^{(R2020)}, \bar{v}_{1,Cr}^{(R2020)}\right) & B_{F,1}^{ch}\left(\bar{v}_{1,Y}^{(R2020)}, \bar{v}_{1,Cb}^{(R2020)}, \bar{v}_{1,Cr}^{(R2020)}\right) & \cdots & B_{F,D_F^{ch}-1}^{ch}\left(\bar{v}_{1,Y}^{(R2020)}, \bar{v}_{1,Cb}^{(R2020)}, \bar{v}_{1,Cr}^{(R2020)}\right) \\ \vdots & \vdots & & \vdots \\ B_{F,0}^{ch}\left(\bar{v}_{N-1,Y}^{(R2020)}, \bar{v}_{N-1,Cb}^{(R2020)}, \bar{v}_{N-1,Cr}^{(R2020)}\right) & B_{F,1}^{ch}\left(\bar{v}_{N-1,Y}^{(R2020)}, \bar{v}_{N-1,Cb}^{(R2020)}, \bar{v}_{N-1,Cr}^{(R2020)}\right) & \cdots & B_{F,D_F^{ch}-1}^{ch}\left(\bar{v}_{N-1,Y}^{(R2020)}, \bar{v}_{N-1,Cb}^{(R2020)}, \bar{v}_{N-1,Cr}^{(R2020)}\right) \end{bmatrix} \quad (28)$$

where the cross-channel forward TPB basis functions $$B_{F,0}^{ch}()$$

through $$B_{F,D_F^{ch}-1}^{ch}()$$

take or accept the color patches (or rows) in $$\bar{V}_{YCbCr}^{(R2020)}$$

as shown in expression (20) above as input parameters.

The forward reshaped SDR color patches may be predicted by multiplying the forward generation matrix in expression (28) with forward TPB coefficients. Example prediction reshaped codewords (which are equivalent or similar to color patches herein) with TPB coefficients are described in in the previously mentioned U.S. Provisional Patent Application Ser. No. 62/908,770.

The forward reshaped SDR color patches or codewords can be backward reshaped into backward reshaped HDR color patches or codewords, for example through TPB based backward reshaping operations.

In the backward path, at each iteration (e.g., k-th iteration, etc.) in the BESA algorithm, a per-channel backward generation matrix denoted as $$S_B^{ch,(k)}$$

can be used to predict backward reshaped HDR color patches as characterized by corresponding backward reshaped HDR codewords from the forward reshaped SDR color patches as characterized by the corresponding forward reshaped SDR codewords derived in the forward path. A backward generation matrix for each iteration can be generated from cross-channel forward TPB basis functions $$B_{B,0}^{ch}()$$

through $$B_{B,D_B^{ch}-1}^{ch}(),$$

and not fixed in all iterations for the backward path, as follows:

$$S_B^{ch,(k)} = \begin{bmatrix} B_{B,0}^{ch}\left(\hat{s}_{0,Y}^{(R709),(k)}, \hat{s}_{0,Cb}^{(R709),(k)}, \hat{s}_{0,Cr}^{(R709),(k)}\right) & B_{B,1}^{ch}\left(\hat{s}_{0,Y}^{(R709),(k)}, \hat{s}_{0,Cb}^{(R709),(k)}, \hat{s}_{0,Cr}^{(R709),(k)}\right) & \cdots & B_{B,D_B^{ch}-1}^{ch}\left(\hat{s}_{0,Y}^{(R709),(k)}, \hat{s}_{0,Cb}^{(R709),(k)}, \hat{s}_{0,Cr}^{(R709),(k)}\right) \\ B_{B,0}^{ch}\left(\hat{s}_{1,Y}^{(R709),(k)}, \hat{s}_{1,Cb}^{(R709),(k)}, \hat{s}_{1,Cr}^{(R709),(k)}\right) & B_{B,1}^{ch}\left(\hat{s}_{1,Y}^{(R709),(k)}, \hat{s}_{1,Cb}^{(R709),(k)}, \hat{s}_{1,Cr}^{(R709),(k)}\right) & \cdots & B_{B,D_B^{ch}-1}^{ch}\left(\hat{s}_{1,Y}^{(R709),(k)}, \hat{s}_{1,Cb}^{(R709),(k)}, \hat{s}_{1,Cr}^{(R709),(k)}\right) \\ \vdots & \vdots & & \vdots \\ B_{B,0}^{ch}\left(\hat{s}_{N-1,Y}^{(R709),(k)}, \hat{s}_{N-1,Cb}^{(R709),(k)}, \hat{s}_{N-1,Cr}^{(R709),(k)}\right) & B_{B,1}^{ch}\left(\hat{s}_{N-1,Y}^{(R709),(k)}, \hat{s}_{N-1,Cb}^{(R709),(k)}, \hat{s}_{N-1,Cr}^{(R709),(k)}\right) & \cdots & B_{B,D_B^{ch}-1}^{ch}\left(\hat{s}_{N-1,Y}^{(R709),(k)}, \hat{s}_{N-1,Cb}^{(R709),(k)}, \hat{s}_{N-1,Cr}^{(R709),(k)}\right) \end{bmatrix} \tag{29}$$

where $$\hat{s}_{0,Y}^{(R709),(k)}, \hat{s}_{0,Cb}^{(R709),(k)}, \hat{s}_{0,Cr}^{(R709),(k)}$$

through $$\hat{s}_{N-1,Y}^{(R709),(k)}, \hat{s}_{N-1,Cb}^{(R709),(k)}, \hat{s}_{N-1,Cr}^{(R709),(k)}$$

represent the forward reshaped SDR color patches or codewords.

The backward reshaped HDR color patches may be predicted by multiplying the backward generation matrix in expression (29) with backward TPB coefficients.

Backward prediction errors for each iteration in the BESA algorithm can be determined by comparing the backward reshaped HDR color patches or codewords collected in a vector/matrix with reference HDR color patches or codewords in a per-channel backward observation vector/matrix derived from expression (25). The per-channel backward observation vector/matrix can be generated or pre-calculated from expression (25), stored or cached in computer memory, and fixed in all iterations, as follows:

$$r_B^{ch} = \begin{bmatrix} \hat{r}_{0,ch}^{(R2020)} \\ \hat{r}_{1,ch}^{(R2020)} \\ \vdots \\ \hat{r}_{N-1,ch}^{(R2020)} \end{bmatrix} \tag{30}$$

A reference SDR signal or reference SDR color patches or codewords may be used as prediction targets for the forward reshaping operations to generate the forward reshaped SDR color patches or codewords to approximate the reference SDR color patches or codewords. In the BESA algorithm, the reference SDR color patches or codewords $$\left\{\hat{s}_{i,ch}^{(R709),(k)}\right\}$$

where k denotes an iteration index starting from zero (0) as the first iteration in the BESA algorithm—may be initialized to the SDR color patches or codewords derived with expression (22) above for the very first iteration (k=0), and thereafter may be modified at the end of each iteration based in part or in whole on the prediction errors determined for the iteration. The modified reference SDR color patches or codewords may be used in the next iteration in the BESA algorithm as prediction targets for the forward reshaping operations to generate the forward reshaped SDR color patches or codewords to approximate the modified reference SDR color patches or codewords Per-channel reference SDR color patches or codewords at iteration k may be used to construct a vector/matrix $$r_F^{ch,(k)}$$

as follows:

$$r_F^{ch,(k)} = \begin{bmatrix} \hat{s}_{0,ch}^{(R709),(k)} \\ \hat{s}_{1,ch}^{(R709),(k)} \\ \vdots \\ \hat{s}_{N-1,ch}^{(R709),(k)} \end{bmatrix} \tag{31}$$

Before the first iteration, the vector in expression (31) above is set to the original reference SDR signal represented by expressions (22) and (23), as follows:

$$r_F^{ch,(0)} = \begin{bmatrix} \hat{s}_{0,ch}^{(R709)} \\ \hat{s}_{1,ch}^{(R709)} \\ \vdots \\ \hat{s}_{N-1,ch}^{(R709)} \end{bmatrix} \tag{32}$$

At iteration k, optimized values for the (e.g., per-channel, etc.) forward TPB coefficients (denoted as $$m_F^{ch,(k)})$$

can be generated via a least squared solution to an optimization problem that minimizes differences between the forward reshaped SDR color patches or codewords and the reference SDR color patches or codewords determined for the iteration, as follows:

$$m_F^{ch,(k)} = \left(\left(S_F^{ch}\right)^T \left(S_F^{ch}\right)\right)^{-1} \left(\left(S_F^{ch}\right)^T r_F^{ch,(k)}\right) \tag{33}$$

The predicted SDR color patches or codewords at iteration k for channel ch can be computed from the optimized values for the (e.g., per-channel, etc.) forward TPB coefficients, as follows:

$$\hat{r}_F^{ch,(k)} = S_F^{ch} m_F^{ch,(k)} = \begin{bmatrix} \hat{s}_{0,ch}^{(R709),(k)} \\ \hat{s}_{1,ch}^{(R709),(k)} \\ \vdots \\ \hat{s}_{N-1,ch}^{(R709),(k)} \end{bmatrix} \tag{34}$$

At iteration k, optimized values for the (e.g., per-channel, etc.) backward TPB coefficients (denoted as $$m_B^{ch,(k)})$$

can be generated via a least squared solution to an optimization problem that minimizes differences between the backward reshaped HDR color patches or codewords and the reference HDR color patches or codewords, the latter of which are fixed for all the iterations in the BESA algorithm, as follows:

$$m_B^{ch,(k)} = \left(\left(S_B^{ch,(k)}\right)^T \left(S_B^{ch,(k)}\right)\right)^{-1} \left(\left(S_B^{ch,(k)}\right)^T r_B^{ch}\right) \quad (35)$$

The predicted HDR color patches or codewords at iteration k for channel ch can be computed from the optimized values for the (e.g., per-channel, etc.) backward TPB coefficients, as follows:

$$\hat{r}_B^{ch,(k)} = S_B^{ch,(k)} m_B^{ch,(k)} = \begin{bmatrix} \hat{v}_{0,ch}^{(R2020),(k)} \\ \hat{v}_{0,ch}^{(R2020),(k)} \\ \hat{v}_{0,ch}^{(R2020),(k)} \\ \vdots \\ \hat{v}_{N-1,ch}^{(R2020),(k)} \end{bmatrix} \quad (36)$$

Compute backward prediction error and propagate error back to reference non-neutral SDR signal.

As noted, the backward prediction errors for each iteration in the BESA algorithm can be determined by comparing the backward reshaped HDR color patches or codewords with the reference HDR color patches or codewords derived from expression (25) the latter of which are fixed for all the iterations in the BESA algorithm.

Among the backward prediction errors, backward prediction errors for non-neutral colors (or non-gray colors) can be propagated back to update or modify the reference SDR color patches or codewords for these non-neutral colors (or non-gray colors). The modified SDR color patches or codewords for the non-neutral colors (or non-gray colors) can be combined with the (non-modified) reference SDR color patches or codewords for the neutral colors (or gray colors) to serve as prediction target for the forward path in the next or upcoming iteration in the BESA algorithm.

In some operational scenarios, the backward prediction error can be computed as differences between the original or reference HDR signal (or the reference HDR color patches/ codewords therein) and a predicted HDR signal (or the backward reshaped HDR color patches/codewords therein) at iteration k, as follows:

$$e_{i,ch}^{(k)} = \hat{v}_{i,ch}^{(R2020),(k)} - \hat{r}_{i,ch}^{(R2020)} \quad (37)$$

In response to determining that a color patch i is in the neutral color set $\Phi$, reference SDR codewords for the color patch in the Cb and Cr channels of the reference SDR signal for the upcoming iteration (k+1) can be set to gray color values such as 0.5, as follows:

$$\hat{s}_{i,Cb}^{(R709),(k+1)} = 0.5 \text{ and } s_{i,Cb}^{(R709),(k+1)} = 0.5 \quad (38)$$

Otherwise, in response to determining that a color patch i is not in the neutral color set $\Phi$, the reference SDR codewords for the color patch in the Cb and Cr channels of the reference SDR signal for the upcoming iteration (k+1) can be set to updated or modified values according to the backward prediction errors, as follows:

$$f\left(e_{i,ch}^{(k)}\right) = \min\{\left(e_{i,ch}^{(k)} \mid > \varepsilon\right)? \alpha^{ch} e_{i,ch}^{(k)} : 0, \lambda\} \quad (39)$$

$$\hat{s}_{0,ch}^{(R709),(k+1)} = \hat{s}_{0,ch}^{(R709),(k)} + f\left(e_{i,ch}^{(k)}\right) \quad (40)$$

where $\varepsilon$ represents a backward prediction error threshold above which a backward prediction error is enabled to be propagated to update the color patch of a non-neutral color; $\alpha^{ch}$ represents a fixed or configurable learning rate to scale the backward prediction error; $\lambda$ represents an upper bound or maximum allowed value to modify the reference codewords for the color patch of the non-neutral color. An example value of $\varepsilon$ may, but is not necessarily limited to only, 0.000005. An example value of $\alpha^{ch}$ may, but is not necessarily limited to only, 1. An example value of $\lambda$ may, but is not necessarily limited to only, 2. (which means no limit as SDR and/or HDR codewords herein may be normalized to a normalized domain or range of 0 to 1).

The neutral color preservation as enforced with expressions (38) through (40) can be used to ensure neutral colors in the reference SDR signal for all the iterations in the BESA algorithm from deviating to or toward non-neutral color. As a result, gray level related perceptual qualities in reshaped images are improved.

The BESA algorithm may be iterated up to a total number of iterations. In some operational scenarios, the total number of iterations for the BESA algorithm may be specifically selected to balance color deviations in reshaped SDR and/or HDR images. For example, different total numbers of iterations in the BESA algorithm may generate forward and backward TPB coefficients that produce reshaped SDR images of different SDR looks and reshaped HDR images of different HDR looks. A total number of iterations such as ten, fifteen, etc., that generate reshaped SDR and HDR images of relatively high quality looks can be selected for the BESA algorithm.

The BESA algorithm with neutral color preservation can be performed for each candidate value for the parameter a. For example, in block 314, the BESA algorithm with neutral color preservation can be performed for the current candidate value for the parameter a.

Block 316 comprises determining whether the current candidate value for the parameter a is the last candidate value in the plurality of candidate values for the parameter a. If so, the process flow goes to block 318. Otherwise, the process flow goes back to block 302.

Block 318 comprises selecting an optimal or optimized value for the parameter a as well as computing (or simply selecting already computed) the optimized forward and backward TPB coefficients for the (a) RGB color space corresponding to the optimized value for the parameter a.

The selection of the optimized value for the parameter a can be formulated as an optimization problem to find (a specific value set for)

$$\{a, m_{F,a}^{ch}, m_{B,a}^{ch}\}$$

US 12,620,064 B2

35
36 such that (1) the (a) RGB color space represents the largest HDR color space (e.g., to cover the largest portion of R.2020 RGB color space, etc.) to achieve minimized HDR prediction errors denoted as $$D_{HDR}\left(r_B^{ch}, \hat{r}_B^{ch}\right),$$

and (2) forward reshaped SDR color patches or codewords have relatively small or acceptable SDR color deviations denoted as $$D_{SDR}\left(r_F^{ch}, \hat{r}_F^{ch}\right),$$

as follows:

$$\underset{\{a, m_{F,a}^{ch}, m_{B,a}^{ch}\}}{\operatorname{argmin}} \left(w \cdot D_{HDR}\left(r_B^{ch}, \hat{r}_B^{ch}\right) + (1-w) \cdot D_{SDR}\left(r_F^{ch}, \hat{r}_F^{ch}\right)\right) \quad (41)$$

where w is a weighting factor used to balance between HDR and SDR errors.

This optimization problem can be solved by checking results from each a RGB color space using its corresponding optimal or optimized TPB coefficients $$m_{F,a}^{ch} \text{ and } m_{B,a}^{ch}.$$

Among all possible or candidate a values, the smallest a value (corresponding to the largest color space coverage in the R.2020 color space) that can achieve minimized HDR errors with relatively small SDR errors. The HDR prediction errors $$D_{HDR}\left(r_B^{ch}, \hat{r}_B^{ch}\right)$$

and the SDR color deviations $$D_{SDR}\left(r_F^{ch}, \hat{r}_F^{ch}\right)$$

may be subjective (e.g., with input from human observers, etc.) or objective distortion functions (e.g., with no or little input from human observers, etc.), such as those measured with an image dataset from a database. Example distortion functions may include, but are not necessarily limited to only, any of: mean squared error (or deviation) or MSE, root mean squared error (or deviation) or RMSE, sum of absolute difference or SAD, peak signal-to-noise ratio or PSNR, structural similarity index (SSIM), etc.

Figure 2F:
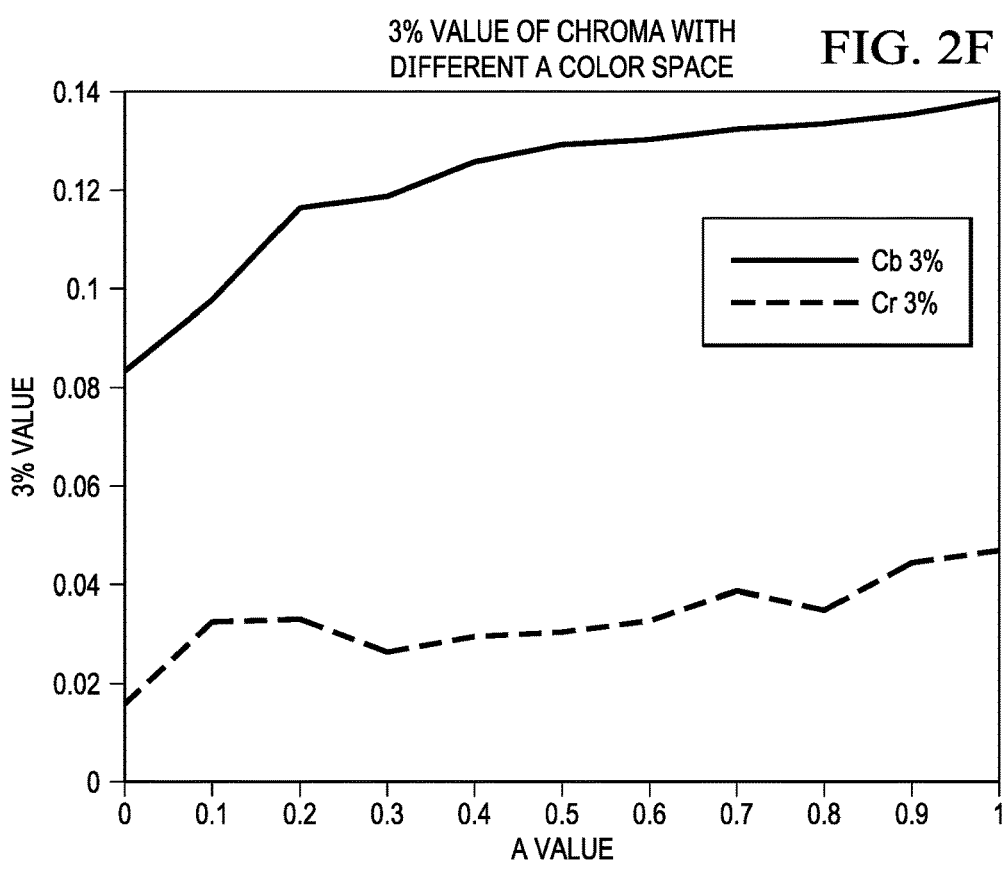
FIG. 2F and FIG. 2G illustrate example percentile Cb and Cr values in forward reshaped SDR color spaces corresponding to different parameterized HDR color spaces.
Figure 2G:
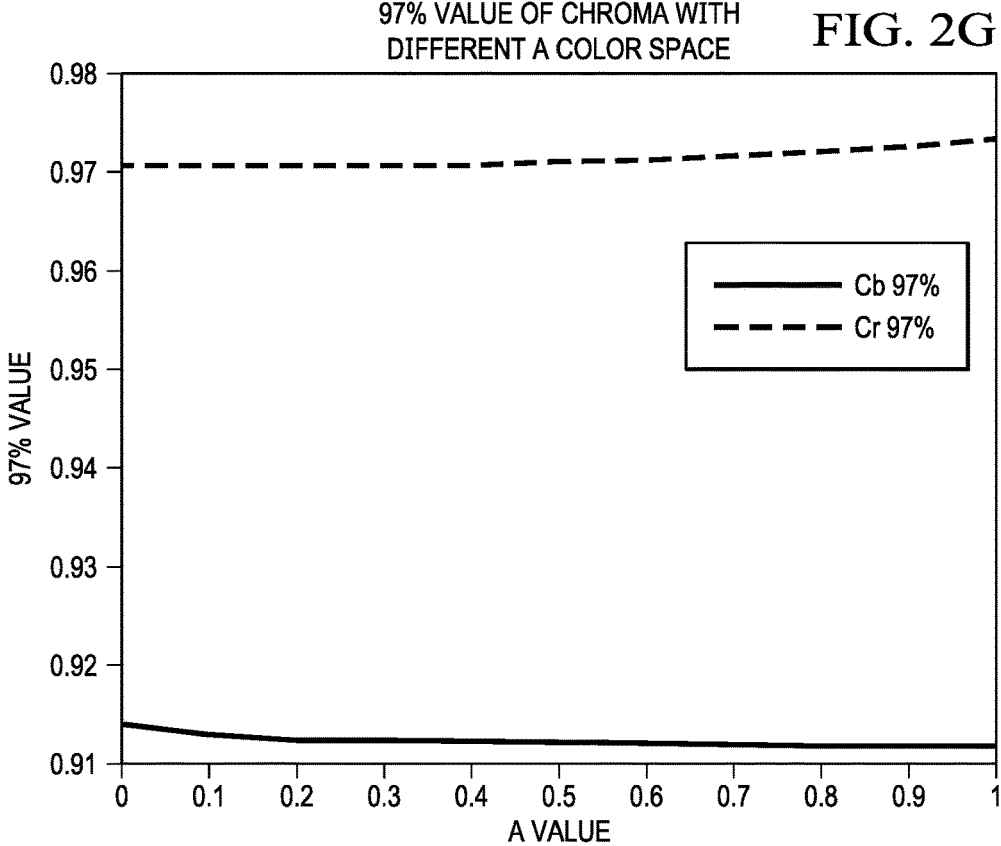

FIG. 2F and FIG. 2G illustrate example percentile Cb and Cr values in the forward reshaped SDR domain or color space for different values of the parameter a. Different values of the parameter a determine different color space coverages of the backward reshaped HDR domain or color space in the R.2020 domain or color space, and hence impact differently reconstruction or generation of backward reshaped HDR images in the R.2020 domain or color space and result in different distortions—e.g., as represented or measured with the distortion measures $$D_{HdR}\left(r_B^{ch}, \hat{r}_B^{ch}\right)$$

of the backward reshaped HDR images as compared with reference HDR images which the backward reshaped HDR images are to approximate.

The vertical axis of FIG. 2F represents 3 percentile values in the Cb and Cr channels in the forward reshaped SDR domain for different values (e.g., obtained with the BESA algorithm with neutral color preservation for ten iterations, etc.) for the parameter a value as represented by the horizontal axis of FIG. 2F. The lower the value for the parameter a is, the larger in the R.2020 color space the a color space covers. The 3 percentile values may be used explicitly or implicitly to represent minimum values in the Cb and Cr channels of the forward reshaped SDR (e.g., YCbCr, etc.) domain or color space. The smaller the 3 percentile values are, the smaller the minimum values are and hence the more extended the codeword value ranges in the forward reshaped SDR (YCbCr) domain or color space are. As it can be seen in FIG. 2F, the lower the value for the parameter a is, the lower the 3 percentile values in the Cb and Cr channels of the forward reshaped SDR (e.g., YCbCr, etc.) domain or color space are.

The vertical axis of FIG. 2G represents 97 percentile values in the Cb and Cr channels in the forward reshaped SDR domain for different values (e.g., obtained with the BESA algorithm with neutral color preservation for ten iterations, etc.) for the parameter a value as represented by the horizontal axis of FIG. 2G. The 97 percentile values may be used explicitly or implicitly to represent maximum values in the Cb and Cr channels of the forward reshaped SDR (e.g., YCbCr, etc.) domain or color space. The larger the 97 percentile values are, the larger the maximum values are and hence the more extended the codeword value ranges in the forward reshaped SDR (YCbCr) domain or color space are. As it can be seen in FIG. 2G, the 97 percentile values in both the Cb and Cr channels of the forward reshaped SDR domain or color space maintain near constant values.

In some operational scenarios, in block 318, the image dataset used to determine distortions in the reshaped SDR and HDR images and select the optimized value for the parameter a based in part or in whole on the distortions may include video bitstreams acquired with one or more specific video capturing devices such as mobile phone(s) (e.g., supporting video coding profiles in SMPTE ST 2094, supporting Dolby Vision Profile 8.4, etc.). A non-limiting example of the optimized value for the parameter a may, but is not necessarily limited to only, 0.5, which determines the largest color space coverage in the R.2020 color space for the backward reshaped HDR domain or color space. As a wider backward reshaped color space (e.g., corresponding to a value less than the optimized value for the parameter a, etc.) is used or supported, reshaped SDR colors and codewords can start to deviate from reference SDR colors and codewords with relatively large distortions. This is because increasing the backward reshaped HDR domain or color space means squeezing distinguished forward reshaped SDR colors (or codewords) more tightly into the forward reshaped SDR domain or color space, leading to move the forward reshaped SDR colors from original 3D positions represented in reference SDR colors (or codewords) to be approximated by the forward reshaped SDR colors.

As noted, forward and backward TPB coefficient for TPB based reshaping operations can be determined for a given value such as the optimized value for the parameter a. These TPB coefficients can be multiplied in math equations with a forward or backward generation matrix constructed with TPB basis functions using input codewords as input parameters to generate forward or reshaped codewords, which may entail performing numerous computations involving computing TPB basis function values for each pixel in numerous pixels of an image.

In some operational scenarios, to speed up or reduce computations, forward and backward 3D-LUTs may be constructed from pre-computed TPB basis function values from sampled values and the optimized forward and backward TPB coefficients that are generated for the optimized value for the parameter a. The forward and backward 3D-LUTs or lookup nodes/entries therein may be pre-built, before deployed at runtime to process input images, and applied with relatively simple lookup operations in the forward and backward paths or corresponding forward and backward reshaping operations performed therein with respect to the input images at the runtime.

Denote the optimized value for the parameter a as $a^{opt}$. Denote the corresponding optimal forward and backward TPB coefficients as $$m_F^{ch,opt} \text{ and } m_B^{ch,opt},$$

respectively.

The forward 3D-LUT can be used to forward reshape input HDR colors (or codewords) in an input HDR domain or color space such as the R.2020 domain or color space (in which the a color space is contained) into forward reshaped SDR colors (or codewords) in the forward reshaped SDR domain or color space.

The a color space identified inside the input HDR domain or color space such as the R 2020 (container) domain or color space may be used to clip out HDR colors or codewords represented outside the a color space. The forward TPB coefficients can be applied to input HDR colors or codewords in the a color space identified inside the input HDR domain or color space such as the R 2020 (container) domain or color space to generate predicted or forward reshaped SDR colors or codewords for each lookup node or entry in the forward 3D-LUT. As a result, the forward 3D-LUT includes a plurality of lookup nodes or entries each of which maps or forward reshapes a respective input (cross-channel or three-channel) HDR color or codeword to a corresponding predicted or forward reshaped (cross-channel or three-channel) SDR color or codeword.

In some operational scenarios, a forward 3D-LUT construction process includes a first step in which a 3D uniformly sampling grid is prepared in the input HDR domain or color space such as the R 2020 (container) domain or color space.

By way of illustration but not limitation, the input HDR domain or color space the R.2020 YCbCr color space HLG, which includes three dimensions or channels, namely Y-axis, Cb-axis, Cr-axis. Input HDR values (denoted as $$\check{v}_{ijk}^{(FL),(R2020)})$$

made up of normalized values in a value range of [0, 1] in each of the axes can be uniformly sampled in each dimension or channel, as follows:

$$\check{v}_{ijk}^{(FL),(R2020)} = \left[ \frac{i}{N_Y - 1} \quad \frac{j}{N_{Cb} - 1} \quad \frac{k}{N_{Cr} - 1} \right] \tag{42}$$

$$i \in [0, \ldots, N_Y - 1], j \in [0, \ldots, N_{Cb} - 1], k \in [0, \ldots, N_{Cr} - 1]$$

where total numbers of per-axis sampled values along YCbCr axes are denoted as $N_Y$, $N_{Cb}$, and $N_{Cr}$, respectively. Hence, the combined total number of sampled values in all these axes are $N_u = N_Y N_{Cb} N_{Cr}$.

While valid values in the entire R.2020 YCbCr color space may be limited (not to cover the entire 3D cube of YCbCr values), the entire sampling value grid may be used to cover the entire 3D cube of YCbCr values in order to reduce the likelihood of codeword deviations caused by compression operations.

For simplicity, (i, j, k) may be vectorized or denoted as p. Hence, the sampled values $$\check{v}_{ijk}^{(FL),(R2020)}$$

in the R.2020 YCbCr may be denoted as $$\check{v}_p^{(FL),(R2020)}.$$

A vector/matrix can be constructed by collecting all $N_u$ nodes together, as follows:

$$\check{V}_{YCbCr}^{(FL),(R2020)} = \begin{bmatrix} \check{v}_0^{(FL),(R2020)} \\ \vdots \\ \check{v}_{N_u-1}^{(FL),(R2020)} \end{bmatrix} \tag{43}$$

The forward 3D-LUT construction process includes a second step in which the sampled values in the R.2020 YCbCr color space HLG may be converted to corresponding values (or colors) in the R.2020 RGB color space HLG, as follows:

$$\check{V}_{RGB}^{(FL),(R2020)} = f_{YCbCr \to RGB}^{R2020} \left( \check{V}_{YCbCr}^{(FL),(R2020)} \right) \tag{44}$$

The forward 3D-LUT construction process includes a third step in which the converted values in the R.2020 RGB color space HLG may be converted to corresponding values (or colors) in the a RGB color space HLG corresponding to the optimized value (denoted as $a^{opt}$) for the parameter a, as follows:

$$\check{V}_{RGB}^{(FL),(a)} = \left( P^{(a^{opt}) \to R2020} \right)^{-1} \check{V}_{RGB}^{(FL),(R2020)} \tag{45}$$

The forward 3D-LUT construction process includes a fourth step in which the converted values in the (a) RGB color space HLG may be clipped as follows:

$$\tilde{v}_{RGB}^{(FL),(a)} = \mathrm{clip3}\left(\tilde{v}_{RGB}^{(FL),(a)}, 0, 1\right) \tag{46}$$

The forward 3D-LUT construction process includes a fifth step in which the clipped values in the a RGB color space $$S_F^{ch} = \begin{vmatrix} B_{F,0}^{ch}\left(v_{0,Y}^{(FL),(R2020)}, v_{0,Cb}^{(FL),(R2020)}, v_{0,Cr}^{(FL),(R2020)}\right) & B_{F,1}^{ch}\left(v_{0,Y}^{(FL),(R2020)}, v_{0,Cb}^{(FL),(R2020)}, v_{0,Cr}^{(FL),(R2020)}\right) & \cdots & B_{F,D_F^{ch}-1}^{ch}\left(v_{0,Y}^{(FL),(R2020)}, v_{0,Cb}^{(FL),(R2020)}, v_{0,Cr}^{(FL),(R2020)}\right) \\ B_{F,0}^{ch}\left(v_{1,Y}^{(FL),(R2020)}, v_{1,Cb}^{(FL),(R2020)}, v_{1,Cr}^{(FL),(R2020)}\right) & B_{F,1}^{ch}\left(v_{1,Y}^{(FL),(R2020)}, v_{1,Cb}^{(FL),(R2020)}, v_{1,Cr}^{(FL),(R2020)}\right) & \cdots & B_{F,D_F^{ch}-1}^{ch}\left(v_{1,Y}^{(FL),(R2020)}, v_{1,Cb}^{(FL),(R2020)}, v_{1,Cr}^{(FL),(R2020)}\right) \\ B_{F,0}^{ch}\left(v_{N_u-1,Y}^{(FL),(R2020)}, v_{N_u-1,Cb}^{(FL),(R2020)}, v_{N_u-1,Cr}^{(FL),(R2020)}\right) & B_{F,1}^{ch}\left(v_{N_u-1,Y}^{(FL),(R2020)}, v_{N_u-1,Cb}^{(FL),(R2020)}, v_{N_u-1,Cr}^{(FL),(R2020)}\right) & \cdots & B_{F,D_F^{ch}-1}^{ch}\left(v_{N_u-1,Y}^{(FL),(R2020)}, v_{N_u-1,Cb}^{(FL),(R2020)}, v_{N_u-1,Cr}^{(FL),(R2020)}\right) \end{vmatrix} \tag{50}$$

HLG may be converted to corresponding values (or colors) in the R.2020 RGB color space HLG, as follows:

$$V_{RGB}^{(FL),(R2020)} = P^{(a^{opt}) \to R2020} \tilde{v}_{RGB}^{(FL),(a)} \tag{47}$$

The forward 3D-LUT construction process includes a sixth step in which the values in the R.2020 RGB color space HLG derived with expression (47) above may be converted to corresponding values (or colors) in the R.2020 YCbCr color space HLG, as follows:

$$V_{YCbCr}^{(FL),(R2020)} = f_{RGB \to YCbCr}^{R2020}\left(V_{RGB}^{(FL),(R2020)}\right) \tag{48}$$

The forward 3D-LUT construction process includes a seventh step in which, for each lookup node/entry in the forward 3D-LUT, the optimized forward TPB coefficients are used with a forward generation matrix $$S_F^{ch}$$

built with the input HDR colors or codewords (or codeword values) in the R.2020 YCbCr color space HLG derived with expression (48) above as input parameters to forward TPB basis functions to obtain the mapped or forward reshaped SDR colors or codewords (or codeword values)

$$\hat{r}_F^{ch,opt},$$

as follows:

$$\hat{r}_F^{ch,opt} = S_F^{ch} m_F^{ch,opt} = \begin{bmatrix} \hat{s}_{0,ch}^{(R709),opt} \\ \hat{s}_{1,ch}^{(R709),opt} \\ \vdots \\ \hat{s}_{N_u-1,ch}^{(R709),opt} \end{bmatrix} \tag{49}$$

In expression (49) above, the forward generation matrix $$S_F^{ch}$$

can be built or constructed using the input HDR colors or codewords (or codeword values)

$$V_{YCbCr}^{(FL),(R2020)}$$

as input to the forward TPB basis functions, as follows:

The mapped or forward reshaped SDR colors or codewords (or codeword values)

$$\hat{r}_F^{ch,opt}$$

may be used as lookup values of the lookup nodes/entries of the forward 3D-LUT, whereas the input HDR colors or codewords (or codeword values) used as the input parameters to the forward TPB basis functions may be used as lookup keys of the lookup nodes/entries of the forward 3D-LUT. At runtime, mapped or forward reshaped SDR colors or codewords can be simply looked up in the forward 3D-LUT with lookup keys as input HDR colors or codewords to be forward reshaped into the mapped or forward reshaped SDR colors or codewords.

The backward 3D-LUT as mentioned previously can be used to backward reshape the reshaped SDR colors (or codewords) in the forward reshaped SDR domain or color space into backward reshaped HDR colors (or codewords) in the backward reshaped HDR domain or color space such as the R.2020 domain or color space (in which the a color space is contained).

In some operational scenarios, a backward 3D-LUT construction process, which may be simpler than the forward 3D-LUT construction process as previously discussed, may be implemented or performed to build or construct the backward 3D-LUT. In some operational scenarios, to speed up or reduce computations, the backward 3D-LUTs may be constructed from pre-computed TPB basis function values from sampled values and the optimized backward TPB coefficients that are generated for the optimized value for the parameter a. The backward 3D-LUT or lookup nodes/entries therein may be pre-built, before deployed at runtime to process input images such as forward reshaped SDR images, and applied with relatively simple lookup operations in the backward path or corresponding backward reshaping operations performed therein with respect to the input images at the runtime.

The pre-built backward 3D-LUT can be deployed at the decoder side. A recipient downstream device at the decoder side can receive and decode a video signal encoded with forward reshaped SDR images in the forward reshaped SDR domain or color space, and use the 3D-LUT to apply backward reshaping to the forward reshaped SDR images to generate backward reshaped HDR images in the backward reshaped HDR domain or color space such as the a color space contained in the R.2020 domain or color space.

While a shape formed or delineated by the full boundary of the forward reshaped SDR domain or color space mapped with TPB-based forward reshaping operations may not be a simple 3D cube, forward reshaped SDR values in the forward reshaped SDR domain or color space may be clipped to the tightest or smallest 3D cube (e.g., a 3D rectangle, a rescaled 3D cube from a 3D rectangle, etc.) that contains or supports all forward reshaped SDR values represented in all the lookup nodes/entries of the forward 3D-LUT, for example without clipping these SDR values represented in the forward 3D-LUT.

In some operational scenarios, the backward 3D-LUT construction process comprises a first step in which a full sampling value grid may be prepared in the forward reshaped SDR domain or color space such as the entire R.709 SDR YCbCr color space.

The backward 3D-LUT construction process comprises a second step in which min and max values for each dimension or (color) channel in the forward reshaped SDR domain or color space may be determined among the forward reshaped SDR values in the forward 3D-LUT and used to limit (input) data ranges of the forward reshaped SDR (e.g., YCbCr, etc.) colors or codewords that serve as input for the backward path.

The backward 3D-LUT construction process includes a third step in which, for each lookup node/entry in the backward 3D-LUT, the optimized backward TPB coefficients are used with a backward generation matrix $$S_B^{ch}$$

(e.g., as illustrated in expression (29) above, etc.) built with the forward reshaped SDR colors or codewords (or codeword values) in the clipped or limited (input) data ranges derived in the second step of the backward 3D-LUT construction process as input parameters to backward TPB basis functions to obtain the mapped or backward reshaped HDR colors or codewords (or codeword values).

The mapped or backward reshaped HDR colors or codewords (or codeword values) may be used as lookup values of the lookup nodes/entries of the backward 3D-LUT, whereas the input or forward reshaped SDR colors or codewords (or codeword values) used as the input parameters to the backward TPB basis functions may be used as lookup keys of the lookup nodes/entries of the backward 3D-LUT. At runtime, mapped or backward reshaped HDR colors or codewords can be simply looked up in the backward 3D-LUT with lookup keys as input or forward reshaped SDR colors or codewords to be backward reshaped into the mapped or backward reshaped HDR colors or codewords.

White Box Backward Optimization (WB)

Forward TPB-based reshaping or a corresponding forward 3D-LUT may not be used in all video capturing and/or editing devices owing to costs and/or computation overheads involved in implementing or operating with forward TPB-based reshaping or forward 3D-LUT in video capturing and/or editing applications.

In some operational scenarios, a hardware-based solution such as implemented with an available ISP may be used in a video capturing and/or editing device to perform HDR-to-SDR conversion such as HDR HLG to SDR image generation. An existing ISP pipeline deployed with the device can operate with one or more programmable parameters to generate, convert and/or output SDR images based in part or in whole on corresponding HDR (e.g., HLG, etc.) images acquired by the device.

In the forward path, the programable parameters for the ISP pipeline can be specifically set or configured to cause the ISP pipeline to output the SDR images that approximate as close as possible reference SDR images generated with a white box HDR-to-SDR conversion function.

In the backward path, backward TPB-based reshaping or a corresponding backward 3D-LUT may be used to generate backward reshaped HDR images from the SDR images outputted from the ISP pipeline. Backward TPB coefficients used in the backward path may be optimized, for example to cover a backward reshaped HDR domain or color space such as the R.2020 color space as much as possible.

Figure 3B:
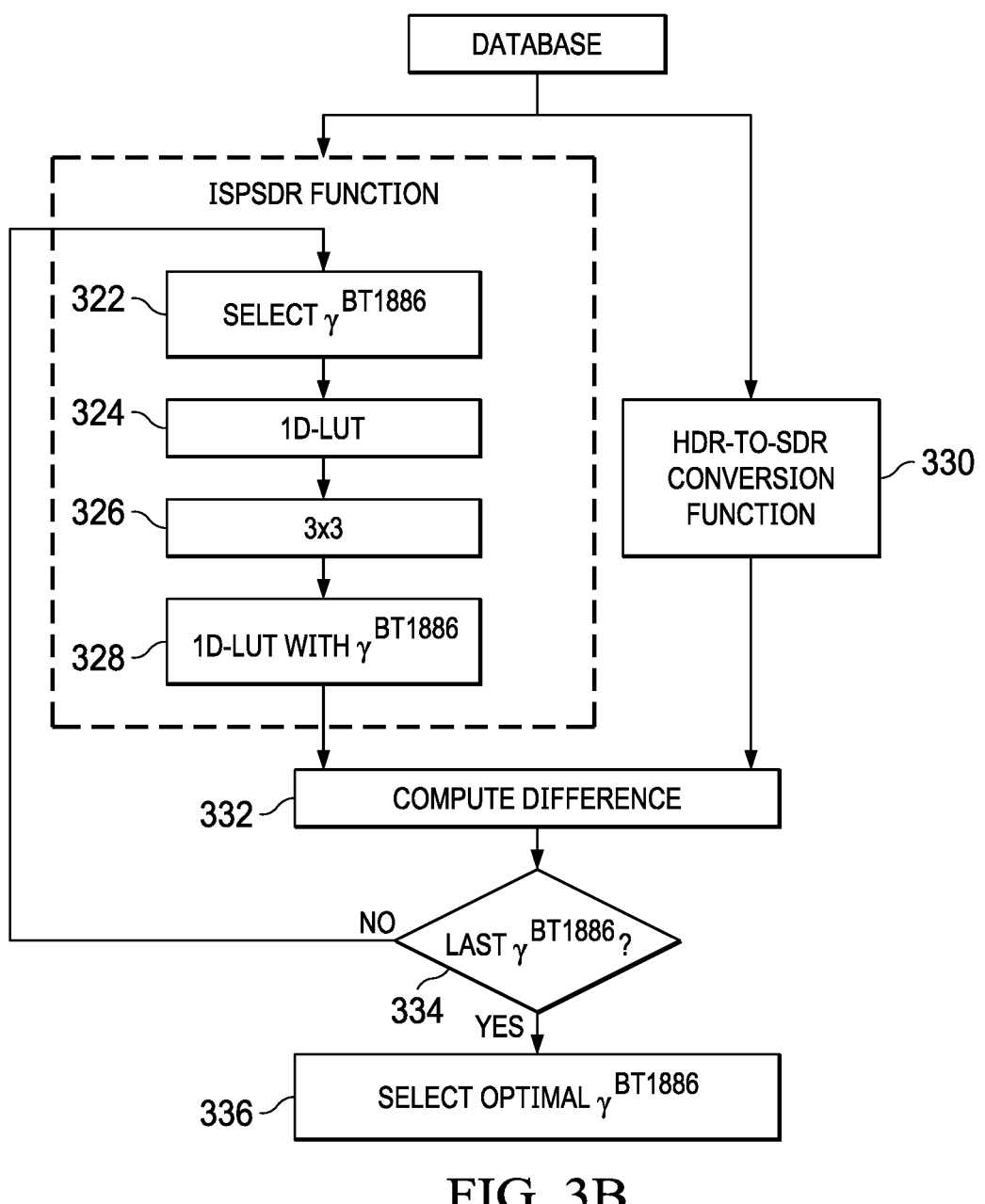
FIG. 3B illustrates an example process flow for determining optimized values for programmable parameters in an ISP pipeline.

FIG. 3B illustrates an example process flow for determining or generating optimized values for one or more programmable parameters in the ISP pipeline used to generate or output (ISP) SDR images from HDR images.

In some operational scenarios, the ISP pipeline may be a relatively limited programmable module implemented with an ISP (hardware) to approximate a white-box HDR-to-SDR conversion function such as a white box (e.g., known, well-defined, etc.) conversion function to convert HDR HLG images to corresponding SDR images in block 330.

The ISP pipeline may include or implement (1) a first set of three one-dimensional lookup tables (1D-LUTs) for conversion from HLG RGB to linear RGB, (2) followed by a 3×3 matrix for conversion from HDR images in a HDR domain or color space such as the R.2020 color space to an SDR domain or color space such as the R.709 color space, and (3) followed by a second set of three 1D-LUTs implementing a BT.1886 linear to non-linear (gamma) conversion with a (e.g., standard-based, etc.) HLG optical-to-optical transfer function (OOTF).

For the purpose of illustration only, the HDR images may be HDR HLG images retrieved from an image dataset or database as shown in FIG. 3B. The one or more programmable parameters for the ISP pipeline may be a design parameter (denoted as $\gamma^{BT1886}$) specified in the BT.1886 standard.

The process flow of FIG. 3B may be used to search for the optimized value for the design parameter $\gamma^{BT1886}$ for the ISP SDR images to best approximate the reference SDR images generated in block 330. The process flow may iterate through a plurality of candidate values for the design parameter $\gamma^{BT1886}$ in an iteration order which may be a sequential order or a non-sequential order.

Block 322 comprises selecting a current (e.g., to be iterated, etc.) value for the design parameter $\gamma^{BT1886}$ to the next candidate value (e.g., initially the first candidate value, etc.) in the plurality of candidate values for the design parameter $\gamma^{BT1886}$. Given the current value for the design parameter $\gamma^{BT1886}$, the ISP SDR images can be compared with the reference SDR images in one or more subsequent process flow blocks of FIG. 3B.

Block 324 comprises applying the first set of 1D-LUTs to the HDR HLG (RGB) images retrieved from the database to generate corresponding HDR linear RGB images, as follows:

$$l_{ch}^{(R2020)} = \begin{cases} 4\left(v_{ch}^{(R2020)}\right)^2 & \text{if } v_{ch} \geq 0.5 \\ \exp\left(\dfrac{v_{ch}^{(R2020)} - c}{a}\right) + b & \text{if } v_{ch} < 0.5 \end{cases} \quad (51)$$

where ch denotes the red, green or blue channel;

$$v_{ch}^{(R2020)}$$

denotes HDR HLG codewords in the (input) HDR HLG images;

$$l_{ch}^{(R2020)}$$

denotes HDR linear codewords in the corresponding HDR linear images generated from the first set of 1D-LUTs as represented in expression (51); the parameters (a, b, c) may be set to (0.17883277, 0.28466892, 0.55991073).

Block 326 comprises applying the 3×3 matrix to the corresponding HDR linear RGB images to generate corresponding SDR linear RGB images. The 3×3 matrix may be given as follows:

$$P^{R2020 \to R709} = P^{R2020 \to XYZ} P^{XYZ \to R709} \qquad (52)$$

SDR linear RGB codewords in the corresponding SDR linear RGB images generated with the 3×3 matrix in expression (52) above may be denoted as $$l_{ch}^{(R709)}.$$

Block 328 comprises applying the second set of 1D-LUTs to the SDR linear RGB codewords $$l_{ch}^{(R709)}$$

in the corresponding SDR linear RGB images to generate corresponding ISP SDR codewords (denoted as $$s_{ch}^{(R709)})$$

in corresponding ISP SDR images.

In some operational scenarios, as note-, e second set of 1D-LUTs merges or combines the linear to non-linear SDR conversion with the HLG OOTF given as follows:

$$l_{ch}^{(R709)} = \left( \frac{L_w - L_b}{12^{\gamma^{HLG}}} \right) (l_{ch}^{(R709)})^{\gamma^{HLG} - 1} + L_b \qquad (53)$$

where $$l_{ch}^{(R709)}$$

denotes intermediate SDR codewords generated from the SDR linear RGB codewords $$l_{ch}^{(R709)}$$

in the corresponding SDR linear RGB images;

$$L_w = 100; L_b = 0; \text{ and } \gamma^{HLG} = 1.2(1.111)^{\log 2\left(\frac{L_w}{1000}\right)}.$$

The linear to non-linear SDR conversion used to generate the ISP SDR codewords $$s_{ch}^{(R709)}$$

from the intermediate SDR codewords $$l_{ch}^{(R709)}$$

in expression (53) above may be the linear to gamma conversion as defined in BT.1886, as follows:

$$a = \left( (L_w)^{\frac{1}{\gamma^{BT1886}}} - (L_b)^{\frac{1}{\gamma^{BT1886}}} \right)^{\gamma^{BT1886}} \qquad (54)$$

$$b = \frac{(L_b)^{\frac{1}{\gamma^{BT1886}}}}{(L_w)^{\frac{1}{\gamma^{BT1886}}} - (L_b)^{\frac{1}{\gamma^{BT1886}}}} \qquad (55)$$

$$s_{ch}^{(R709)} = \left( \frac{l_{ch}^{(R709)}}{a} \right)^{\frac{1}{\gamma^{BT1886}}} - b \qquad (56)$$

where $\gamma^{BT1886}$ represents the previously mentioned design parameter.

Blocks 322 through 328 of FIG. 3B—or the combination of the first set of 1D-LUTs represented in expression (51) above, the 3×3 matrix represented in expression (52) above, and the second set of 1D-LUTs represented in expressions (53) through (56) above—as performed with the ISP pipeline collectively implement an HDR HLG to SDR conversion function (denoted as $f_{HLG \to ISPSDR}$) with a specific value (e.g., the current candidate value, etc.) for the design parameter $\gamma^{BT1886}$.

Block 332 comprises determining (e.g., quality, etc.) differences between the ISP SDR images generated from the HDR HLG to SDR conversion function $f_{HLG \to ISPSDR}$ in blocks 322 through 328 and the reference SDR images generated from the white box HDR-to-SDR conversion function in block 330. A quality assessment function such as MSE, RMSE, SAD, PSNR, SSIM, or the like, may be used to compute the differences.

Block 334 comprises determining whether the current candidate value for t the design parameter $\gamma^{BT1886}$ is the last candidate value in the plurality of candidate values for the design parameter $\gamma^{BT1886}$. If so, the process flow goes to block 336. Otherwise, the process flow goes back to block 322.

Block 336 comprises selecting an optimal or optimized value for the design parameter $\gamma^{BT1886}$. The selection of the optimized value for the design parameter $\gamma^{BT1886}$ can be formulated as an optimization problem to find a specific value (denoted as $\gamma^{BT1886,opt}$) for the design parameter $\gamma^{BT1886}$ among the plurality of candidate values such that differences between the ISP SDR images and the reference SDR images as computed with a relatively large image dataset or database are minimized, as follows:

$$\gamma^{BT1886,opt} = \text{argmin} \sum_t D\left(f_{HLG \to ISPSDR}(V_t, \gamma^{BT1886}) - f_{HLG \to WSDR}(V_t)\right) \quad (57)$$

where D( ) denotes the quality assessment function used in block 332.

An example value of $\gamma^{BT1886,opt}$ may, but is not necessarily limited to only, 2.115.

SDR to PQ TPB Optimization

As noted, in the "WFB" use cases or operational scenarios, a BESA algorithm may be used under the SLBC framework to generate optimized reshaping operational parameters used by forward and backward reshaping operations to generate forward reshaped SDR images and backward reshaped HDR images. In comparison, in the "WB" use cases or operational scenarios, only backward reshaping may be performed under the SLiDM framework on non-forward-reshaped SDR images—such as ISP SDR images generated with an ISP pipeline implemented with a video capturing and/or editing device—encoded in an outputted video signal to generate corresponding backward reshaped or reconstructed HDR images.

In the "WB" use cases or operational scenarios, forward TPB reshaping from an input HDR domain or color space such as the R.2020 HDR color space HLG to a forward reshaped SDR domain or color space such as the R.709 SDR YCbCr color space could not be used to help utilize the full ranges of codewords supported by the R.709 SDR YCbCr color space. ISP SDR codewords in the ISP SDR images encoded in the outputted video signal are often time hard limited in a R.709 color space portion generated or supported by the video capturing and/or editing device or the ISP pipeline implemented therein. It may be difficult for the ISP SDR codewords in the hard limited R.709 color space portion to be further expanded or mapped back by backward reshaping such as backward TPB based reshaping to a backward reshaped o reconstructed HDR domain or color space.

However, as in the "WFB" use cases or operational scenarios, in the "WB" use cases or operational scenarios, optimized reshaping operational parameters such as TPB coefficients can be generated in reshaping optimization to help increase coverage of a supported color space in which backward reshaped HDR images are to be represented. In many "WB" operational scenarios, the backward reshaped or reconstructed HDR domain or color space realized with the backward TPB based reshaping can be only slightly larger than the R.709 color space, as compared with the largest (a) color space achievable in the "WFB" use cases or operational scenarios.

For the purpose of illustration only, in the operational scenarios as shown in FIG. 1B, the ISP SDR domain or color space may be that of R.709 or a hard limited portion thereof in the ISP pipeline, whereas the (original or backward reshaped) HDR domain or color space may be that of R.2020.

By way of illustration but not limitation, the subset or sub-space in the R.2020 color space (or HDR color space for representing the reshaped HDR images) may be defined or characterized by a specific white point and three specific color primaries (red, green, blue). The specific white point may be selected or fixed to be the D65 white point.

Denote a backward reshaped HDR color space for representing backward reshaped or reconstructed HDR images as an (b) color space. Hence, CIExy coordinates of the color primaries and white point defining the (b) color space may be denoted as $$\left(R_x^{(b)}, R_y^{(b)}\right), \left(G_x^{(b)}, G_y^{(ab)}\right), \left(B_x^{(b)}, B_y^{(b)}\right) \text{ and } \left(W_x^{(b)}, W_y^{(b)}\right),$$

respectively. The white point $$\left(W_x^{(b)}, W_y^{(b)}\right)$$

of the (b) color space can be specified as the D65 white point.

Each of the color primaries of the (b) color space can be selected along the line between a respective color primary $$\left(G_x^{(P3)}, G_y^{(P3)}\right)$$

of the P3 color space and a respective color primary $$\left(G_x^{(R2020)}, G_y^{(R2020)}\right)$$

of the R.2020 color space in the CIExy coordinate system or chromaticity diagram. Any point along the line between the two respective color primaries of the P3 color space and the R.2020 color space can be represented as a linear combination of these two respective color primaries with a weight factor b, as follows:

$$R_x^{(b)} = bR_x^{(P3)} + (1-b)R_x^{(R2020)} \quad (58\text{-}1)$$

$$R_y^{(b)} = bR_y^{(P3)} + (1-b)R_y^{(R2020)} \quad (58\text{-}2)$$

$$G_x^{(b)} = bG_x^{(P3)} + (1-b)G_x^{(R2020)} \quad (59\text{-}1)$$

$$G_y^{(b)} = bG_y^{(P3)} + (1-b)G_y^{(R2020)} \quad (59\text{-}2)$$

$$B_x^{(b)} = bB_x^{(P3)} + (1-b)B_x^{(R2020)} \quad (60\text{-}1)$$

$$B_y^{(b)} = bG_y^{(P3)} + (1-b)B_y^{(R2020)} \quad (60\text{-}2)$$

Figure 2J:
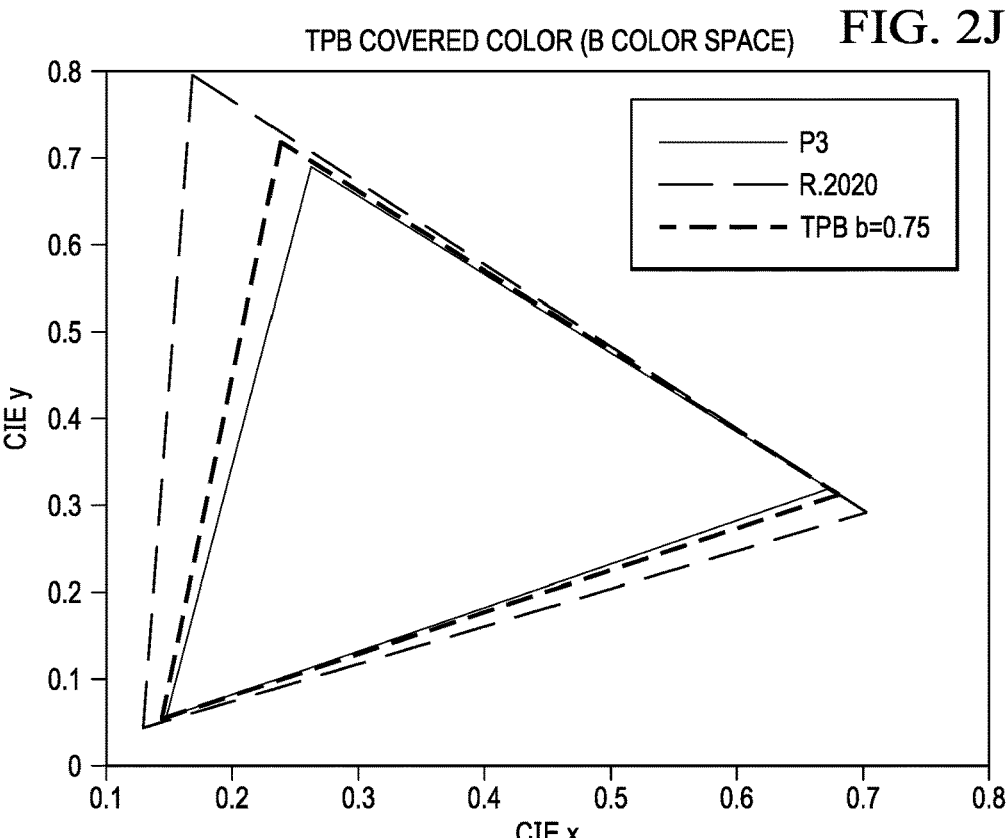
Figure 2K:
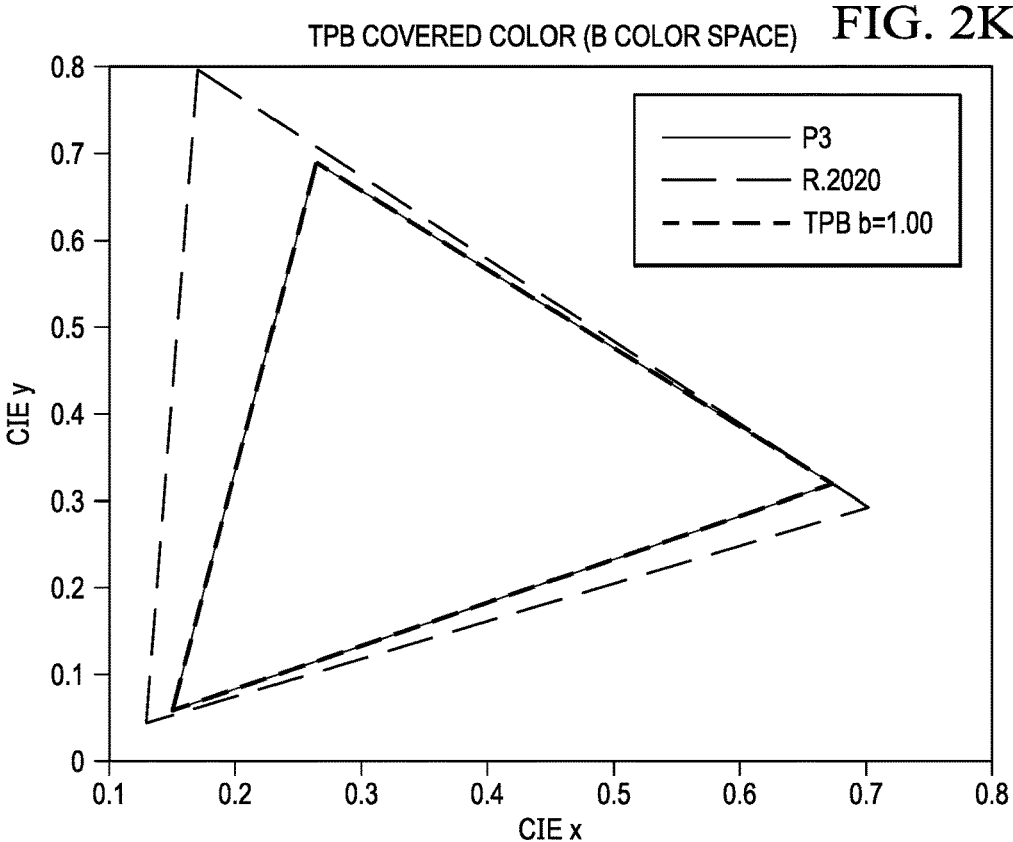
Figure 2L:
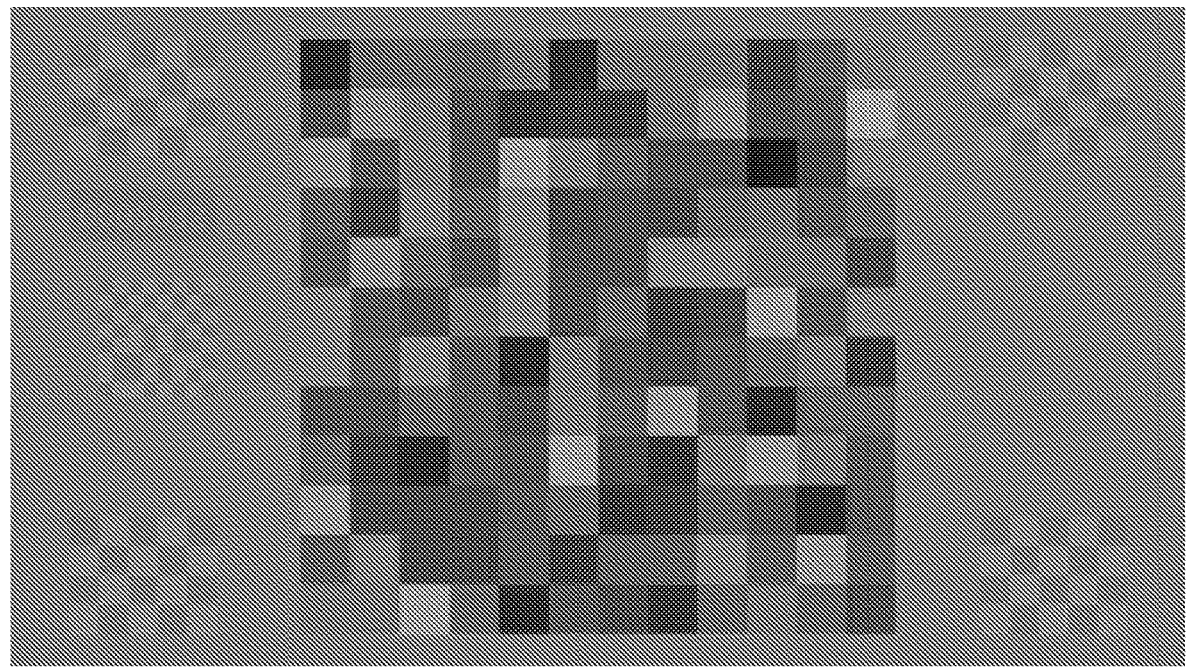
FIG. 2L illustrates an example color chart image.

Hence, the optimization problem of finding the maximum support from the (b) color space for the R.2020 color space can be simplified as a problem to select the weight factor b. When b=0, the (b) color space becomes the entire R.2020 color space. When b=1, as illustrated in FIG. 2K (where the (b) color space is denoted as "TPB" or "TPB covered color (b color space)"), the (b) color space becomes the P3 color space. FIG. 2H through FIG. 2J illustrate three example (b) color spaces for b=0.25, 0.50 and 0.75, respectively.

As illustrated in FIG. 2H through FIG. 2K, to cover as large the R.2020 color space as possible by the backward reshaped or reconstructed HDR domain or color space, the TPB optimization problem comes down to finding or searching for the smallest possible value for the parameter b.

Figure 3C:
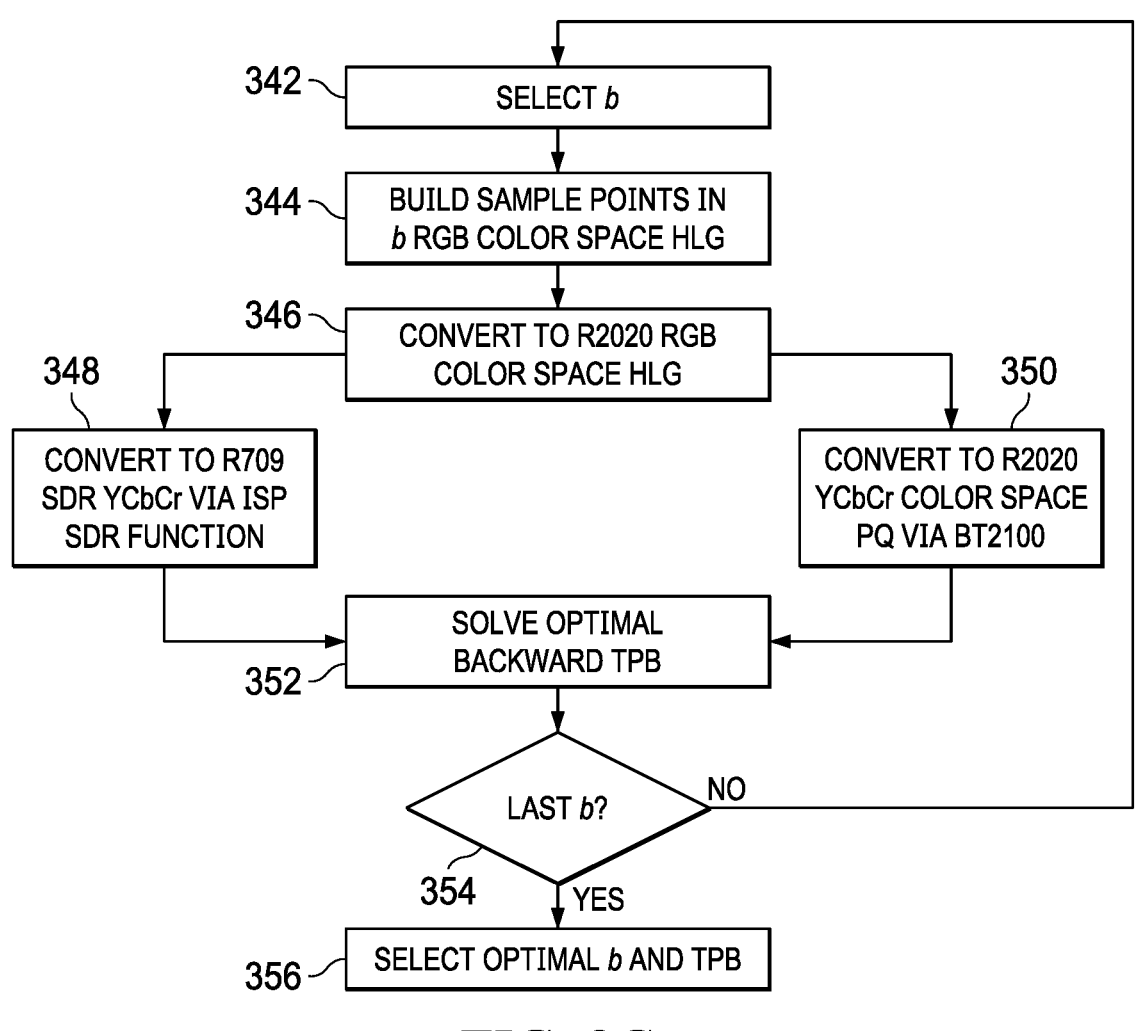

FIG. 3C illustrates an example process flow for finding the smallest possible value for the parameter b. The process flow of FIG. 3C may iterate through a plurality of candidate values for the parameter b in an iteration order which may be a sequential order or a non-sequential order.

Block 342 comprises selecting a current (e.g., to be iterated, etc.) value for the parameter b to the next candidate value (e.g., initially the first candidate value, etc.) in the plurality of candidate values for the parameter b. Given a candidate backward reshaped HDR color space with the current value for the parameter b, optimized reshaping operational parameters such as optimized TPB coefficients can be obtained in one or more subsequent process flow blocks of FIG. 3C.

Block 344 comprises building samples points, or prepare two sampled data sets, in the candidate backward reshaped HDR color space. By way of example but not limitation, the candidate backward reshaped HDR color space may be a Hybrid Log Gamma (HLG) RGB color space (referred to as the "(b) RGB color space HLG").

Similar to block 304 of FIG. 3A, the first of the two sampled data set is a uniformly sampled data set of color patches. Each color patch in the uniformly sampled data set of color patches is characterized or represented by a respective RGB color (denoted as $\dot{v}_{ijk}^{(u)}$) uniformly sampled from the (b) RGB color space HLG, which includes three dimensions denoted as R-axis, G-axis, B-axis for R, G and B component colors, respectively. Each axis or dimension of the (b) RGB color space HLG is normalized to a value range of $[0, 1]$) and sampled by $N_R$, $N_G$, and $N_B$ units or divisions, respectively. Here, each of $N_R$, $N_G$, and $N_B$ represents a positive integer greater than one (1). Hence, the total number of color patches or sampled data points in the uniformly sampled data set of color patches is given as $N_u = N_R N_G N_B$. Each uniformly sampled data point or RGB color $$\dot{v}_{ijk}^{(u)}$$

in the uniformly sampled data set of color patches is given as $$\dot{v}_{ijk}^{(u)} = \left[ \frac{i}{N_R - 1} \quad \frac{j}{N_G - 1} \quad \frac{k}{N_B - 1} \right], \text{ for } i \in [0, \ldots, N_R - 1],$$
$$j \in [0, \ldots, N_G - 1], k \in [0, \ldots, N_B - 1].$$

For simplicity, (i, j, k) can be vectorized or simply denoted as p. Correspondingly, the uniformly sampled data point or RGB color $$\dot{v}_{ijk}^{(u)}$$

can be simply denoted as $$\dot{v}_p^{(u)}.$$

All $N_u$ nodes (each of which represents a unique combination of a specific R-axis unit/partition, a specific B-axis unit/partition, a specific G-axis unit/partition) can be grouped or collected into a vector/matrix as follows:

$$\dot{V}^{(u)} = \begin{bmatrix} \dot{v}_0^{(u)} \\ \vdots \\ \dot{v}_{N_u - 1}^{(u)} \end{bmatrix} \tag{61}$$

The second of the two sampled data set prepared or built in block 344 is a neutral color data set. This second data set includes a plurality of neutral colors or neutral color patches (also referred to as gray colors or gray color patches).

The second data set may be used to preserve input gray color patches in an input domain as output gray color patches in an output domain when the input gray color patches in the input domain are mapped or reshaped into the output gray color patches in reshaping operations as described herein. The input gray color patches in the input domain (or input color space) may be given increased weighting in the optimization problem as compared with other color patches to reduce the likelihood of these input gray color patches being mapped to non-gray color patches in the output domain (or output color space) by the reshaping operations.

The second data set—the gray color data set or the data set of gray colors—may be prepared or built by uniformly sampling the R, G, B values along the line connecting between a first gray color (0, 0, 0) and a second gray color (1, 1, 1) in the RGB domain (e.g., the (b) RGB color space HLG, etc.), giving rise to $N_n$ nodes or gray color patches, as follows:

$$\dot{v}_i^{(n)} = \left[ \frac{i}{N_n - 1} \quad \frac{i}{N_n - 1} \quad \frac{i}{N_n - 1} \right] \tag{62}$$
$$\text{for } i \in [0, \ldots, N_n - 1]$$

All the $N_n$ nodes in the second data set can be grouped or collected into a neutral color vector/matrix as follows:

$$\dot{V}^{(n)} = \begin{bmatrix} \dot{v}_0^{(n)} \\ \vdots \\ \dot{v}_{N_n - 1}^{(n)} \end{bmatrix} \tag{63}$$

The neutral color vector/matrix in expression (8) above can be repeated $N_t$ (a positive integer no less than one (1)) times to generate $N_n N_t$ neutral color patches in the (now repeated) second data set, as follows:

$$\dot{V}^{(n)} = \begin{bmatrix} \dot{V}^{(n)} \\ \vdots \\ \dot{V}^{(n)} \end{bmatrix} \tag{64}$$

The repetition of neutral colors in the repeated second data set of neutral colors increases weighting of the neutral or gray colors as compared with other colors. Accordingly, the neutral colors can be preserved more in the optimization problem than the other colors.

The first data set of (all sampled) colors and the second (repeated) data set of neutral colors in expressions (61) and (64) can be collected or placed together in a single combined vector/matrix, as follows:

$$\tilde{V}_{RGB}^{(b)} = \begin{bmatrix} \tilde{V}^{(u)} \\ \tilde{V}^{(n)} \end{bmatrix} \qquad (65)$$

The total number of vector/matrix elements (repeated and non-repeated color patches) in the combined vector/matrix $$\tilde{V}_{RGB}^{(b)}$$

is $N = N_n N_t + N_u$. Each vector/matrix element or color patch (row) in $$\tilde{V}_{RGB}^{(b)}$$

in expression (10) above may be denoted as follows:

$$\tilde{v}_i^{(b)} = \begin{bmatrix} \tilde{v}_{ir}^{(b)} & \tilde{v}_{ig}^{(b)} & \tilde{v}_{ib}^{(b)} \end{bmatrix} \qquad (66)$$

Block 346 comprises converting color values of the color patches (rows) represented in the vector/matrix elements of the combined vector/matrix $$\tilde{V}_{RGB}^{(b)}$$

in the (b) RGB color space (or the (b) RGB color space HLG) to corresponding color values in a standard-based R.2020 color space or an R.2020 RGB color space HLG, as follows:

$$\tilde{V}_{RGB}^{(R2020)} = \tilde{V}_{RGB}^{(b)} P^{(b) \to R2020} \qquad (67)$$

where $P^{(b) \to R2020}$ denotes a conversion matrix from the (b) color space to the R.2020 RGB color space HLG, which can be constructed similarly to how $P^{(a) \to R2020}$ is constructed in the process flow of FIG. 3A, as follows:

$$P^{(b) \to XYZ} \qquad (68\text{-}1)$$

$$P^{(b) \to R2020} = P^{(b) \to XYZ} P^{XYZ \to R2020} \qquad (68\text{-}2)$$

where $P^{(b) \to XYZ}$ denotes a conversion matrix from the (b) color space to the XYZ color space that can be constructed similarly to how $P^{(a) \to XYZ}$ is constructed in the process flow of FIG. 3A.

Block 348 comprises converting or content mapping color values of the color patches (rows) represented in the vector/matrix elements of the vector/matrix $$\tilde{V}_{RGB}^{(R2020)}$$

in the R.2020 RGB color space HLG to corresponding ISP SDR color values (denoted as $$\tilde{S}_{RGB}^{(R709)})$$

in an R.709 SDR RGB color space and then further to corresponding color values (denoted as $$\tilde{S}_{YCbCr}^{(R709)})$$

in an R.709 SDR YCbCr color space, as follows:

$$\tilde{S}_{RGB}^{(R709)} = f_{HLG \to ISPSDR}(\tilde{V}_{RGB}^{(R2020)}) \qquad (69\text{-}1)$$

$$\tilde{S}_{YCbCr}^{(R709)} = f_{RGB \to YCbCr}^{R709}(\tilde{S}_{RGB}^{(R709)}) \qquad (69\text{-}2)$$

where $f_{HLG \to ISPSDR}(\ )$ represents an ISP equation such as the HDR HLG to SDR conversion function implemented by the ISP pipeline with the optimized value for the design parameter $\gamma^{BT1886}$ generated from the process flow of FIG. 3B.

Each color patch (row) in $$\tilde{S}_{YCbCr}^{(R709)}$$

may be denoted as follows:

$$\tilde{s}_i^{(R709)} = \begin{bmatrix} \tilde{s}_{i,Y}^{(R709)} & \tilde{s}_{i,Cb}^{(R709)} & \tilde{s}_{i,Cr}^{(R709)} \end{bmatrix} \qquad (70)$$

Block 350 comprises converting or content mapping color values of the color patches (rows) represented in the vector/matrix elements of the vector/matrix $$\tilde{V}_{RGB}^{(R2020)}$$

in the R.2020 RGB color space HLG to corresponding color values (denoted as $$\tilde{R}_{YCbCr}^{(R2020)})$$

in an R.2020 YCbCr color space PQ, as follows:

$$\tilde{R}_{RGB}^{(R2020)} = f_{HLG \to PQ}(\tilde{V}_{RGB}^{(R2020)}) \qquad (71\text{-}1)$$

$$\tilde{R}_{YCbCr}^{(R2020)} = f_{RGB \to YCbCr}^{R2020}(\tilde{R}_{RGB}^{(R2020)}) \qquad (71\text{-}2)$$

Each color patch (row) in $$\hat{R}^{(R2020)}_{YCbCr}$$

may be denoted as follows:

$$\hat{r}^{(R2020)}_i = \left[ \hat{r}^{(R2020)}_{i,Y} \quad \hat{r}^{(R2020)}_{i,Cb} \quad \hat{r}^{(R2020)}_{i,Cr} \right] \tag{72}$$

Block 352 comprises taking $$\hat{S}^{(R709)}_{YCbCr}, \text{ and } \hat{R}^{(R2020)}_{YCbCr}$$

as input to a backward TPB optimization algorithm to generate optimized backward TPB coefficients for TPB based reshaping for the (b) color space corresponding to the current value for the parameter b.

To do so, a backward generation matrix may be constructed from TPB basis functions and SDR codewords represented in $$\hat{S}^{(R709)}_{YCbCr},$$

as follows:

$$S^{ch}_B = \begin{bmatrix} B^{ch}_{B,0} & B^{ch}_{B,1} & \cdots & B^{ch}_{B,D^{ch}_B-1} \\ \left(\hat{s}^{(R709)}_{0,Y}, & \left(\hat{s}^{(R709)}_{0,Y}, & & \left(\hat{s}^{(R709)}_{0,Y}, \\ \hat{s}^{(R709)}_{0,Cb}, & \hat{s}^{(R709)}_{0,Cb}, & & \hat{s}^{(R709)}_{0,Cb}, \\ \hat{s}^{(R709)}_{0,Cr}\right) & \hat{s}^{(R709)}_{0,Cr}\right) & & \hat{s}^{(R709)}_{0,Cr}\right) \\ B^{ch}_{B,0} & B^{ch}_{B,1} & \cdots & B^{ch}_{B,D^{ch}_B-1} \\ \left(\hat{s}^{(R709)}_{1,Y}, & \left(\hat{s}^{(R709)}_{1,Y}, & & \left(\hat{s}^{(R709)}_{1,Y}, \\ \hat{s}^{(R709)}_{1,Cb}, & \hat{s}^{(R709)}_{1,Cb}, & & \hat{s}^{(R709)}_{1,Cb}, \\ \hat{s}^{(R709)}_{1,Cr}\right) & \hat{s}^{(R709)}_{1,Cr}\right) & & \hat{s}^{(R709)}_{1,Cr}\right) \\ \vdots & \vdots & & \vdots \\ B^{ch}_{B,0} & B^{ch}_{B,1} & \cdots & B^{ch}_{B,D^{ch}_B-1} \\ \left(\hat{s}^{(R709)}_{N-1,Y}, & \left(\hat{s}^{(R709)}_{N-1,Y}, & & \left(\hat{s}^{(R709)}_{N-1,Y}, \\ \hat{s}^{(R709)}_{N-1,Cb}, & \hat{s}^{(R709)}_{N-1,Cb}, & & \hat{s}^{(R709)}_{N-1,Cb}, \\ \hat{s}^{(R709)}_{N-1,Cr}\right) & \hat{s}^{(R709)}_{N-1,Cr}\right) & & \hat{s}^{(R709)}_{N-1,Cr}\right) \end{bmatrix} \tag{73}$$

Backward prediction errors can be determined by comparing the backward reshaped HDR color patches or codewords collected in a vector/matrix with reference HDR color patches or codewords in a per-channel backward observation vector/matrix derived and minimized in solving the TPB optimization problem. The per-channel backward observation vector/matrix can be generated or pre-calculated from expression (71) above, stored or cached in computer memory, and fixed in all iterations, as follows:

$$r^{ch}_B = \begin{bmatrix} \hat{r}^{(R2020)}_{0,ch} \\ \hat{r}^{(R2020)}_{1,ch} \\ \vdots \\ \hat{r}^{(R2020)}_{N-1,ch} \end{bmatrix} \tag{74}$$

Optimized values for the (e.g., per-channel, etc.) backward TPB coefficients (denoted as $$m^{ch}_B)$$

can be generated via a least squared solution to the optimization problem that minimizes differences between the backward reshaped HDR color patches or codewords and the reference HDR color patches or codewords, as follows:

$$m^{ch}_B = \left( (S^{ch}_B)^T (S^{ch}_B) \right)^{-1} \left( (S^{ch}_B)^T r^{ch}_B \right) \tag{75}$$

Per-channel predicted (or backward reshaped or reconstructed) HDR codeword for each channel ch can be computed as follows:

$$\hat{r}^{ch}_B = S^{ch}_B m^{ch}_B = \begin{bmatrix} \hat{v}^{(R2020)}_{0,ch} \\ \hat{v}^{(R2020)}_{1,ch} \\ \vdots \\ \hat{v}^{(R2020)}_{N-1,ch} \end{bmatrix} \tag{76}$$

Block 354 comprises determining whether the current candidate value for the parameter b is the last candidate value in the plurality of candidate values for the parameter b. If so, the process flow goes to block 356. Otherwise, the process flow goes back to block 342.

Block 356 comprises selecting an optimal or optimized value for the parameter b as well as computing (or simply selecting already computed) the optimized forward and backward TPB coefficients for the (b) RGB color space corresponding to the optimized value for the parameter b.

Similar to the "WFB" use cases or operational scenarios, in the "WB" use cases or operational scenarios, the (b) color space is also part of the optimization. The (b) color space and the backward TPB coefficients can be jointly optimized. Hence, the optimization problem can be formulated to find (specific values for)

$$\{b, m^{ch}_{B,b}\}$$

such that the (b) color space is generated to cover the largest HDR color space or color space portion while achieving minimized HDR prediction errors denoted as $$D_{HDR}\left(r^{ch}_B, \hat{r}^{ch}_B\right),$$

as follows:

$$\underset{\{b, m^{ch}_{B,b}\}}{\text{argmin}} D_{HDR}\left(r^{ch}_B, \hat{r}^{ch}_B\right) \tag{77}$$

An example optimized value for the parameter b may, but is not necessarily limited to only, 1, which corresponds to the P3 color space.

Black-Box TPB Backward Optimization in Single Device (BB1)

Some (dual-mode) video capturing devices or mobile devices support both SDR and HDR capture modes and hence can output either SDR or HDR images. Some (mono-mode) video capture devices or mobile devices only support the SDR capture mode. Under techniques as described herein, SDR-to-HDR mappings can be modeled or generated with the dual-mode video capturing devices. Some or all of these SDR-to-HDR mappings can then be applied, for example in downloaded and/or installed video capturing applications, to SDR images captured by either the dual-mode video capturing devices or the mono-mode video capturing devices to "up-convert" the SDR images acquired with the SDR capture mode to corresponding HDR images, regardless of whether these video capturing devices support the HDR capture mode or not.

In some operational scenarios, as computation environment in or processing capabilities of mobile devices may be limited, a static (backward) 3D-LUT derived at least in part from TPB basis functions and optimized TPB coefficients may be used to represent a static SDR-to-HDR mapping that maps or backward reshapes SDR images such as all SDR images in a SDR video sequence to generate corresponding HDR images such as all HDR images in a corresponding HDR video sequence.

The static SDR-to-HDR mapping may be modeled based at least in part on a plurality of image pairs of HDR and SDR images acquired with a specific camera of a dual-mode video capturing device. Each image pair in the image pairs of HDR and SDR images includes an SDR image as well as an HDR image corresponding to the SDR image. The SDR image and the HDR image depict the same visual scene in a real world subject to spatial alignment errors caused by spatial movements that may occur between a first time point at which the SDR image is captured by the specific camera operating in the SDR capture mode and a second time point at which the HDR image is captured by the same camera operating in the HDR capture mode. For example, for each visual scene in a physical world, the video capturing device can operate with the HDR mode to capture an HDR image in an image pair and use the SDR mode to capture the SDR image in the same image pair. This may be repeated to generate the plurality of image pairs of HDR and SDR images to generate a relatively large number of different color patches (or a relatively large number of different colors or different codewords) used to generate the static SDR-to-HDR mapping.

There are several challenges for using the captured SDR and HDR images to model the static SDR-to-HDR mapping. First, while both the SDR and HDR capture modes may use the same ISP inside the same video capturing device, the video capturing device can apply different image capture settings (e.g., exposure settings for the specific camera, etc.) for the same scene to obtain designed optimized picture qualities in the captured SDR and HDR images. As a result, the static SDR-to-HDR mapping may be able to model or approximate the HDR image capture settings actually implemented by the video capturing device to some extent. Second, spatial alignment between the captured SDR and HDR images to be used to derive an image pair of SDR and HDR images may not be exact. For example, selecting a specific capture mode between the SDR and HDR capture modes may be performed via touching a screen of the video capture device, which can cause the video capture device to lose or move way from its previous spatial position and/or orientation. In addition, temporal alignment between a captured SDR video/image sequence and a captured HDR video/image sequence can easily occur as these SDR and HDR sequences are captured at different time instances or durations. Some depicted visual objects in these sequences can move in or out of field of camera view. Some local regions in the field of camera view can have occlusions or dis-occlusions from time to time.

In some operational scenarios, registration operations can be performed to resolve spatial and/or temporal alignment issues between a captured SDR image and a corresponding captured HDR image to generate an aligned SDR image and a corresponding aligned HDR image and to include the aligned SDR image and the corresponding aligned HDR image in an image pair of SDR and HDR images. The image pair can then be used to determine or establish SDR color patches or colors in the aligned SDR image and corresponding HDR color patches or colors in the corresponding aligned HDR image. These SDR and HDR color patches or colors can be used to derive at least some color patches in a set of corresponding SDR and HDR color patches or colors for the purpose of deriving or generating the static SDR-to-HDR mapping.

A SDR and HDR video capturing process may be performed to provide a comprehensive coverage of different scenes and/or exposures at different times of a day such as from early morning to late night for both indoor and outdoor scenes. For each scene, the same video capturing device can be used with both the SDR and HDR modes to capture SDR and HDR video consequences. In some operational scenarios, a specific frame/image such as the first frame/image of each of the video sequences may be selected or extracted for the purpose of building or deriving the plurality of image pairs of SDR and HDR images to be included in a training image dataset or database.

Figure 3D:
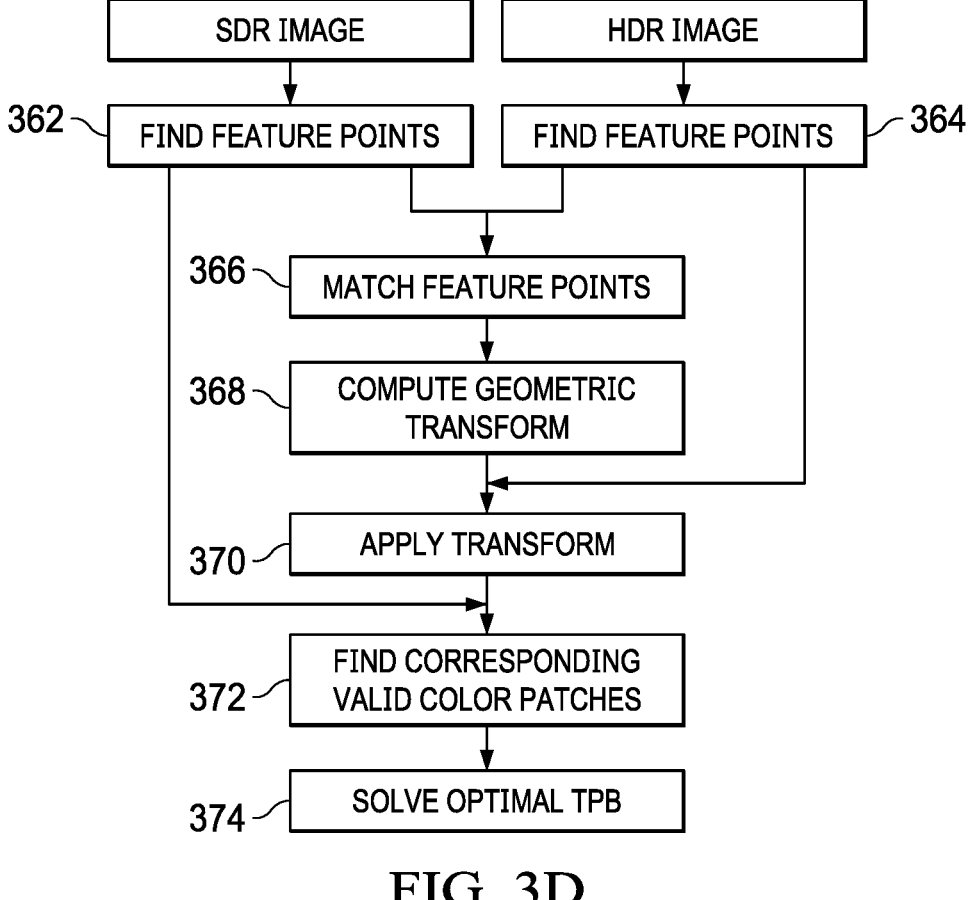
FIG. 3D illustrates an example process flow for generating optimized reshaping operational parameters.

FIG. 3D illustrates an example process flow for generating optimized reshaping operational parameters such as optimized or optimal TPB coefficients, using corresponding (or matched) SDR and HDR color patches or colors in a captured SDR image and a captured HDR image—corresponding to the captured SDR image—which are captured by a video capturing device operating SDR and HDR capture modes, respectively.

Block 362 comprises receiving the captured SDR image and finding or extracting a set of SDR image feature points in the captured SDR image. Block 364 comprises receiving the captured HDR image and finding or extracting a set of HDR image feature points in the captured HDR image. The set of SDR image feature points and the set of HDR image feature points may be of the same set of feature point types.

The set of feature point types may include feature point types in a wide variety of different feature point types including but not necessarily limited to only, any, some or all of: BRISK features detected with the Binary-Robust-Invariant-Scalable-Keypoints or BRISK algorithm; detected corners using the Features from Accelerated-Segment-Test or FAST algorithm; features detected from the KAZE algorithm; detected corners using a minimum eigenvalue algorithm; features generated with the maximally-stable-extremal-regions or MSER algorithm; keypoints detected with the Oriented-FAST-and-Rotated or ORB algorithm; features extracted from the scale-invariant-feature-transform or SIFT algorithm; features extracted from the Speeded-Up-Robust-Features or SURF algorithm; and so forth.

Each of some or all feature points in the set of SDR image feature points and the set of HDR image feature points may be represented with a feature vector or descriptor such as an array of (e.g., numerical, etc.) feature values.

Block 366 comprises matching some or all feature points in the set of SDR image feature points with some or all feature points in the set of HDR image feature points. For each feature point of a specific type in the SDR image in the set of SDR image feature points, a matching metric may be computed between the feature point in the SDR image and each feature point in feature points of the same type in the HDR image in the set of HDR image feature points. In a non-limiting example, the matching metric may be computed as a sum of absolute difference or SAD—or another metric function used to measure differences between two feature points—between a first feature vector representing the feature point in the SDR image and a second feature vector representing the feature point in the HDR image. A specific feature point with the lowest SAD or matching metric may be selected from among the feature points of the same type in the HDR image as a possible match for the feature point in the SDR image. In response to determining that the lowest SAD or matching metric is lower than a matching difference threshold, the specific feature point in the HDR image may be identified or determined as a match for the feature point in the SDR image; the feature point in the SDR image and the specific feature point in the HDR image form a pair of matched SDR and HDR feature points. Otherwise, the specific feature point may not be identified as such a match. This matching operation can be repeatedly performed for all feature points in the set of SDR image feature points, thereby giving rise to a set of pairs of matched SDR and HDR feature points.

Block 368 comprises computing a geometric transform such as a 3×3 2D affine transform between the SDR image and the HDR image based in part or in whole on the set of pairs of matched SDR and HDR feature points. The geometric transform may be computed or derived using (e.g., pixel rows and pixel columns, etc.) coordinates of matched feature points in the SDR and HDR images from the set of pairs of matched SDR and HDR feature points.

For each (e.g., the k-th, etc.) pair of matched SDR and HDR feature points, the 2D coordinate of the HDR feature point in the pair may be denoted as $(\tau_{ix}, \tau_{iy})$ and included in a first vector as $\tau_i = [\tau_{ix}\ \tau_{iy}\ 1]$, whereas the 2D coordinate of the SDR feature point may be denoted as $(\eta_{ix}, \eta_{iy})$ and included in a second vector $\eta_i = [\eta_{ix}\ \eta_{iy}\ 1]$.

Denote the total number of pairs of matched SDR and HDR feature points in the set of pairs of matched SDR and HDR feature points as N. Vectors generated from 2D coordinates of feature points in all the pairs of matched SDR and HDR feature points in the set of pairs of matched SDR and HDR feature points can be collected together, as follows:

$$T = \begin{bmatrix} \tau_0 \\ \vdots \\ \tau_{N-1} \end{bmatrix} \text{ and } H = \begin{bmatrix} \eta_0 \\ \vdots \\ \eta_{N-1} \end{bmatrix} \tag{78}$$

As noted, the geometric transform may be represented as a 3×3 matrix, as follows:

$$F = \begin{bmatrix} m_{00} & m_{01} & 0 \\ m_{10} & m_{11} & 0 \\ m_{20} & m_{21} & 1 \end{bmatrix} \tag{79}$$

Mathematically, first and second vectors respectively representing SDR and HDR feature points in each pair of matched SDR and HDR feature points in the set of pairs of matched SDR and HDR feature points can be related to each other through the 3×3 matrix representing the geometric transform, as follows:

$$\hat{\eta}_i = \tau_i F \tag{80}$$

Or, for all N pairs of matched feature points in the set of pairs of matched SDR and HDR feature points, vectors representing SDR and HDR feature points can be related through the 3×3 matrix representing the geometric transform, as follows:

$$\hat{H} = TF \tag{81}$$

Values of matrix elements in the 3×3 matrix representing the geometric transform may be generated or obtained as a solution (e.g., least squared solution, etc.) of an optimization problem to minimize transformation or alignment errors. More specifically, the optimization problem may be formulated as follows:

$$F^{opt} = \arg\min_F \|\hat{H} - H\|^2 = \arg\min_F \|\hat{H} - TF\|^2 \tag{82}$$

The optimized or optimal values for the 3×3 matrix representing the geometric transform can be obtained via the least squared solution to the optimization problem in expression ( ) above, as follows:

$$F^{opt} = (T^T T)^{-1}(T^T H) \tag{84}$$

Block 370 comprises applying the geometric transform to one of the SDR and HDR images. In the present example, the transform is applied to the HDR image so HDR pixel locations in the HDR image are shifted to coincide with the SDR pixel locations in the SDR image, for example for each of three channels such as Y, Cb and Cr in which the HDR image is represented. As a result, most HDR pixels in the HDR image are spatially aligned with corresponding SDR pixels in the SDR image. Remaining HDR pixels and remaining SDR pixels to which no HDR pixels are spatially aligned may be excluded (e.g., assigned with an out-of-range pixel values, etc.) from being used as (valid) color patches or colors for the purpose of generating the static SDR-to-HDR mapping or the TPB coefficients or the static backward 3D-LUT.

Block 372 comprises finding corresponding valid color patches or colors in the SDR and HDR images. The valid color patches or colors can be obtained from codeword values of spatially aligned pixels in the SDR and HDR images. As noted, the spatially aligned pixels can be generated by applying the geometric transform that is in turn generated from matched SDR and HDR feature points.

In some operational scenarios, to enhance spatial alignment accuracy or reliability of the geometric transform, after (initial) matched SDR and HDR feature points with matching metrics lower than the minimum matching difference threshold are identified, a further matching threshold may be applied to select or distinguish a subset of final matched SDR and HDR feature points from or among the (initial) matched SDR and HDR feature points.

For each spatially aligned pixel in the SDR image, an SDR codeword such as an SDR Y/Cb/Cr value may be determined for the spatially aligned pixel in the SDR image. For a co-located or spatially aligned pixel—corresponding to the spatially aligned pixel in the SDR image—in the spatially transformed HDR image generated with the geometric transform, a corresponding HDR codeword such as a corresponding HDR Y/Cb/Cr value may be determined for the spatially aligned pixel in the HDR image. If the transformed HDR pixel is not available (e.g., having a value of 0, etc.), then the HDR pixel may be discarded or prevented from being considered as a part of matched color patches or codewords.

In each pair (e.g., the i-th, etc.) of matched SDR and HDR color patches or colors such as generated from a pair of spatially aligned SDR and HDR pixels in the SDR and HDR images, the matched SDR and HDR color patches or colors (or codeword values) may be given, respectively, as follows:

$$\hat{s}_i^{(R709)} = \left[ \hat{s}_{i,Y}^{(R709)} \quad \hat{s}_{i,Cb}^{(R709)} \quad \hat{s}_{i,Cr}^{(R709)} \right] \tag{86}$$

$$\hat{r}_i^{(R2020)} = \left[ \hat{r}_{i,Y}^{(R2020)} \quad \hat{r}_{i,Cb}^{(R2020)} \quad \hat{r}_{i,Cr}^{(R2020)} \right] \tag{87}$$

Matched SDR and HDR color patches or colors (or codeword values) in all pairs of matched SDR and HDR color patches or colors such as generated from all pairs of spatially aligned SDR and HDR pixels in SDR and HDR images of all image pairs of SDR and HDR image pairs can be collected together from all images and merge them into two matrixes, as follows:

$$\hat{S}_{YCbCr}^{(R709)} \text{ from the } SDR \text{ images} \tag{88}$$

$$\hat{R}_{YCbCr}^{(R2020)} \text{ from the } HDR \text{ images} \tag{89}$$

Block 374 comprises solving or generating optimized or optimal TPB coefficients for backward reshaping or the static SDR-to-HDR mapping using the matrixes $$\hat{S}_{YCbCr}^{(R709)} \text{ and } \hat{R}_{YCbCr}^{(R2020)}$$

in expressions (88) and (89) above as input.

A per-channel backward generation matrix may be generated from backward TPP basis functions and codewords in the matrix $$\hat{S}_{YCbCr}^{(R709)},$$

as follows:

$$S_B^{ch} = \begin{bmatrix} B_{B,0}^{ch} & B_{B,1}^{ch} & \cdots & B_{B,D_B^{ch}-1}^{ch} \\ (\hat{s}_{0,Y}^{(R709)}, & (\hat{s}_{0,Y}^{(R709)}, & & (\hat{s}_{0,Y}^{(R709)}, \\ \hat{s}_{0,Cb}^{(R709)}, & \hat{s}_{0,Cb}^{(R709)}, & & \hat{s}_{0,Cb}^{(R709)}, \\ \hat{s}_{0,Cr}^{(R709)}) & \hat{s}_{0,Cr}^{(R709)}) & & \hat{s}_{0,Cr}^{(R709)}) \\ B_{B,0}^{ch} & B_{B,1}^{ch} & \cdots & B_{B,D_B^{ch}-1}^{ch} \\ (\hat{s}_{1,Y}^{(R709)}, & (\hat{s}_{1,Y}^{(R709)}, & & (\hat{s}_{1,Y}^{(R709)}, \\ \hat{s}_{1,Cb}^{(R709)}, & \hat{s}_{1,Cb}^{(R709)}, & & \hat{s}_{1,Cb}^{(R709)}, \\ \hat{s}_{1,Cr}^{(R709)}) & \hat{s}_{1,Cr}^{(R709)}) & & \hat{s}_{1,Cr}^{(R709)}) \\ \vdots & \vdots & & \vdots \\ B_{B,0}^{ch} & B_{B,1}^{ch} & \cdots & B_{B,D_B^{ch}-1}^{ch} \\ (\hat{s}_{N-1,Y}^{(R709)}, & (\hat{s}_{N-1,Y}^{(R709)}, & & (\hat{s}_{N-1,Y}^{(R709)}, \\ \hat{s}_{N-1,Cb}^{(R709)}, & \hat{s}_{N-1,Cb}^{(R709)}, & & \hat{s}_{N-1,Cb}^{(R709)}, \\ \hat{s}_{N-1,Cr}^{(R709)}) & \hat{s}_{N-1,Cr}^{(R709)}) & & \hat{s}_{N-1,Cr}^{(R709)}) \end{bmatrix} \tag{90}$$

A per-channel observation matrix for the SDR-to-HDR mapping may be constructed from the matrix $$\hat{R}_{YCbCr}^{(R2020)},$$

as follows:

$$r_B^{ch} = \begin{bmatrix} \hat{r}_{0,ch}^{(R2020)} \\ \hat{r}_{1,ch}^{(R2020)} \\ \vdots \\ \hat{r}_{N-1,ch}^{(R2020)} \end{bmatrix} \tag{91}$$

The optimized or optimal backward TPB coefficients for channel ch can be solved via least squared solution, as follows:

$$m_B^{ch} = \left( (S_B^{ch})^T (S_B^{ch}) \right)^{-1} \left( (S_B^{ch})^T r_B^{ch} \right) \tag{92}$$

The predicted or backward reshaped HDR value for channel ch can be computed as follows:

$$\hat{r}_B^{ch} = S_B^{ch} m_B^{ch} = \begin{bmatrix} \hat{v}_{0,ch}^{(R2020)} \\ \hat{v}_{1,ch}^{(R2020)} \\ \vdots \\ \hat{v}_{N-1,ch}^{(R2020)} \end{bmatrix} \tag{93}$$

Black-Box Backward Reshaping Optimization in Two Devices (BB2)

In the "BB2" operational scenarios, a (backward) reshaping mapping may be used to map (ISP captured) SDR images captured by a first video capturing device in an SDR capture mode to generate (ISP mapped) HDR images simulating HDR looks of (ISP captured) HDR images captured by a second different video capturing device operating in an HDR capture mode. In some operational scenarios, the first video capturing device may be a relatively low-end mobile phone that can only capture SDR images or pictures, whereas the second video capturing device may be relatively high-end phone that can capture HDR images or pictures. While the first and second video capturing devices can operate with different hardware configurations and capabilities, the reshaping mapping is used to reshape the (ISP captured) SDR images captured by the first device into the (ISP mapped) HDR images approximating the (ISP captured) HDR images captured by the second device.

The reshaping (SDR-to-HDR) mapping may be modeled based at least in part on a plurality of image pairs formed by (training) SDR images captured by the first device and (training) HDR images captured by the second device. Each image pair in the image pairs of HDR and SDR images includes an SDR image as well as an HDR image corresponding to the SDR image.

In some "BB2" operational scenarios, some or all image pairs in the plurality of image pairs may (e.g., initially, before image alignment operations, etc.) include captured SDR and HDR images depicting visual scenes such as nature indoor/outdoor scenes in a real world subject to spatial and/or temporal alignment errors relating to the first and second video capturing device. As in the "BB1" use cases or operational scenarios, in these "BB2" use cases or operational scenarios, image alignment operations between corresponding SDR and HDR images in an image pair may be performed, for example, using a geometric transform built with selected feature points extracted from the SDR and HDR images. Subsequently, SDR and HDR color patches or colors determined from the aligned SDR and HDR images in image pair(s) may be used to generate a reshaping (SDR-to-HDR) mapping as described herein.

In some "BB2" operational scenarios, instead of or in addition to taking images from natural scenes, some or all image pairs in the plurality of image pairs may (e.g., initially, before image alignment operations, etc.) include captured SDR and HDR images depicting color charts displayed on one or more reference image displays of the same type, for example in a lab environment. For example, the color charts can be generated as 16-bit full HD RGB (color chart) TIFF images. These TIFF images containing the color charts can be displayed as a perceptually quantized (PQ) video signal on the reference image display(s) such as PRM TV(s). The color charts displayed on the reference image display(s) can then be captured by the first and second video capturing devices, respectively.

Figure 2M:
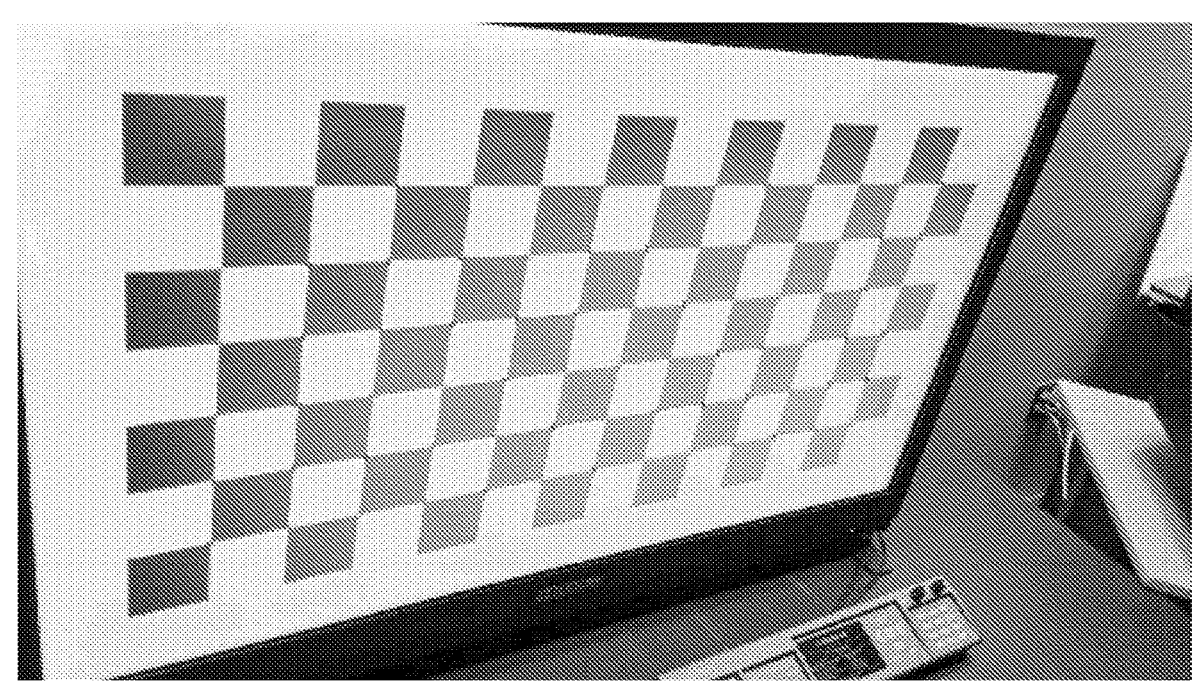
FIG. 2M and FIG. 2N illustrate example checkerboard images.
Figure 2N:
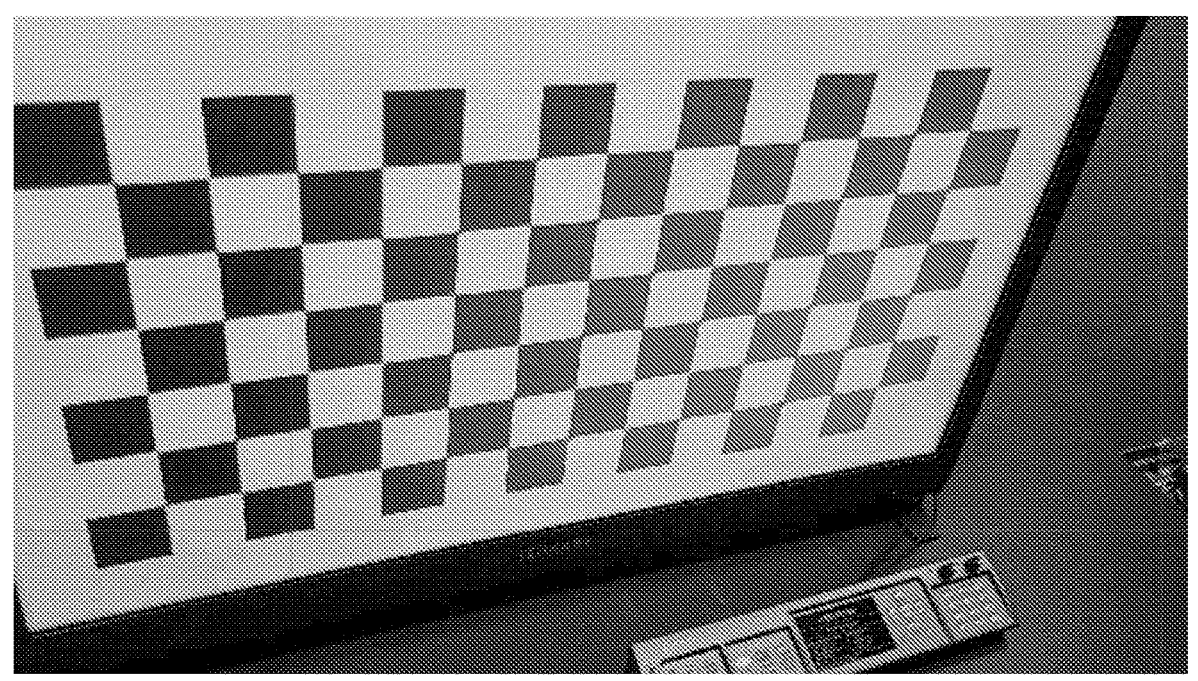

FIG. 2N illustrates an example TIFF image including a color chart. As shown, the color chart may be a central square, in the TIFF image, that includes a plurality of color blocks with a set of distinct colors to be captured and matched between the first and second devices. Each color in the set of distinct colors may be different from all other colors in the set of distinct colors. The set of distinct colors may be displayed by the reference image display(s) with a set of distinct pixel/codeword values. Hence, each color in the set of distinct colors may correspond to a respective pixel or codeword value in the set of distinct pixel/codeword values.

Different TIFF images may include different color charts with different pluralities of colors or different sets of distinct colors. Each color chart in a respective TIFF image among the different TIFF images may correspond to a respective plurality of set of distinct colors among the different pluralities or sets of distinct colors.

Each corner rectangle of four corner rectangles in the TIFF image of FIG. 2N include a checkerboard pattern. The same corner rectangle or the same checkerboard patterns may be included in different TIFF images containing different color charts. The checkerboard patterns at the four corners of the TIFF image can be used as spatial keys or fiducial marks for the estimation of projective transform as will be discussed in detail later. Additionally, optionally or alternatively, the TIFF image may include one or more numbers, binary coding, QR codes, etc., as a unique identifier (ID) assigned to or used to identify the TIFF image or a color chart therein, or a set or plurality of colors therein, etc.

To find correspondence/mapping relationships of as many colors as possible between the first and second video capturing devices, color charts in TIFF images as described herein may include as many different (sets or pluralities of) colors as possible—corresponding to as many different pixel/codeword values as possible—subject to display capabilities of the reference image display(s) to differentiate different colors. In addition, a color chart may be displayed with different overall intensities or illuminations for the purpose of causing the first and second video capturing devices to exercise different exposure settings under different illumination conditions. Accordingly, the same color displayed within a color chart in a TIFF image can be displayed with different intensities or illuminations on the reference image display(s).

Figure 3E:
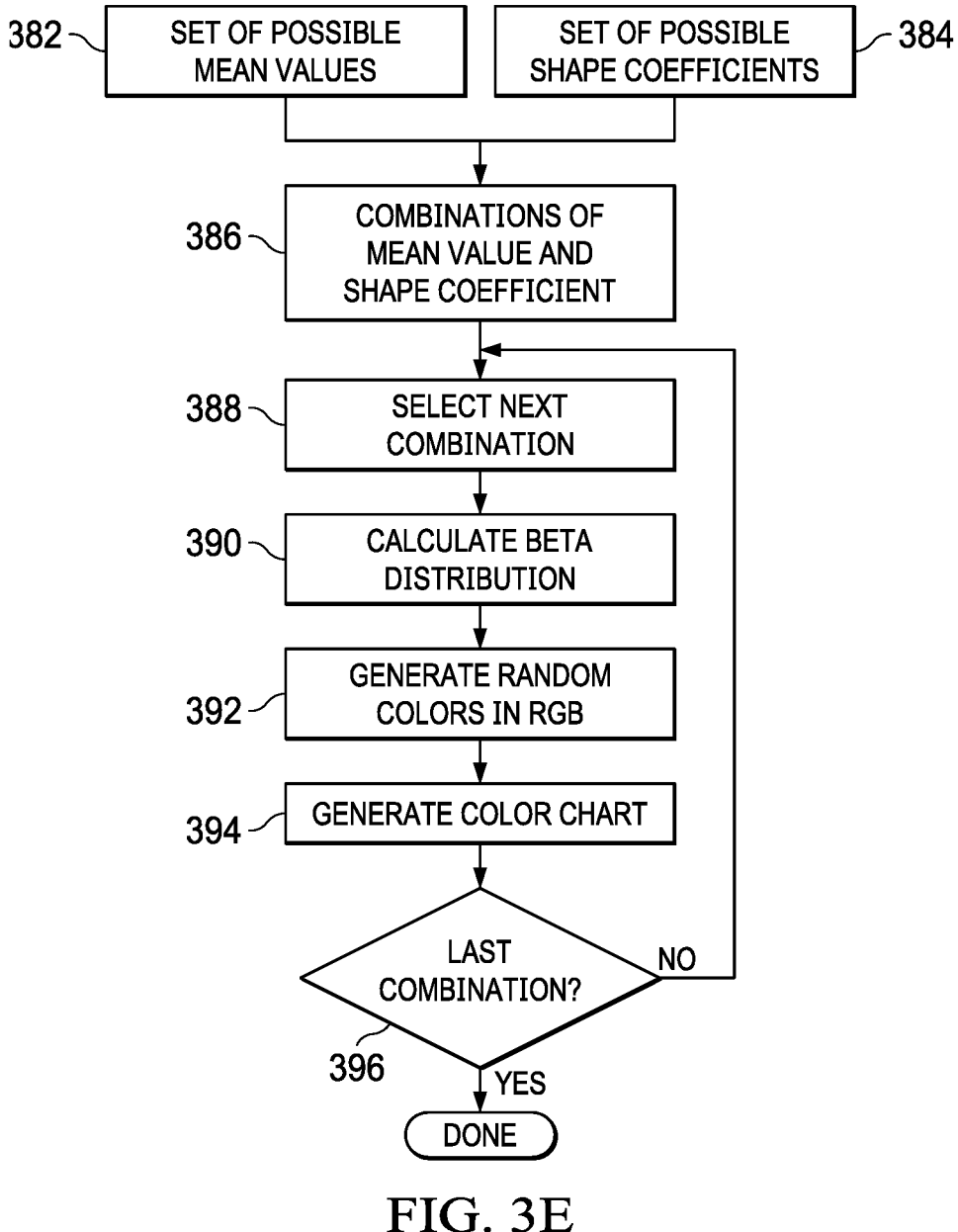
FIG. 3E illustrates an example process flow to generate a plurality of different color charts.

FIG. 3E illustrates an example process flow to generate a plurality of different color charts to be included in a plurality of different TIFF images. To generate each color chart, mean and variance values of (e.g., RGB, etc.) colors in the color chart may be determined and used to randomly generate the colors using a (type of) statistical distribution. In some operational scenarios, the statistical distribution represents a beta distribution or distribution type. Different color charts with different pluralities or sets of distinct colors therein can be generated with different combinations of mean and variance values for the statistical distribution or distribution type.

Block 382 comprises defining or determining a set of possible mean values (denoted as $\mathcal{M}_{PQ}$) in a PQ domain or color space.

In operational scenarios in which a reference image display used to display TIFF images containing color charts is a PRM TV, maximum and minimum luminance values supported by the reference image display may range between 1000 nits and 0 nit or even a larger dynamic range and contrast ratios. By way of example but not limitation, minimum and maximum PQ values that can be displayed by the reference image display without clipping may be given as: $P_0 = L2PQ(0)$ and $P_1 = L2PQ(1000)$, respectively, where $L2PQ(\bullet)$ denotes a mapping function from (linear or non-PQ) luminance to (non-linear or PQ) luma codewords in the PQ domain or color space.

In a non-limiting example, the set $\mathcal{M}_{PQ}$ can be defined as a set of different PQ luma codewords corresponding to (linear) luminance values evenly distributed in a (linear) luminance value range from $L_{lower}$ to $L_{upper}$ on a log scale. The lower bound $L_{lower}$ may be set to a value such as $10^{-4}$, whereas the upper bound $L_{upper}$ may be set to a value such as $10^{2.99}$ (e.g., fractional exponent value selected for numerical stability, etc.), depending in part or in whole on image capturing capabilities (e.g., to capture the darkest and brightest luminances, etc.) of the first and second devices. The log scale is used as luma codewords in captured SDR and HDR images may be approximately linear to the log of luminance in the luminance value range. The total number of possible mean values in—or the magnitude $|\mathcal{M}_{PQ}|$ of—the set of possible mean values may, but is not necessarily limited to only, set as follows: $|\mathcal{M}_{PQ}| = 2048$.

Block 384 comprises defining or determining a set of possible shape coefficients used to generate possible variance values for the statistical distribution or distribution type (e.g., beta distribution, etc.).

In some operational scenarios, the beta distribution used to randomly select colors or codeword values is defined, or has support, over a scaled or closed value interval [0, 1]. Given PQ values over a PQ codeword value range of [$P_0$, $P_1$], a scaled mean value $\mu$, where $0 < \mu < 1$ or within the closed value interval of the beta distribution, may be computed, as follows:

$$\mu = (\mu_{PQ} - P_0)/(P_1 - P_0), \text{ where } \mu_{PQ} \in \mathcal{M}_{PQ} \qquad (94)$$

The scaled variance (denoted as $\sigma^2$) for the beta distribution in the scaled or closed value interval [0, 1] can be adaptively set to be proportional to $\mu(1-\mu)$ to avoid over/under exposures caused by large variance of (e.g., luminance in, etc.) color blocks during SDR and HDR image capturing by the first and second devices, as follows:

$$\sigma^2 = \mu(1 - \mu)/\theta \qquad (95)$$

where $\theta$ denotes a shape coefficient that affects or determines the (e.g., more compressed, more expanded, etc.) shape of the beta distribution. Values for the shape coefficients can be selected from a set of possible shape coefficients $\Theta$ to allow the generated color charts to have relatively high diversities in codeword values and/or colors resulted therefrom. A non-limiting example for the set of possible shape coefficients may be: $\Theta = \{3,6,9,12\}$.

Block 386 comprises generating a plurality of all unique combinations of scaled mean values and shape coefficients using the set of possible mean value and the set of shape coefficients for different instances of the statistical (e.g., beta, etc.) distributions. In the present example, the total number of unique combinations is given as follows: $|\mathcal{M}_{PQ}| \times |\Theta| = 2048 \times 4 = 8192$, where $|\Theta|$ denotes the total number of elements or magnitude in the set $\Theta$. In some operational scenarios, a different TIFF image containing a different color chart may be generated for each unique combination of scaled mean value and shape coefficient in the plurality of all unique combinations of scaled mean values and shape coefficients, thereby giving the total number of different color charts or corresponding different TIFF images as $|\mathcal{M}_{PQ}| \times |\Theta|$.

Block 388 comprises selecting a current combination of scaled mean and shape coefficient values, from among the plurality of all unique combinations of scaled mean values and shape coefficients, to be the next combination. A set or plurality of different pixel or codeword values respectively specifying or defining a set or plurality of different colors for a current color chart corresponding to the current combination of scaled mean and shape coefficient values can be generated from the beta distribution given the scaled mean $\mu$ in the current combination and a current scaled variance $\sigma^2$ in the current combination.

Block 390 comprises calculating or defining the beta distribution, as follows:

$$f(x; \alpha, \beta) = x^{\alpha-1}(1 - x)^{\beta-1}/B(\alpha, \beta) \text{ for } x \in [0, 1] \qquad (96)$$

where $\alpha$ and $\beta$ are beta distribution parameters; $B(\alpha,\beta)$ denotes a normalization constant. The beta distribution parameters $\alpha$ and $\beta$ can in turn be derived from the mean and variance values of the beta distribution, as follows:

$$\alpha = \mu v \text{ and } \beta = (1 - \mu)v, \text{ where } v = \mu(1 - \mu)/\sigma^2 - 1 \qquad (97)$$

Block 392 comprises generating a set of different (e.g., 144, etc.) colors (or pixel/codeword values) for the current color chart or the current color chart image based on a set of (e.g., 144, etc.) random numbers generated from the beta distribution. Each random number denoted as x (where $0 \le x \le 1$), can be scaled back or converted to a corresponding per-channel pixel or codeword value (referred to as "PQ value") within the PQ value range [$P_0$, $P_1$] as follows:

$$x_{PQ} = x(P_1 - P_0) + P_0 \qquad (98)$$

A set of PQ values generated from scaling back or converting the set of random numbers into the PQ value range can then be generated from the set of random numbers and used as a set of per-channel codeword values or codewords for the set of colors in the current color chart. In some operational scenarios, for each color chart, the same beta distribution (with the same mean and shape coefficient) is used, for example with three different sets of random numbers, to generate per-channel codewords for each of the multiple (e.g., RGB, etc.) channels of the color space in which display images are to be rendered by the reference image display. Accordingly, the average color that is generated from averaging colors represented in all color blocks in the color chart is close to a neutral or gray color.

Block 394 comprises generating the current color chart or the central block of the corresponding TIFF image. The current color chart may include a set of (e.g., 2D square, etc.) color blocks each of which is a single color given by a specific (cross-channel or composite) pixel or codeword value with three per-channel pixel or codeword value. Three sets of per-channel codewords generated from the same beta distribution—but with three different sets of random numbers—may be used by the reference image display to respectively drive rendering of red, blue, green channels of color blocks in the set of color blocks in the current color chart or the current TIFF image.

Additionally, optionally or alternatively, a RGB value used to specify or generate a background color for the background of the color chart image may be set to the mean PQ value $\mu_{PQ}$ from which the scaled mean value of the beta distribution is derived.

Block 396 comprises determining whether the current combination of scaled mean and shape coefficient values is the last combination in the plurality of all unique combinations of scaled mean values and shape coefficients. If so, the process flow ends for generating the plurality of different color charts or different color chart images. Otherwise, the process flow goes back to block 388.

By way of illustration but not limitation, a total number denoted as $n_c$ of different colors or color blocks such as 144 may be generated for each color chart. The total number of colors or color blocks generated from the plurality of different color charts and color chart images may be given as: $|\mathcal{M}_{PQ}| \times |\Theta| \times n_c = 2048 \times 4 \times 144 = 1179648$ colors or color blocks, which can be used to determine correspondence/ match relationships between SDR color patches or codewords captured in the SDR capture mode with the first video capturing device and corresponding HDR color patches or codewords captured in the HDR capture mode with the second video capturing device.

In some operational scenarios, the plurality of TIFF images respectively containing the plurality of color charts can be iteratively displayed or rendered on the reference image display such as a PRM TV with a constant playback framerate and can be captured in SDR and HDR images by the first and second vide capturing devices, respectively. As illumination of the reference image display may vary with viewing angles, the SDR and HDR images can be captured separately by the first and second video capturing devices (e.g., two phones, etc.) placed at the same position and orientation in relation or reference to the reference image display. Hence, SDR and HDR video signals or bitstreams containing captured SDR and HDR images of the color charts or TIFF images as rendered on the reference image display can be generated by the first and second devices or cameras thereof, respectively. Since the playback framerate of the reference image display may be kept constant, frame numbers of color charts can be determined relatively easily to establish an image pair in which a captured SDR image by the first video capturing device and a captured HDR image by the second video capturing device depict the same color chart in the plurality of color charts. The captured SDR and HDR images may be represented in SDR and HDR YCbCr (or YUV) color space, for example in YUV image/ video files.

Figure 3F:
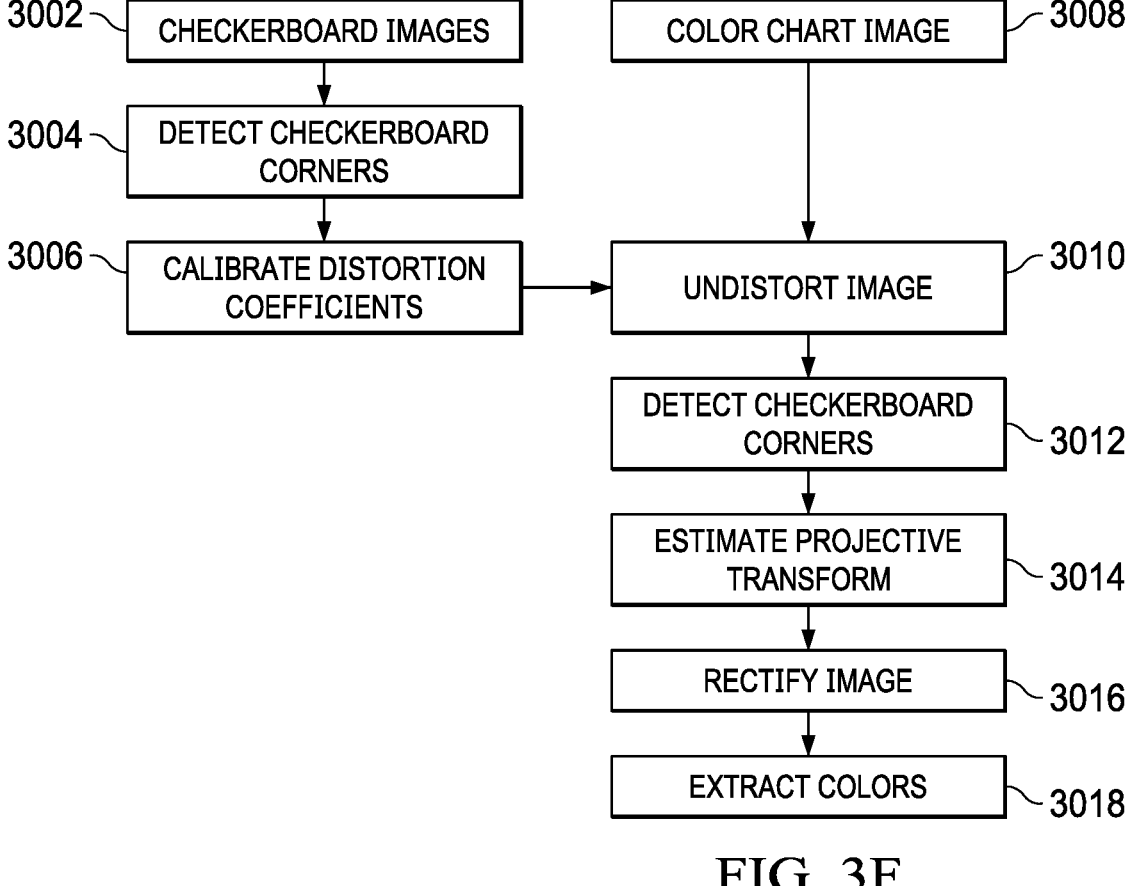
FIG. 3F illustrates an example process flow for matching SDR and HDR colors between an image pair of captured SDR and HDR images.

FIG. 3F illustrates an example process flow for matching SDR and HDR colors between an image pair of captured SDR and HDR images for each color chart in the plurality of color charts. To extract respective colors of individual color blocks from the captured SDR and HDR images of a color chart image containing the color chart, the captured SDR and HDR images can be converted into the same layout as the (original) color chart image displayed on the reference image display.

Block 3002 comprises receiving captured (SDR or HDR) checkerboard images, which may be taken by a camera of one of the first and second video capturing devices from a displayed checkerboard image displayed on the reference image display. Blocks 3002 through 3006 of the same process flow of FIG. 3F may be performed with respect to captured checkerboard images taken by a camera of the other of the first and second video capturing devices from the same displayed checkerboard image displayed on the reference image display.

Block 3004 comprises detecting checkerboard corners from the captured checkerboard images by the camera of the device.

Block 3006 comprises computing or calibrating camera distortion coefficients for the camera using the checkerboard corners detected from the captured checkerboard images. 3D (reference) coordinates of the checkerboard image displayed on the reference image display may be first determined in a 3D coordinate system stationary to the reference image display. Camera parameters such as distortion coefficients and other intrinsic parameters of the camera used by the device to generate the captured checkerboard images can be computed as optimized values that generate the best mapping (e.g., the least errors or least mismatch, etc.) between the 3D reference coordinates of the checkerboard corners and 2D (image) coordinates of the checkerboard corners in the captured checkerboard images. This calibration process can be performed in either YUV or RGB color space which the displayed checkerboard image or the captured checkerboard images may be converted to or represented in.

FIG. 2M and FIG. 2N illustrate two example checkerboard images detected from captured (HDR and SDR, respectively) images of the checkerboard image. Pluralities of (e.g., 100, etc.) captured checkerboard images can be used to determine, compute or calibrate distortion coefficients or other intrinsic parameters of respective cameras used in the first and second video capturing devices to achieve a relatively high accuracy (e.g., within a half pixel for camera reprojection error, etc.) in projecting captured images by the respective cameras of a displayed image on the reference image display onto the displayed image on the reference image display.

The (camera-specific) distortion coefficients and intrinsic parameters of the cameras of the first and second video capturing devices obtained in processing blocks 3002 through 3006 can then be used to analyze or correlate between captured SDR and HDR images from TIFF images containing respective color charts as follows.

Block 3008 comprises receiving a captured (SDR or HDR) image of a TIFF image—displayed on the reference image display—containing a color chart as well as checkerboard corners (or checkerboard patterns in corners). The captured (SDR or HDR) image may be captured by a camera for which distortion coefficients have been obtained beforehand in block 3006 using the previously captured checkerboard images (which may not contain color charts).

Block 3010 comprises correcting or undistorting the captured image of the displayed TIFF image to correct camera lens distortion of the camera, for example using the distortion coefficients obtained in the camera calibration process such as block 3006.

Block 3012 comprises detecting checkerboard corners in the captured image. The checkerboard corners are captured from the checkerboard corners in (e.g., four corners in, etc.) the displayed TIFF image on the reference image display, which may be a PPM TV.

Block 3014 comprises estimating a projective transform between image coordinates of the captured image and image coordinates of the original TIFF image, which is displayed on the reference image display and captured in the received captured image.

Block 3016 comprises rectifying the captured image into the same layout as the original TIFF image using the estimated projective transform. With the estimated projective transform, the captured image can be rectified into the same spatial layout as the original TIFF image.

FIG. 2O illustrates (a) a captured image from the (displayed) TIFF image, (b) a rectified captured image generated by rectifying the captured image with camera distortion correction and a projective transform and (c) an original TIFF color chart image displayed on the reference image display. As the rectified captured image of FIG. 2O (b) is generated from un-distortion or rectification operation performed on the captured image of FIG. 2O (a), some pixels in the rectified image of FIG. 2O (b) may be undefined.

Block 3018 comprises locating and extracting (a set of) individual color blocks from the color chart in the rectified captured image. As used herein, a color block is specified with a single corresponding (e.g., RGB, YCbCr, composite, etc.) pixel or codeword value. Corresponding individual codewords respectively specifying the individual color blocks in the captured image can be determined based on pixel or codeword values of pixels in these individual color blocks in the rectified captured image. In addition, individual original codewords respectively specifying individual original color blocks—corresponding to the individual color blocks of the rectified captured image—in the original TIFF image can be determined from an RGB or YUV file for the original TIFF image.

Correspondence/mapping relationships between SDR color blocks or codewords extracted from a (rectified) captured SDR image of an original color chart image and HDR color blocks or codewords extracted from a (rectified) captured HDR image of the same original color chart image can be established based in part or in whole on the individual original color blocks or codewords in the original TIFF image from which both the (rectified) SDR and HDR image are derived.

Using the plurality of TIFF images, a plurality of SDR images captured by the first video capturing device in the SDR capture mode from the displayed TIFF images, and a plurality of HDR images captured by the second video capturing device in the HDR capture mode from the same displayed TIFF images, a plurality of correspondence or mapping relationships may be established between a set of SDR colors and a set of HDR images.

Several approaches may be used to map SDR images to HDR images.

In a first approach, as in some "BB1" operational scenarios, in some "BB2" operational scenarios, the mapped SDR and HDR color patches or colors can be used to generate (e.g., static, etc.) SDR-to-HDR reshaping operational parameters such as TPB coefficients. These TPB coefficients may be combined with TPB basis functions using SDR codewords of SDR images as input parameters to predict corresponding HDR codewords of reconstructed HDR images. A static 3D-LUT may be pre-built and deployed to a video capturing device (e.g., the first video capturing device, etc.) for mapping SDR images captured by the first video capturing device to reconstructed HDR images simulating HDR looks of the second video capturing device. Since HDR color blocks or codewords used to generate the reshaping operational parameters are extracted from captured (training) HDR images of the second video capturing device, it is likely that predicted HDR codewords generated with the reshaping operational parameters are likely to provide mapped HDR looks in the reconstructed HDR images similar to actual HDR looks of actual HDR images captured by the second video capturing device.

In a second approach, in some "BB2" operational scenarios, non-TPB optimization may be used to generate non-TPB reshaping operational parameters to be used in non-TPB reshaping operations to map captured SDR images taken by the first video capturing device to reconstructed HDR images simulating the HDR looks of the second video capturing device. A 3D-LUT for non-TPB reshaping operations may be directly built, without relatively high continuity and smoothness supported by TPB reshaping operations. This non-TPB second approach provides relatively high design freedom and may be relatively flexible, even though different colors represented in nearby 3D-LUT entries/nodes may or may not have relatively high continuity and smoothness. In some operational scenarios, with the relatively high design freedom, the non-TPB second approach may be more suitable than the first approach to the two-device or "BB2" operational scenarios in which SDR images from one device are to be mapped to HDR images simulating HDR looks of another device.

The non-TPB second approach may make use of a 3D mapping table (3DMT) to build a backward reshaping mapping or a backward lookup table (BLUT) representing the backward reshaping mapping. The BLUT may be used to map SDR (e.g., cross-channel, three-channel, etc.) codewords of SDR images to HDR (e.g., chroma channel, per chroma-channel, etc.) codewords of reconstructed HDR images. Example operations to build backward reshaping mappings such as BLUTs from 3DMT can be found in U.S. patent application Ser. No. 17/054,495, filed on May 9, 2019, the contents of which are entirely incorporated herein by reference as if fully set forth herein.

For the purpose illustration only, SDR codewords may be represented in three dimensions or channels Y, Cb, Cr in an SDR YCbCr color space. The 3D mapping table may be generated from a 3D histogram having a plurality of 3D histogram bins. The plurality of 3D histogram bins may correspond to a plurality of color space partitions generated by partitioning each dimension or channel with a respective positive integer among three positive integers $Q_y$, $Q_{Cb}$, $Q_{Cr}$, thereby giving rise to a total of $(Q_y \times Q_{Cb} \times Q_{Cr})$ 3D histogram bins.

Each 3D histogram bin (denoted as q) in the plurality of 3D histogram bins (denoted as $\Omega^{Q,s}$) of the 3D histogram may be specified with a respective bin index or three respective quantized channel values $q=(q_y, q_{Cb}, q_{Cr})$ in the dimensions or channels of the SDR (YCbCr) color space and store a pixel count for all SDR color patches or codewords within the SDR color space partition represented by the 3D histogram bin. All the bin indexes (or quantized channel values) for the plurality of 3D histogram bins can be collected into a set of bin index values denoted as Q, where $Q=[Q_y, Q_{C_0}, Q_{Cr}]$.

In addition, sums of HDR codewords mapped to SDR codewords within each 3D histogram in the plurality of 3D histograms may be computed and stored for the 3D histogram bin. Let $$\Psi_Y^{Q,v} \Psi_{Cb}^{Q,v} \text{ and } \Psi_{Cr}^{Q,v}$$

denote the sums of the HDR codewords (also referred to as "mapped HDR luma and chroma values").

An example procedure for generating SDR pixel counts and mapped HDR luma and chroma values for the 3D histogram bins of the histogram is illustrated in TABLE 2 below.

TABLE 2

// STEP 1: 3D SDR histogram and 3D-mapped HDR chroma values initialization $\Omega_q^{Q,s} = 0$ where $q = (q_y, q_{Cb}, q_{Cr})$ and $q_{ch} = 0, \ldots, Q_{ch} - 1$, for each $ch = \{Y, Cb, Cr\}$ $\Psi_{Y,q}^{Q,v} = 0$ where $q = (q_y, q_{Cb}, q_{Cr})$ and $q_{ch} = 0, \ldots, Q_{ch} - 1$, for each $ch = \{Y, Cb, Cr\}$ $\Psi_{Cb,q}^{Q,v} = 0$ where $q = (q_y, q_{Cb}, q_{Cr})$ and $q_{ch} = 0, \ldots, Q_{ch} - 1$, for each $ch = \{Y, Cb, Cr\}$ TABLE 2-continued $\Psi_{Cr,q}^{Q,v} = 0$ where $q = (q_y, q_{Cb}, q_{Cr})$ and $q_{ch} = 0, \ldots, Q_{ch} - 1$, for each $ch = \{Y, Cb, Cr\}$ // STEP 2: scan for each pixel in SDR and HDR-chroma from all color patches
for (i = 0; i < P; i ++) { // P represents the total number of pixels $q_y = \left\lfloor \dfrac{s_i^y}{Q_y} \right\rfloor;$    // SDR downsampled–luma quantized value $q_{Cb} = \left\lfloor \dfrac{s_i^{C_0}}{Q_{Cb}} \right\rfloor;$    // SDR chroma 0 quantized value $q_{Cr} = \left\lfloor \dfrac{s_i^{C_1}}{Q_{Cr}} \right\rfloor;$    // SDR chroma 1 quantized value $\Omega_q^{Q,s} ++;$    // 3D SDR histogram $\Psi_{Y,q}^{Q,v} = \Psi_{Y,q}^{Q,v} + v_i^{c_0};$    // Mapped HDR Y values $\Psi_{Cb,q}^{Q,v} = \Psi_{Cb,q}^{Q,v} + v_i^{c_0};$    // Mapped HDR Cb values $\Psi_{Cr,q}^{Q,v} = \Psi_{Cr,q}^{Q,v} + v_i^{c_1};$    // Mapped HDR Cr values

}

Let $$\left( s_q^{y,(B)}, s_q^{Cb,(B)}, s_q^{Cr,(B)} \right)$$

denote a (representative) SDR codeword at the center of the q-th 3D histogram bin. Representative codewords for all the 3D histogram bins can be fixed for all SDR images/frames and precomputed with an example procedure as shown in TABLE 3 below.

TABLE 3

// Set for each bin the SDR mapping values
// Recall that the bin index q = (q_y, q_{Cb}, q_{Cr}).
for (q_y = 0; q_y < Q_y ; q_y++)
  for (q_{Cb} = 0; q_{Cb} < Q_{Cb}; q_{Cb}++ )
    for (q_{Cr} = 0; q_{Cr} < Q_{Cr}; q_{Cr}++) {

$s_q^{y,(B)} = \dfrac{(q_y + 0.5)}{Q_y}$    // SDR normalized bin–value luma component $s_q^{Cb,(B)} = \dfrac{(q_{Cb} + 0.5)}{Q_{Cb}}$    // SDR normalized bin–value Cb component $s_q^{Cr,(B)} = \dfrac{(q_{Cr} + 0.5)}{Q_{Cr}}$    // SDR normalized bin–value Cr component

}

Next, 3D histogram bins with non-zero (SDR) pixel counts may be identified in the plurality of 3D histogram bins and kept, where all other 3D histogram bins with zero (SDR) pixel counts are discarded or removed from the plurality of 3D histogram bins.

Let $q_0, q_1, \ldots q_{k-1}$, denote all k 3D histogram bins each with non-zero (SDR) pixel counts or $$\Omega_q^{Q,s} \neq 0,$$

where k is a positive integer. Average values of mapped HDR luma and chroma values $$\bar{\Psi}_Y^{Q,v}, \bar{\Psi}_{Cb}^{Q,v} \text{ and } \bar{\Psi}_{Cr}^{Q,v}$$

may be computed for each 3D histogram bin in the k 3D histogram bins with non-zero (SDR) pixel counts by dividing the sums of HDR luma and chroma values to which SDR codewords of the SDR pixels are mapped over the number or pixel count of SDR pixels in in the 3D histogram bin, for example, using a procedure as shown in TABLE 4 below.

TABLE 4

// Set for each bin the SDR mapping values
// The non-zero bin index q_i = (q_y, q_{Cb}, q_{Cr}).
for (i = 0; i < k; i++) {

$\bar{\Psi}_{Y,q_i}^{Q,v} = \dfrac{\Psi_{Y,q_i}^{Q,v}}{\Omega_{q_i}^{Q,s}};$    // Average 3D–Mapping HDR Y values $\bar{\Psi}_{Cb,q_i}^{Q,v} = \dfrac{\Psi_{Cb,q_i}^{Q,v}}{\Omega_{q_i}^{Q,s}};$    // Average 3D–Mapping HDR Cb values $\bar{\Psi}_{Cr,q_i}^{Q,v} = \dfrac{\Psi_{Cr,q_i}^{Q,v}}{\Omega_{t,}^{Q,s}};$    // Average 3D–Mapping HDR Cr values

}

The 3D-LUT can be built from the 3DMT represented by the 3D histogram storing respective SDR pixel counts in the 3D histogram bins and respective mapped HDR codeword values. Each node/entry in the 3D-LUT or 3DMT can be built with a mapping key represented by a specific SDR codeword $(q_y, q_{Cb}, q_{Cr})$ represented in each 3D histogram bin of the k 3D histogram bins and a mapped HDR codeword represented by $$(\Psi_{Y,q_i}^{Q,v}, \Psi_{Cb,q_i}^{Q,v} \text{ and } \Psi_{Cr,q_i}^{Q,v})$$

as computed for the 3D histogram bin in TABLE 4 above. Additionally, optionally or alternatively, for those 3D histogram bins with zero SDR pixel count, the nearest or neighbor 3D bin(s) with the closest bin index(es) can be used to fill in missing mapped HDR value(s), for example through tri-linear interpolation.

As noted, example operations to build a 3D-LUT from 3DMT to serve as a non-TPB backward reshaping mapping or a BLUT—for example for predicting HDR chroma codewords per chroma channel from cross-channel SDR codewords—are described in the previously mentioned U.S. patent application Ser. No. 17/054,495.

In some "BB2" operational scenarios, a luma backward reshaping mapping may be used to backward reshape SDR luma codewords of a SDR image into predicted or backward reshaped HDR luma codewords of a corresponding HDR image using GPR-based model. Example generation of luma reshaping mappings using GPR-based model can be found in U.S. Provisional Patent Application Ser. No. 62/887,123, "Efficient user-defined SDR-to-HDR conversion with model templates," by Guan-Ming Su and Harshad Kadu, filed on Aug. 15, 2019, and PCT Application Ser. No. PCT/US2020/046032, filed on Aug. 12, 2020, the contents of which are entirely incorporated herein by reference as if fully set forth herein. For example, CDF matching curves may be generated from each training SDR-HDR image pair in a plurality of training SDR-HDR image pairs. Using a set of (e.g., 15, etc.) uniformly sampled SDR points over a SDR codeword range (e.g., the entire SDR codeword range, etc.), corresponding mapped HDR codewords can be found in each of the CDF matching curves. For each sample SDR point in the set of uniformly sampled SDR points, a GPR model may be constructed based on a histogram having a plurality of (e.g., 128, etc.) luma bins histogram and used to generate a corresponding luma reshaping mapping.

TPB Optimization in Editing

Image/video editing is a common application in a video capturing devices such as a mobile device to allow users to adjust color, contrast, brightness, or other user preferences. The image/video editing can be made or performed at the encoder side before captured images are compressed into a (compressed) video signal or bitstream. Additionally, optionally or alternatively, the image/video editing can be made or performed at the decoder side after the video signal bitstream is decoded or decompressed.

Image/video editing operations as described herein can be performed at either or both of an HDR domain and an SDR domain. Image/video editing operations in an HDR domain can be relatively easily performed. For example, after HDR content or images are edited, the edited HDR content or images can be passed in as input or reference HDR images to a video pipeline that generates corresponding reshaped or ISP SDR content or images to be encoded in a video signal or bitstream. In comparison, image/video editing operations in an SDR domain can be relatively challenging. While HDR-to-SDR and/or SDR-to-HDR mappings can be designed or generated to ensure or enhance revertability between the SDR domain and the HDR domain, the image/video editing operations performed with SDR images that are to be encoded into a video signal or bitstream is likely to cause difficulties or challenges for reverting or backward reshaping the edited SDR images to generate reconstructed HDR images that approximate the reference HDR images.

Figures 3G, 3H, 3I, 3J:
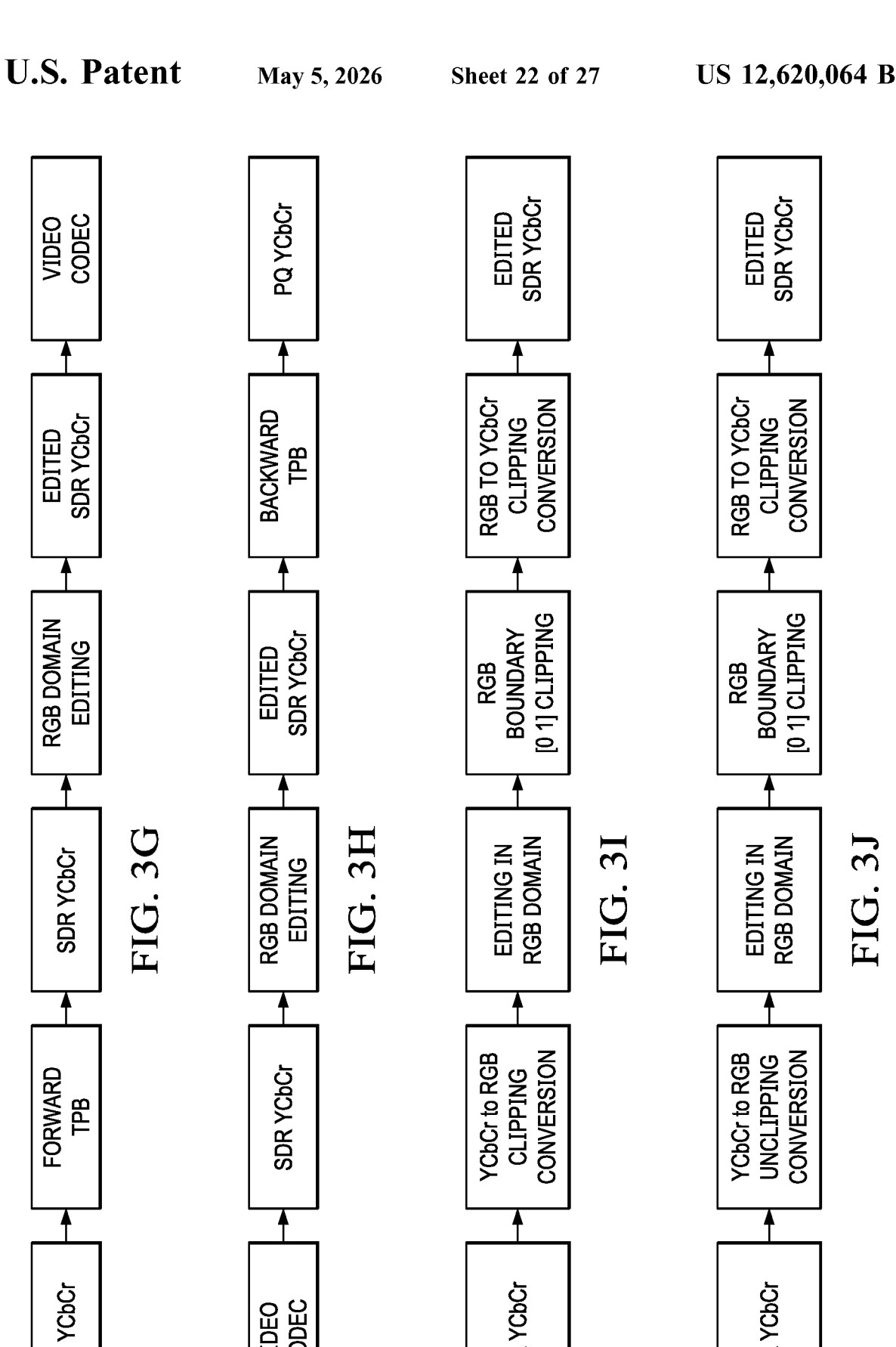
FIG. 3G and FIG. 3H illustrate example encoder-side and decoder-side image/video editing operations.
FIG. 3I through FIG. 3M illustrate example solutions for clipping out-of-range codewords in image/video editing applications.

FIG. 3G illustrates example image/video editing operations at the encoder side performed with an upstream device or video encoder such as a video capturing device. As shown, input HDR image may be represented in an input HDR domain or color space (denoted as "HLG YCbCr"). TPB based forward reshaping operations (denoted as "forward TPB") may be performed to forward reshape the input HDR images into forward reshaped SDR images represented in a forward reshaped SDR domain or color space (denoted as "SDR YCbCr"). Image/video editing operations (denoted as "RGB domain editing") may be performed to edit the forward reshaped SDR images to generate edited SDR image represented in an edited forward reshape SDR domain or color space (denoted as "edited SDR YCbCr"). The edited SDR image represented in the edited forward reshape SDR domain or color space may be compressed or coded with one or more video codecs of the upstream device into a video signal or bitstream.

FIG. 3H illustrates example image/video editing operations at the decoder side performed with a downstream recipient device or video decoder. As shown, a video signal or bitstream is decoded by one or more video codecs of the downstream device into SDR images represented in an SDR domain or color space (denoted as "SDR YCbCr"). Image/video editing operations (denoted as "RGB domain editing") may be performed to edit the SDR images to generate edited SDR image represented in an edited forward reshape SDR domain or color space (denoted as "edited SDR YCbCr"). TPB based backward reshaping operations (denoted as "Backward TPB") may be performed on the edited SDR image represented in the edited forward reshape SDR domain or color space to generate backward reshaped or reconstructed HDR images in a reconstructed HDR domain or color space ("PQ YCbCr").

As shown in FIG. 3G and FIG. 3H, the SDR images encoded into the video signal at the encoder side or the SDR images decoded from the video signal may be represented in a (e.g., forward reshaped, etc.) SDR domain or color space such as an SDR YCbCr domain or color space with which the video codecs can be programed or developed to perform image processing operations relatively efficiently. By way of example but not limitation, the image/video editing operations can take place in an SDR RGB domain or color space as illustrated in FIG. 3G and FIG. 3H. The RGB-to-YCbCr conversion or the YCbCr-to-RGB conversion may be performed through a (e.g., standard specified, etc.) conversion such as the SMPTE range conversion.

As more colors are squeezed into the SDR domain or color space, codewords in the forward reshaped domain or color space such as the SDR YCbCr color space often may exceed a codeword value range such as the SMPTE range in the SDR RGB color space in which the image/video editing operations. Applying the YCbCr-to-RGB conversion—which converts YCbCr codewords in an YCbCr codeword value range (normalized in a value range of [0, 1]) of the SDR YCbCr color space to RGB codewords of the SDR RGB color space—may cause some of the RGB codewords to exceed or go beyond the SMPTE range (normalized in a value range of [0, 1]) of the SDR RGB color space. While these out-of-range codeword values can be clipped, the clipped codeword values may not be able to be restored in the (e.g., TPB based, etc.) backward reshaping operations to non-clipped original HDR codewords. Additional operations as described herein may be used to enhance revertability and reduce or avoid visual artifact in the image/video editing applications.

FIG. 3I through FIG. 3M illustrate a number of example solutions for clipping out-of-range codewords in image/video editing applications.

In some operational scenarios, as illustrated in FIG. 3I, out-of-range SDR RGB codewords generated from an YCbCr-to-RGB conversion (denoted as "YCbCr to RGB clipping conversion") performed on an SDR YCbCr image at the encoder or decoder side can be clipped—e.g., all greater than one (1) are hard clipped to 1, all lower than zero (0) are hard clipped to 0, etc.—to a valid or designated codeword value range such as [0, 1]. Image/video editing operations ("Editing in RGB domain") can then be performed with SDR RGB codewords in the valid or designated codeword value range in the SDR RGB color space. Edited SDR RGB codewords in the SDR RGB color space can be converted and clipped by an RGB-to-YCbCr conversion (denoted as "RGB to YCbCr clipping conversion") into converted edited SDR YCbCr codewords in a valid or designated codeword value range such as [0, 1] of a converted edited SDR YCbCr color space (denoted as "Edited SDR YCbCr").

In some operational scenarios, as illustrated in FIG. 3J, out-of-range SDR RGB codewords generated from an YCbCr-to-RGB conversion (denoted as "YCbCr to RGB unclipping conversion") performed on an SDR YCbCr image at the encoder or decoder side are not clipped to a valid or designated codeword value range such as [0, 1]. Image/video editing operations ("Editing in RGB domain") can then be performed with (input) SDR RGB codewords not clipped in the valid or designated codeword value range in the SDR RGB color space to generate edited SDR codewords. The YCbCr to RGB conversion with unclipping operations allows original information in the (input) SDR YCbCr codewords to be kept in the (input) SDR RGB codewords received by the image/video editing operations. The image/video editing operations take in all possible real codeword values—including less than 0 or larger than 1, for example in a limited but wider than [0 1] value range—in the input SDR RGB codewords. As a result, some information in the input SDR YCbCr codewords can be preserved in the input SDR RGB codewords as well in the edited SDR RGB codewords. SDR RGB boundary operations (denoted as "RGB boundary [0 1] clipping")—for example optionally based on user preferences of a user operating a video editing application—can be performed to scale down or squeeze the edited SDR RGB codewords outside the valid or designated range of [0, 1] back to inside the valid or designated range of [0, 1], thereby generating scaled edited SDR RGB codewords within the valid or designated range of [0, 1]. The scaled edited SDR RGB codewords in the SDR RGB color space can be converted and clipped by an RGB-to-YCbCr conversion (denoted as "RGB to YCbCr clipping conversion") into converted scaled edited SDR YCbCr codewords in a valid or designated codeword value range such as [0, 1] of a converted scaled edited SDR YCbCr color space (denoted as "Edited SDR YCbCr").

Figures 3K, 3L, 3M:
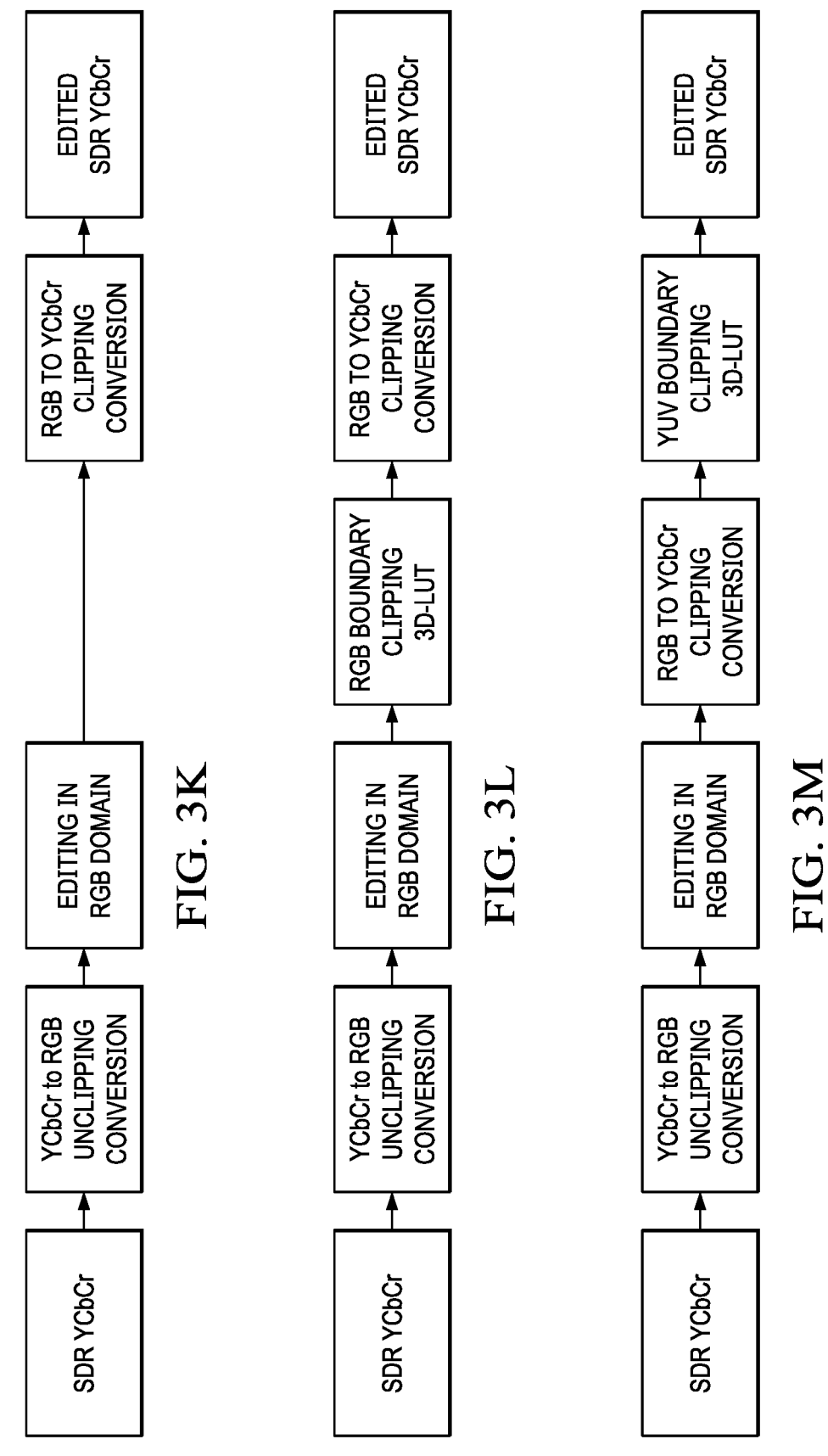

In some operational scenarios, as illustrated in FIG. 3K, out-of-range SDR RGB codewords generated from an YCbCr-to-RGB conversion (denoted as "YCbCr to RGB unclipping conversion") performed on an SDR YCbCr image at the encoder or decoder side are not clipped to a valid or designated codeword value range such as [0, 1]. Image/video editing operations ("Editing in RGB domain") can then be performed with (input) SDR RGB codewords not clipped in the valid or designated codeword value range in the SDR RGB color space to generate edited SDR codewords. The YCbCr to RGB conversion with unclipping operations allows original information in the (input) SDR YCbCr codewords to be kept in the (input) SDR RGB codewords received by the image/video editing operations. The image/video editing operations take in all possible real codeword values—including less than 0 or larger than 1, for example in a limited but wider than [0 1] value range—in the input SDR RGB codewords. As a result, some information in the input SDR YCbCr codewords can be preserved in the input SDR RGB codewords as well in the edited SDR RGB codewords. Unlike those illustrated in FIG. 3J, in the operational scenarios illustrated in FIG. 3K, SDR RGB boundary operations may not be performed. The edited SDR RGB codewords in the SDR RGB color space can be converted and clipped by an RGB-to-YCbCr conversion (denoted as "RGB to YCbCr clipping conversion") into converted edited SDR YCbCr codewords in a valid or designated codeword value range such as [0, 1] of a converted edited SDR YCbCr color space (denoted as "Edited SDR YCbCr").

In some operational scenarios, as illustrated in FIG. 3L, out-of-range SDR RGB codewords generated from an YCbCr-to-RGB conversion (denoted as "YCbCr to RGB unclipping conversion") performed on an SDR YCbCr image at the encoder or decoder side are not clipped to a valid or designated codeword value range such as [0, 1]. Image/video editing operations ("Editing in RGB domain") can then be performed with (input) SDR RGB codewords not clipped in the valid or designated codeword value range in the SDR RGB color space to generate edited SDR codewords. The YCbCr to RGB conversion with unclipping operations allows original information in the (input) SDR YCbCr codewords to be kept in the (input) SDR RGB codewords received by the image/video editing operations. The image/video editing operations take in all possible real codeword values—including less than 0 or larger than 1, for example in a limited but wider than [0 1] value range—in the input SDR RGB codewords. As a result, some information in the input SDR YCbCr codewords can be preserved in the input SDR RGB codewords as well in the edited SDR RGB codewords. SDR RGB boundary operations (denoted as "RGB boundary clipping 3D-LUT")—for example optionally based on user preferences of a user operating a video editing application—can be performed to scale down or squeeze the edited SDR RGB codewords outside a (3D) boundary supported by TPB-based reshaping operations back to inside the boundary, thereby generating scaled edited SDR RGB codewords within the boundary supported by or well defined in TPB based reshaping operations. The boundary supported by the TPB based reshaping operations may not be a regular shape or a cube simply defined with a fixed value range of [0, 1]. The scaled edited SDR RGB codewords in the SDR RGB color space can be converted and clipped by an RGB-to-YCbCr conversion (denoted as "RGB to YCbCr clipping conversion") into converted scaled edited SDR YCbCr codewords in a valid or designated codeword value range such as [0, 1] of a converted scaled edited SDR YCbCr color space (denoted as "Edited SDR YCbCr").

The (input) SDR YCbCr image may be obtained from an original HDR image through forward reshaping or ISP processing with a known (e.g., white box, ISP, etc.) HDRto-SDR forward transform or mapping, the boundary may be determined and represented as a (TPB boundary clipping) 3D-LUT based in part or in whole on the HDR-to-SDR forward or mapping and/or any applicable color space conversion matrix(es). For example, using a full grid sampling data that covers the entire HDR domain or color space in which the original HDR image is represented, boundary pixel or codeword values in the forward reshaped or ISP SDR color space can be determined.

After the image/video editing operations ("Editing in RGB domain"), the edited SDR RGB codewords can be scaled or squeezed—or clipped irregularly—into a 3D shape delineated or enclosed by the boundary. In some operational scenarios, since the converted scaled edited SDR YCbCr codewords are already placed within a corresponding boundary in the SDR YCbCr color space that is supported by TPB-based backward reshaping operations, the scaled edited SDR RGB codewords in the SDR RGB color space can be converted by the RGB-to-YCbCr conversion ("RGB to YCbCr clipping conversion") into the converted scaled edited SDR YCbCr codewords without further clipping by the RGB-to-YCbCr conversion ("RGB to YCbCr clipping conversion"). In these operational scenarios as illustrated in FIG. 3J, a maximized number of colors can be preserved in the converted scaled edited SDR YCbCr codewords as well as in backward reshaped HDR codewords generated from the converted scaled edited SDR YCbCr codewords by the TPB based backward reshaping operations while avoiding generating color artifacts.

In some operational scenarios, as illustrated in FIG. 3M, out-of-range SDR RGB codewords generated from an YCbCr-to-RGB conversion (denoted as "YCbCr to RGB unclipping conversion") performed on an SDR YCbCr image at the encoder or decoder side are not clipped to a valid or designated codeword value range such as [0, 1]. Image/video editing operations ("Editing in RGB domain") can then be performed with (input) SDR RGB codewords not clipped in the valid or designated codeword value range in the SDR RGB color space to generate edited SDR codewords. The YCbCr to RGB conversion with unclipping operations allows original information in the (input) SDR YCbCr codewords to be kept in the (input) SDR RGB codewords received by the image/video editing operations. The image/video editing operations take in all possible real codeword values—including less than 0 or larger than 1, for example in a limited but wider than [0 1] value range—in the input SDR RGB codewords. As a result, some information in the input SDR YCbCr codewords can be preserved in the input SDR RGB codewords as well in the edited SDR RGB codewords. The edited SDR RGB codewords in the SDR RGB color space can be converted and clipped by an RGB-to-YCbCr conversion (denoted as "RGB to YCbCr clipping conversion") into converted edited SDR YCbCr codewords in a valid or designated codeword value range such as [0, 1] of a converted edited SDR YCbCr color space (denoted as "Edited SDR YCbCr"). The converted edited SDR YCbCr codewords in the converted edited SDR YCbCr color space ("Edited SDR YCbCr") can be clipped by SDR YCbCr boundary operations (denoted as "YCbCr boundary clipping 3D-LUT")—for example optionally based on user preferences of a user operating a video editing application—can be performed to scale down or squeeze the converted edited SDR YCbCr codewords outside a (3D) boundary supported by TPB-based reshaping operations back to inside the boundary, thereby generating scaled converted edited SDR YCbCr codewords in a scaled converted edited SDR YCbCr color space (denoted as "Edited SDR YCbCr")

within the boundary supported by or well defined in TPB based reshaping operations. The boundary supported by the TPB based reshaping operations may not be a regular shape such as a cube with its sides defined simply as valid or designated (normalized) ranges of [0, 1].

The (input) SDR YCbCr image may be obtained from an original HDR image through forward reshaping or ISP processing with a known (e.g., white box, ISP, etc.) HDR-to-SDR forward transform or mapping, the boundary may be determined and represented with a (TPB boundary clipping) 3D-LUT based on the HDR-to-SDR forward or mapping and/or any applicable color space conversion matrix(es). For example, using a full grid sampling data that covers the entire HDR domain or color space in which the original HDR image is represented, boundary pixel or codeword values in the forward reshaped or ISP SDR color space can be determined.

Construction of and Clipping with Boundary Clipping 3D-LUT

An HDR-to-SDR forward reshaping or mapping such as TPB based forward reshaping may be a non-linear function. While input HDR codewords in an input HDR domain or color space may be well organized within a simple 3D cube, the boundary of mapped SDR codewords generated from applying the (non-linear or TPB) HDR-to-SDR mapping may be relatively irregular unlike a 3D cube.

To perform (TPB) boundary clipping with respect to the relatively irregular boundary, a (TPB) boundary clipping 3D-LUT may be constructed. The 3D-LUT can be looked up with a SDR codeword as input (or lookup key) and returns the SDR codeword as value in response to determining that the SDR codeword is within the boundary. Otherwise, in response to determining that the SDR codeword is outside the boundary, the 3D-LUT can return a clipped SDR codeword different from the (original SDR codeword the former of which is within the boundary.

In some operational scenarios, boundary clipping can be implemented in two level. In the first level, regular clipping is performed with ranges defined by minimum and maximum values (or lower and upper limits) that define a (3D) codeword range. In the second level, irregular clipping is performed with the (TPB) boundary clipping 3D-LUT.

Figure 3N:
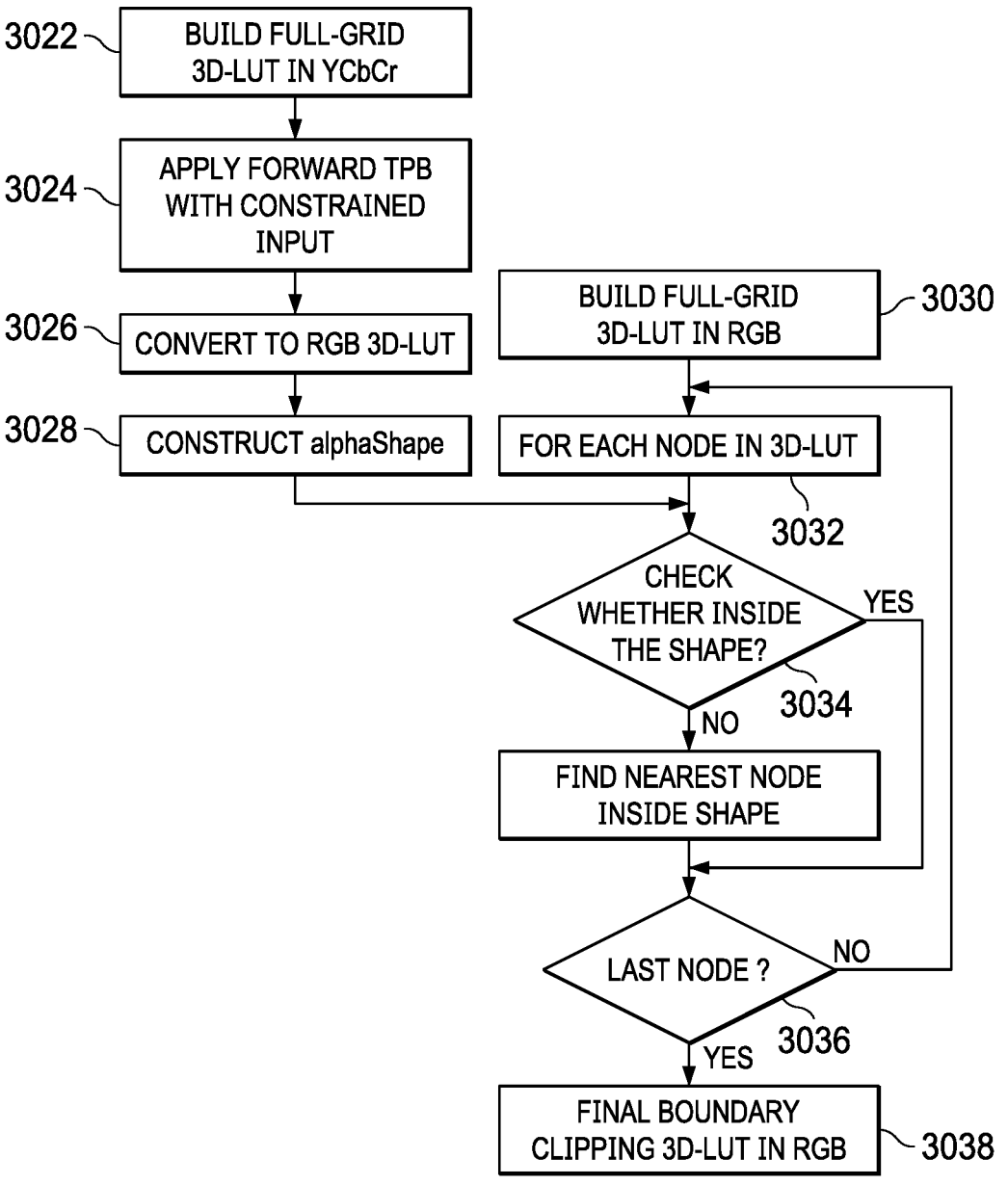

FIG. 3N illustrates an example process flow for constructing a (e.g., TPB, etc.) boundary clipping 3D-LUT. The left side of the process flow as shown in FIG. 3N can be implemented or performed to construct a 3D boundary using alphaShape techniques. The right side of the process flow as shown in FIG. 3N can be implemented or performed to use the constructed 3D boundary to generate the 3D-LUT for irregular clipping.

Block 3022 comprises preparing a 3D uniformly sampling grid or set of sampled values $$\check{V}_{YCbCr}^{(FL),(R2020)}$$

(e.g., given in expressions (42) and (43) above, etc.) in an input HDR YCbCr domain or color space such as the R.2020 (container) domain or color space. By way of illustration but not limitation, the HDR domain or color space represents an HDR YCbCr color space HLG.

The sampled values in the R.2020 YCbCr color space HLG may be converted to corresponding values in the R.2020 RGB color space HLG, as indicated in expression (44) above. The converted values in the R.2020 RGB color space HLG may be further converted to corresponding values in the a RGB color space HLG corresponding to the optimized value ($a^{opt}$) for the parameter a, as indicated in expression (45) above. The converted values in the (a) RGB color space HLG may be clipped as indicated in expression (46) above and converted to corresponding clipped values in the R.2020 RGB color space HLG as indicated in expression (47) above. The clipped values in the R.2020 RGB color space HLG derived with expression (47) above may be converted to corresponding clipped values $$V_{YCbCr}^{(FL),(R2020)}$$

in the R.2020 YCbCr color space HLG, as indicated in expression (48) above.

Block 3024 comprises applying the TPB based forward reshaping (referenced as "forward TPB" in FIG. 3N) with the clipped or constraint (HDR YCbC HLG) values $$V_{YCbCr}^{(FL),(R2020)}$$

(referenced as "constrained input" in FIG. 3N). More specifically, optimized forward TPB coefficients for the TPB based forward reshaping are used or multiplied with a forward generation matrix $$S_F^{ch}$$

(in expression (50) above) built with the clipped HDR values $$V_{YCbCr}^{(FL),(R2020)}$$

in the R.2020 YCbCr color space HLG as input parameters to forward TPB basis functions to obtain mapped or forward reshaped clipped SDR or R.709 YCbCr values denoted as $$\hat{r}_{F,YCbCr}^{(R709),ch,opt},$$

as follows:

$$\hat{r}_{F,YCbCr}^{(R709),ch,opt} = S_F^{ch} m_F^{ch,opt} = \begin{bmatrix} \hat{s}_{0,ch}^{(R709),opt} \\ \hat{s}_{1,ch}^{(R709),opt} \\ \vdots \\ \hat{s}_{N-1,ch}^{(R709),opt} \end{bmatrix} \quad (99)$$

Block 3046 comprises converting the R.709 YCbCr values denoted as $$\hat{r}_{F,YCbCr}^{(R709),ch,opt}$$

to generate SDR or R.709 RGB values in an unclipped RGB domain or color space, as follows:

$$\hat{r}_{i,RGB}^{(R709),opt} = \begin{bmatrix} \hat{s}_{i,R}^{(R709),opt} \\ \hat{s}_{i,G}^{(R709),opt} \\ \hat{s}_{i,B}^{(R709),opt} \end{bmatrix} = T_{YCbCr \to RGB}^{R709} \left( \begin{bmatrix} \hat{s}_{i,Y}^{(R709),opt} \\ \hat{s}_{i,Cb}^{(R709),opt} \\ \hat{s}_{i,Cr}^{(R709),opt} \end{bmatrix} - t_{YCbCr \to RGB}^{R709} \right) \quad (100)$$

The R.709 RGB values as converted from the R.709 YCbCr values may include values outside a valid or designated range such as a value range of [0, 1].

For each channel, minimum and maximum values in the R.709 RGB values given in expression (100) may be measured or determined, as follows:

$$\hat{s}_{min,R}^{(R709),opt} = \min\{\hat{s}_{i,R}^{(R709),opt} \mid \forall i\} \quad \hat{s}_{max,R}^{(R709),opt} = \max\{\hat{s}_{i,R}^{(R709),opt} \mid \forall i\} \quad (100\text{-}1)$$

$$\hat{s}_{min,G}^{(R709),opt} = \min\{\hat{s}_{i,R}^{(R709),opt} \mid \forall i\} \quad \hat{s}_{max,G}^{(R709),opt} = \max\{\hat{s}_{i,G}^{(R709),opt} \mid \forall i\} \quad (100\text{-}2)$$

$$\hat{s}_{min,B}^{(R709),opt} = \min\{\hat{s}_{i,B}^{(R709),opt} \mid \forall i\} \quad \hat{s}_{max,B}^{(R709),opt} = \max\{\hat{s}_{i,B}^{(R709),opt} \mid \forall i\} \quad (100\text{-}3)$$

These extreme values can be used as lower and upper limits in block 3030 to construct or prepare a uniform sampling 3D grid or a set of sampling values in the unclipped RGB domain or color space.

Figure 2P:
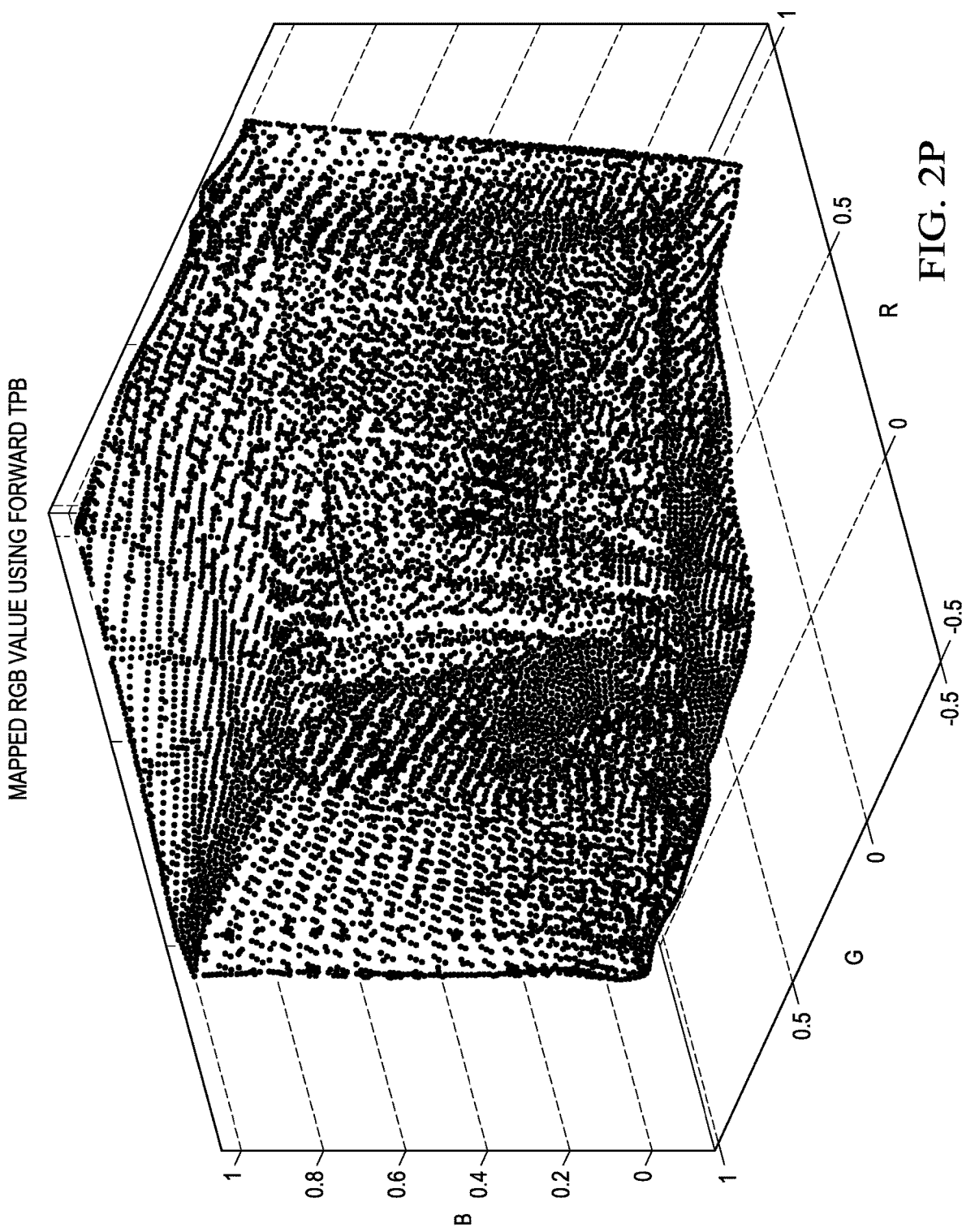
FIG. 2P illustrates an example distribution of RGB values.
Figure 2Q:
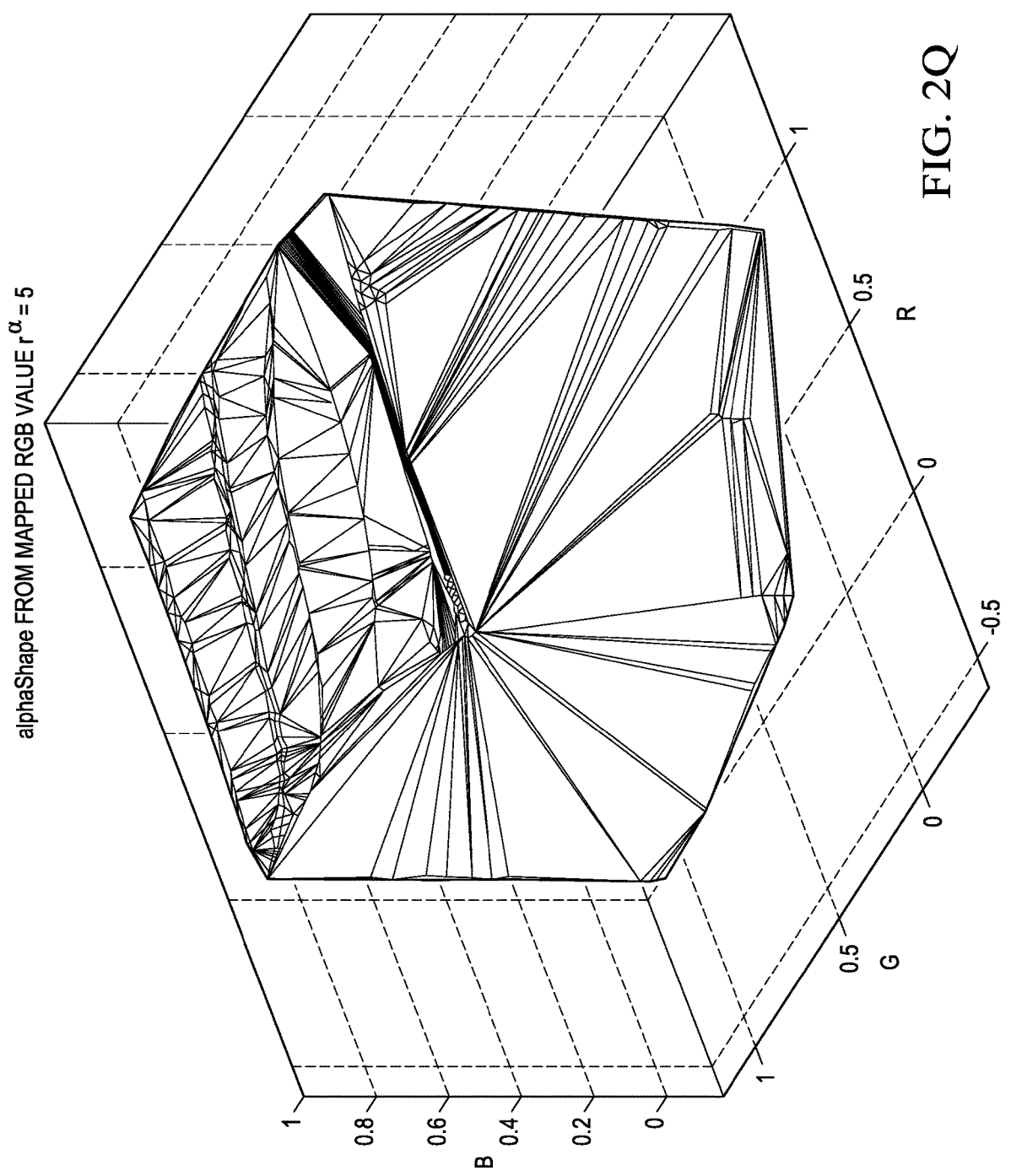
FIG. 2Q through FIG. 2T illustrate example alpha shapes.
Figure 2R:
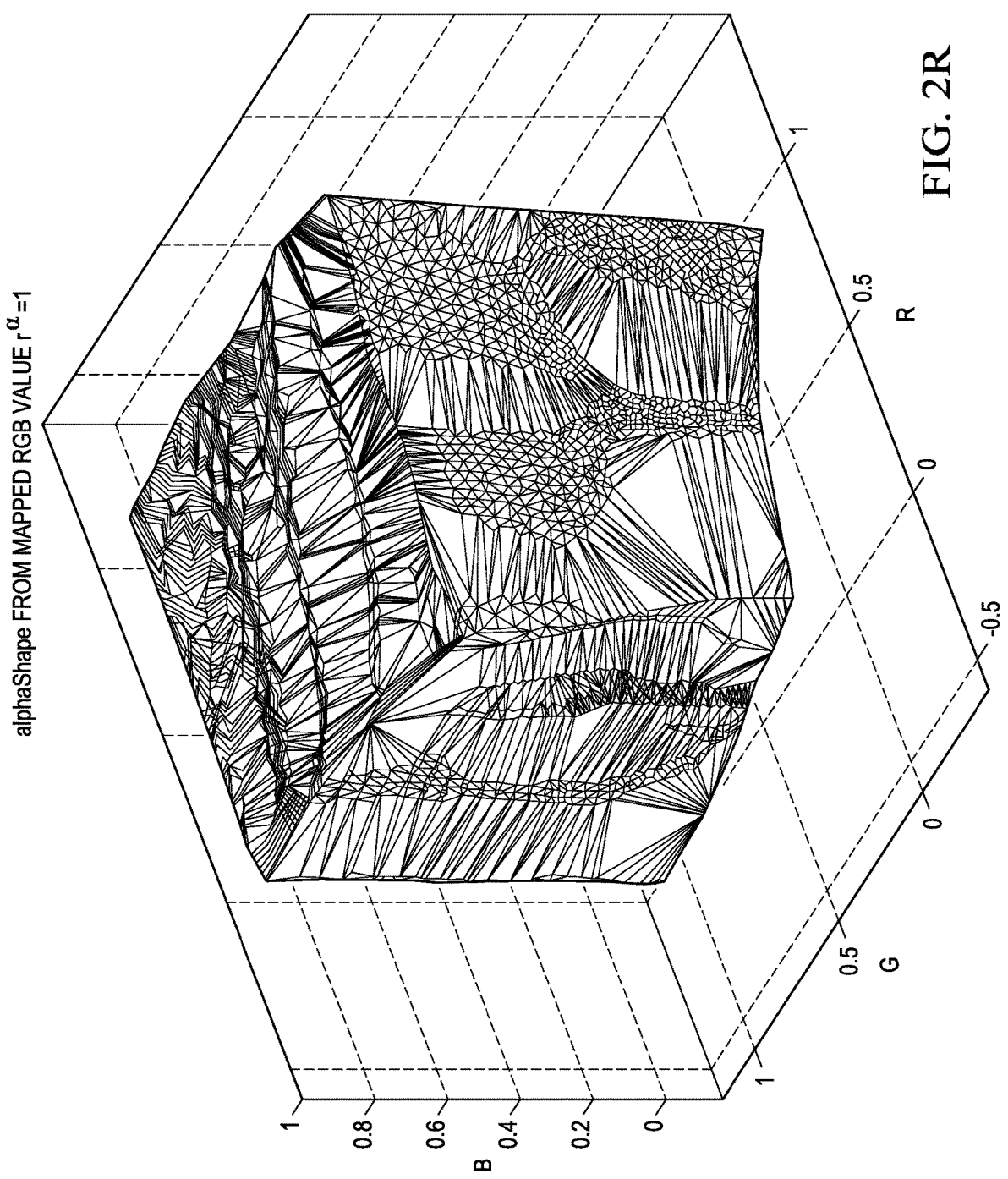
Figure 2S:
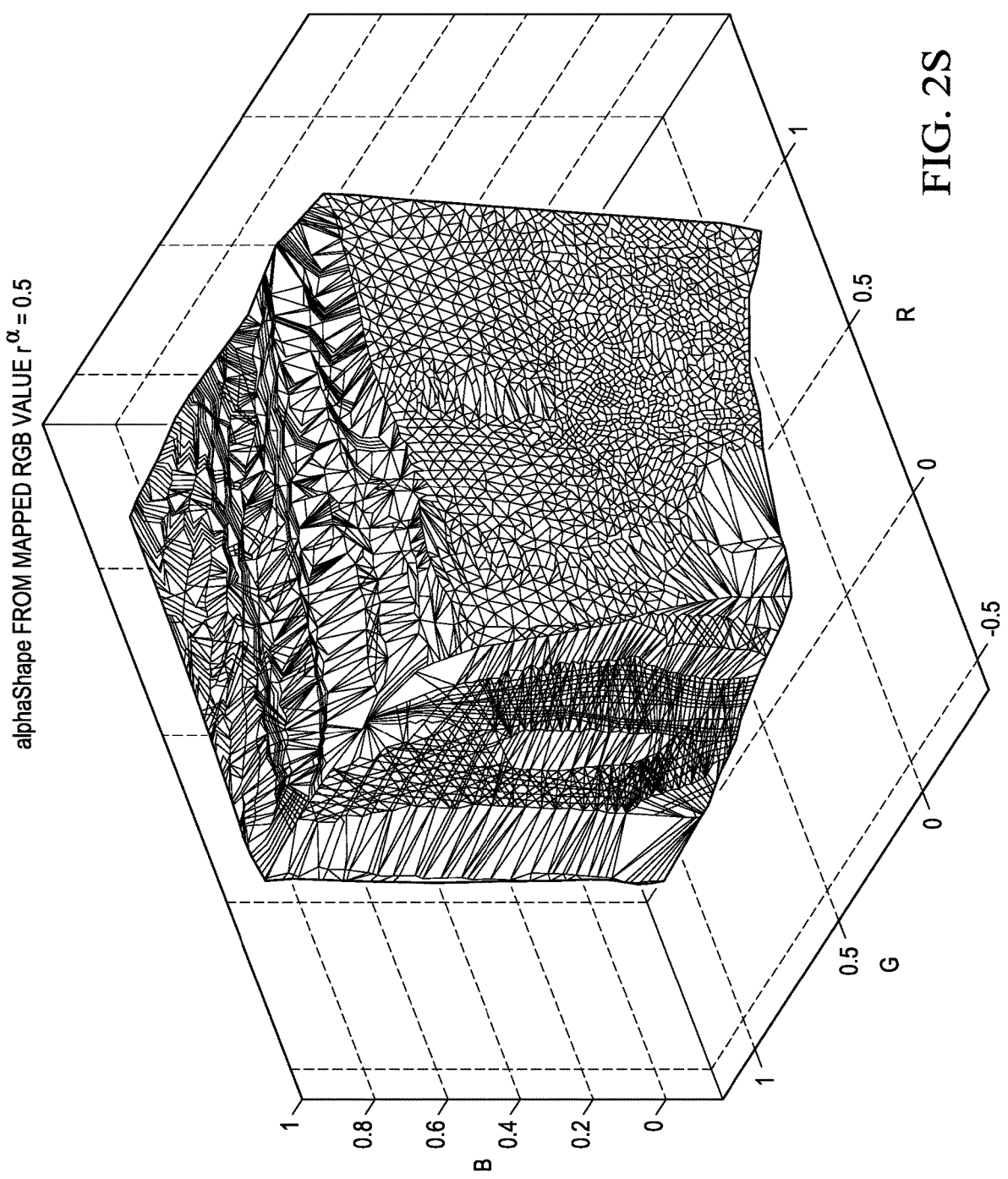
Figure 2T:
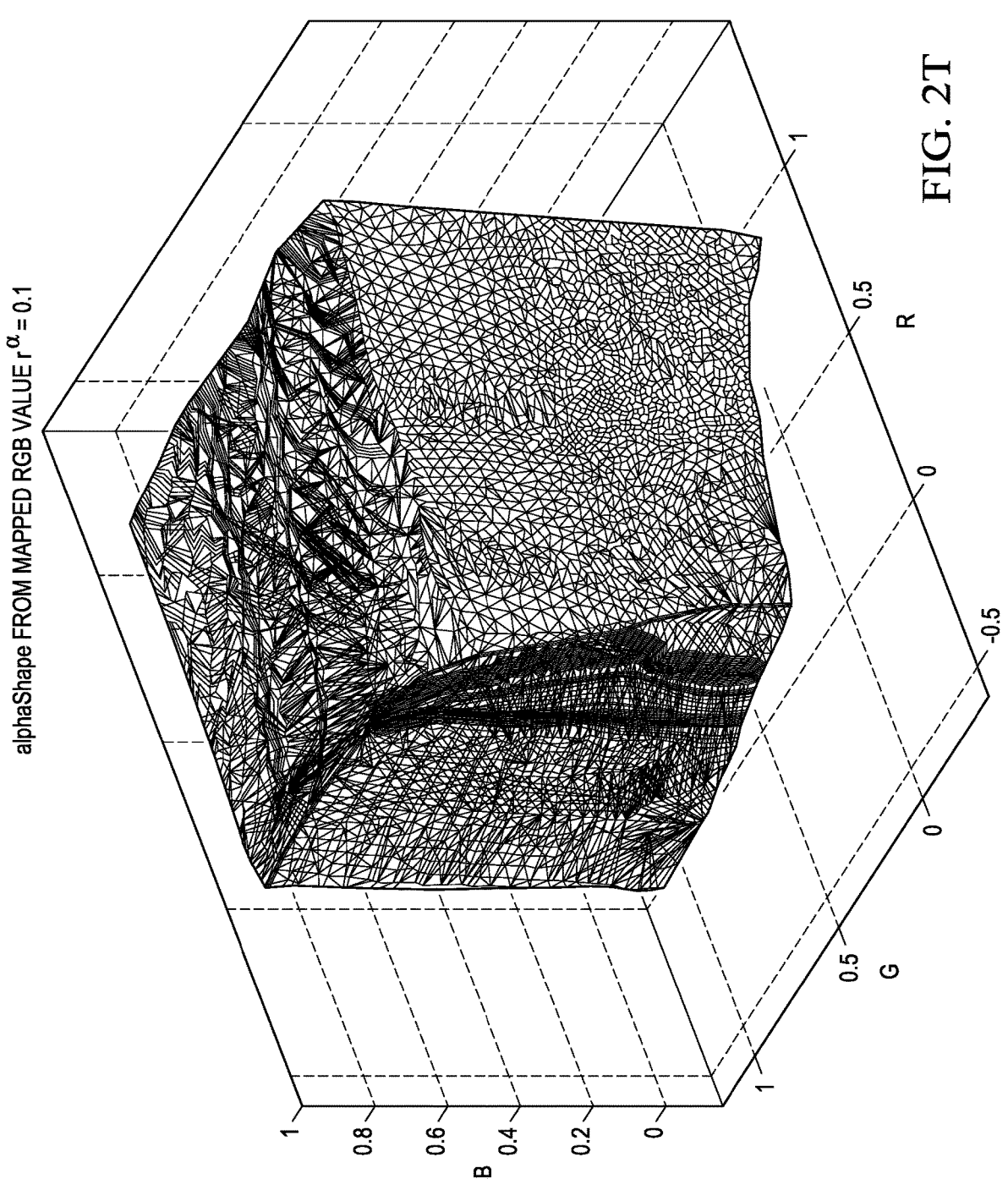

FIG. 2P illustrates an example distribution of R.709 RGB values (in an SDR RGB image) as converted from the R.709 YCbCr values. As shown, the distribution of R.709 RGB values in the SDR RGB image is of an irregular shape other than a 3D cube. The irregular shape with its 3D boundary represents a space of maximum supported SDR RGB colors that can be mapped back or backward reshaped into reconstructed HDR colors in a reconstructed HDR domain or color space without losing information. Any SDR RGB colors outside this irregular shape or range would suffer information loss in backward reshaping operations.

After image/video editing operations are performed on the SDR RGB image, a resultant (3D) codeword range or distribution of edited codewords or colors can be (e.g., much, etc.) wider than the irregular shape in the SDR RGB color space, thereby giving rise to many SDR RGB codewords not defined or supported by the backward reshaping operations.

In addition, it may be difficult to characterize, represent or approximate the actual 3D boundary of the irregular shape using analytical equations or multiple 2D planes that serve to cut a 3D cube in the RGB color space into the irregular shape.

As noted, a two-level clipping solution may be used to clip the edited codewords back into the space of maximum supported RGB colors as represented in the irregular shape. More specifically, at the first level, regular clipping is applied by clipping the edited codewords within a fixed 3D range of $$\begin{bmatrix} \hat{s}_{min,ch}^{(R709),opt} & \hat{s}_{max,ch}^{(R709),opt} \end{bmatrix}.$$

The regular clipping can make use of relatively simple clipping functions based on if-else or min( )/max( ) operations for the purpose of reducing the (input) edited codeword range to the 3D cube (including rectangle) defined or delimited by $$\begin{bmatrix} \hat{s}_{min,ch}^{(R709),opt} & \hat{s}_{max,ch}^{(R709),opt} \end{bmatrix}.$$

At the second level, irregular clipping is applied by clipping those codewords—among the simple clipped edited codewords—that still lie outside the irregular shape into the space of maximum supported SDR RGB colors delineated or specified by the irregular shape. As the relatively irregular clipping boundary of the space of maximum supported SDR RGB colors does not lend to relatively simple clipping operations with analytical equations, simple codes or operations, a boundary clipping 3D-LUT can be used to carry out the irregular clipping at the second level of the two-level clipping solution.

Block 3028 of FIG. 3N comprise, given a set of SDR RGB codewords $$\{\hat{r}_{i,RGB}^{(R709),opt}\},$$

building an alphaShape with available alphaShape construction tools such as alphaShape( ) MATLAB functions. As used herein, an alphaShape refers to a bounding area or volume that envelops a set of 2-D or 3-D points, such as the set of SDR RGB codewords $$\{\hat{r}_{i,RGB}^{(R709),opt}\}$$

in the present example.

An alphaShape object created to represent the alphaShape can be manipulated to generalize a bounding polygons containing the set of SDR RGB codewords $$\{\hat{r}_{i,RGB}^{(R709),opt}\},$$

tighten or loosen the fit of the alphaShape around the SDR RGB codewords $$\{\hat{r}_{i,RGB}^{(R709),opt}\},$$

for example with nonconvex regions. Additional points may be added or removed, for example to suppress holes or regions or to simply the alphaShape.

Denote a function to construct the alphaShape as $f^{\alpha S}(\Phi, r^{\alpha})$, where $r^{\alpha}$ denotes a radius parameter.

By passing the set of SDR RGB codewords $$\{\hat{r}_{i,RGB}^{(R709),opt}\}$$

as the first input parameter to this function, a bounding polyhedra denoted as $\alpha S^{(R709)}$ can be constructed by the alphaShape construction function as follows:

$$\alpha S^{(R709)} = f^{\alpha S}\left(\{\hat{r}_{i,RGB}^{(R709),opt}\}, r^{\alpha}\right) \qquad (102)$$

FIG. 2Q through FIG. 2T illustrate example alphaShapes of the set of SDR RGB points or codewords $$\{\hat{r}_{i,RGB}^{(R709),opt}\}$$

with different $r^{\alpha}$. As shown, a larger value for the radius parameter $r^{\alpha}$ results or constructs a larger polyhedron, which leads to coarser quantization if nearest neighbors are searched for outside SDR RGB points or codewords and used to fill in clipped values for these outside SDR RGB points. On the other hand, a smaller $r^{\alpha}$ results or constructs a smaller polyhedron, which leads to a higher likelihood of creating holes and have a less effective boundary. The radius parameter, $r^{\alpha}$ may be tuned to different values (e.g., 0.1, 0.5, etc.) for different video editing applications to maximize effectiveness or coverage of supported SDR colors and avoid introducing visual artifacts.

The alphaShape provides a boundary polyhedron as a clipping boundary for the irregular shape and allows determining whether a 3D point represented by a SDR RGB codeword is inside the irregular shape or outside the irregular shape.

Let $I^{\alpha S}(\alpha S, x)$ denote a binary function used to determine a 3D point or SDR RGB codeword (denoted as x) is inside the irregular shape or not. Assume a return binary value of "1" indicates inside the irregular shape and a return binary value of "0" is outside.

Let $NN^{\alpha S}(\alpha S, x)$ denote an index function that receives a given query 3D point or SDR RGB codeword such as x as the second input parameter and returns the nearest neighbor point in $\alpha S$ for the query 3D point or SDR RGB codeword x.

As noted, the boundary clipping 3D-LUT can be constructed in the SDR RGB domain or color space to clip any SDR RGB codeword outside the irregular shape representing the space of maximum supported colors by the (TPB based forward and backward) reshaping operations.

Block 3030 comprises building the boundary clipping 3D-LUT as a full-grid 3D-LUT with a plurality of nodes/entries. These nodes/entries in the 3D-LUT include query SDR codewords as lookup keys and returned SDR codewords for the query SDR codewords as values.

The extreme values determined (in block 3026 of FIG. 3N) for each color channel $$\hat{s}_{min,R}^{(R709),opt}, \hat{s}_{max,R}^{(R709),opt}, \hat{s}_{min,G}^{(R709),opt}, \hat{s}_{max,G}^{(R709),opt}, \hat{s}_{min,B}^{(R709),opt}, \text{ and } \hat{s}_{max,G}^{(R709),opt}$$

may be used as lower or upper limits for a 3D cube (or rectangle). The query SDR codewords represented or included in the 3D-LUT may form a full grid that includes 3D points uniformly sampled over the 3D codeword range defined by the extreme values or lower/upper limits. For example, for each dimension or color channel represented by a corresponding axis among R-axis, G-axis, B-axis, the codeword value range between $$\left[\hat{s}_{min,ch}^{(R709),opt} \hat{s}_{max,ch}^{(R709),opt}\right]$$

in that dimension or color channel can be uniformly sampled into a respective total number of partitions among three total numbers of partitions $N_R$, $N_G$, and $N_B$ corresponding to three dimensions or color channels, as follows:

$$u_{ijk} = \begin{bmatrix} \frac{i}{N_R - 1} \left( \hat{s}_{max,R}^{(R709),opt} - \hat{s}_{min,R}^{(R709),opt} \right) + \hat{s}_{min,R}^{(R709),opt} \\ \frac{i}{N_G - 1} \left( \hat{s}_{max,G}^{(R709),opt} - \hat{s}_{min,G}^{(R709),opt} \right) + \hat{s}_{min,G}^{(R709),opt} \\ \frac{i}{N_B - 1} \left( \hat{s}_{max,B}^{(R709),opt} - \hat{s}_{min,B}^{(R709),opt} \right) + \hat{s}_{min,B}^{(R709),opt} \end{bmatrix} \quad (103)$$

$$\text{for } i \in [0, \ldots, N_R - 1], j \in [0, \ldots, N_G - 1], k \in [0, \ldots, N_B - 1]$$

Hence, the total number of represented query SDR codewords in the 3D-LUT may be given as $N_u = N_R N_G N_B$.

Block 3032 comprises starting to execute a node processing loop for each node/entry in the 3D-LUT by selecting a current node/entry (e.g., in a sequential or non-sequential looping/iteration order, etc.) among the plurality of nodes/entries in the 3D-LUT.

For simplicity, (i, j, k) in expression (103) above can be vectorized as p. The current node/entry may be the p-th node/entry in the plurality of nodes/entries in the 3D-LUT. A lookup key for the p-th node/entry may be represented by the p-th represented query SDR RGB codeword denoted as $u_p$ on the LHS of expression (103) above. Let $\bar{u}_p$ denote a current output clipped SDR RGB codeword or value returned by the p-th node/entry of the 3D-LUT given the p-th represented query SDR RGB codeword as the lookup key.

Block 3034 comprises checking or determining whether the current or p-th represented query SDR RGB codeword $u_p$ for the current node/entry is inside the alphaShape $\alpha S^{(R709)}$ (or the shape constructed with an alpha shape construction function as shown in expression (102) above) generated in block 3028. In response to determining that the current or p-th represented query SDR RGB codeword $u_p$ for the current node/entry is inside the alphaShape $\alpha S^{(R709)}$, the process flow goes to block 3036. Otherwise, the process flow goes to block 3040.

The plurality of nodes/entries in the 3D-LUT includes a subset of nodes or entries each of which has a respective lookup key specified by a represented query SDR RGB codeword that lies within the alphaShape $\alpha S^{(R709)}$. Hence, the subset of nodes or entries include nodes or entries that are deemed to be within the alphaShape $\alpha S^{(R709)}$.

Block 3040 comprises finding the nearest node/entry among the subset of nodes/entries within the alphaShape $\alpha S^{(R709)}$ for the current node/entry. The nearest node/entry has the nearest represented query SDR RGB codeword ($\bar{u}_p$) as the lookup key such that the nearest represented query SDR RGB codeword $\bar{u}_p$ has a minimum distance, as measured with an Euclidean or non-Euclidean distance in the SDR RGB color space, to the current or p-th represented query SDR RGB codeword $u_p$ as compared with all other represented query SDR RGB codewords for all other nodes/entries in the subset of nodes or entries within the alphaShape $\alpha S^{(R709)}$.

In some operational scenarios, the nearest represented query SDR RGB codeword $\bar{u}_p$ for the current or p-th represented query SDR RGB codeword $u_p$ may be given with the previously mentioned index function $NN^{\alpha S}(\alpha S, x)$, as follows:

$$\ddot{p} = NN^{\alpha S}\left( \alpha S^{(R709)}, u_p \right) \quad (104)$$

The nearest represented query SDR RGB codeword $\bar{u}_p$ represents a boundary clipped value for the current or p-th represented query SDR RGB codeword $u_p$. This boundary clipped value $\bar{u}_p$ is set to be the returned value for the current or p-th node entry in the 3D-LUT, whereas the current or p-th represented query SDR RGB codeword $u_p$ is set to be the lookup key for the current or p-th node entry in the 3D-LUT.

Block 3036 comprises setting the current or p-th represented query SDR RGB codeword $u_p$ as the returned value for the current or p-th node entry (in addition to being the lookup key) in the 3D-LUT and determining whether the current or p-th node/entry is the last node or entry in the plurality of nodes/entries in the 3D-LUT. In response to determining that the current or p-th node/entry is the last node or entry in the plurality of nodes/entries in the 3D-LUT, the process flow goes to block 3038. Otherwise, the process flow goes back to block 3032.

Block 3038 comprises outputting the 3D-LUT as the final boundary clipping 3D-LUT (denoted as $$f_{3DLUT}^{\alpha S}()$$

in the SDR RGB color space.

An example procedure for generating the final boundary clipping 3D-LUT $$f_{3DLUT}^{\alpha S}()$$

is illustrated in TABLE 5 below.

TABLE 5

```
for each node/entry uₚ in the 3D-LUT
    // check whether it is outside αS
    // if it is outside, the nearest neighbor is found for clipping
    if Iᵅˢ (αS^(R709), uₚ ) = = 1      // inside
        ūₚ = uₚ
    else                              // outside
        p̈ NNᵅˢ (αS^(R709), uₚ )
        ūₚ = αS^(R709) ( p̈ )
    end if
end for
output the 3D-LUT as f_{3DLUT}^{αS}( )
```

Given the (final) boundary clipping $$3D\text{-}LUT f_{3DLUT}^{\alpha S}(),$$

boundary clipping can be performed relatively efficiently on an (e.g., edited, etc.) SDR image using the previously mentioned two-level solution. As noted, regular clipping can be performed to make sure all (e.g., edited, etc.) SDR RGB codewords in the SDR image are within the extreme values or upper/lower limits for SDR RGB codewords in a SDR RGB color space in which image/video editing operations on the SDR image have been performed. The regular clipping is then followed by irregular clipping by passing the (regularly clipped if applicable) SDR codewords as lookup keys to the (final) boundary clipping $$3D\text{-}LUT f_{3DLUT}^{\alpha S}(),$$

boundary clipping and using returned values from the (final) boundary clipping $$3D\text{-}LUT f_{3DLUT}^{\alpha S}()$$

as output (further irregularly clipped if applicable) SDR codewords in an output (e.g., clipped edited, etc.) SDR image.

In various operational scenarios including but not limited to those illustrated in FIG. 3I through FIG. 3M, regular and/or irregular clipping operations as described herein can be applied to video capturing and/or editing applications for the purpose of ensuring a maximized support for reconstructing HDR images from SDR images and preventing/reducing visual artifacts in the reconstructed HDR images. Example Process Flows FIG. 4A illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, a system as described herein builds sampled high dynamic range (HDR) color space points distributed throughout an HDR color space. The HDR color space is parameterized by a color primary scaling parameter with a candidate value selected from among a plurality of candidate values. The color primary scaling parameter is used to compute color space coordinates of at least one of multiple color primaries delineating the HDR color space.

In block 404, the system generates from the sampled HDR color space points in the HDR color space: (a) reference standard dynamic range (SDR) color space points represented in a reference SDR color space, (b) input HDR color space points represented in an input HDR color space, and (c) reference HDR color space points represented in a reference HDR color space.

In block 406, the system executes a reshaping operation optimization algorithm to generate a chain of an optimized forward reshaping mapping and an optimized backward reshaping mapping. The reshaping operation optimization algorithm uses the reference SDR color space points, the input HDR color space points and the reference HDR color space points as input.

In an embodiment, the optimized forward reshaping mapping is used to forward reshape input HDR images in the input HDR color space into forward reshaped SDR images in a forward reshaped SDR color space; the optimized backward reshaping mapping is used to backward reshape the forward reshaped SDR images in the forward reshaped SDR color space into backward reshaped HDR images.

In an embodiment, the sampled HDR color space points are built in the HDR color space without using any image.

In an embodiment, a plurality of chains of optimized forward reshaping mappings and optimized backward reshaping mappings is generated by the reshaping operation optimization algorithm for the plurality of candidate values for the color primary scaling parameter; each chain in the plurality of chains of optimized forward reshaping mappings and optimized backward reshaping mappings includes a respective optimized forward reshaping mapping and a respective optimized backward reshaping mapping.

In an embodiment, the sampled HDR color space points are mapped to the reference SDR color space points based at least in part on a predefined HDR-to-SDR mapping.

In an embodiment, a plurality of sets of prediction errors are computed for the plurality of chains of optimized forward reshaping mappings and optimized backward reshaping mappings; each set of prediction errors in the plurality of sets of prediction errors is computed for a respective chain in the plurality of chains of optimized forward reshaping mappings and optimized backward reshaping mappings; the plurality of sets of prediction errors is used to select a specific candidate value from among the plurality of candidate values for the color primary scaling parameter.

In an embodiment, the specific candidate value for the color primary scaling parameter is used to generate a specific chain of a specific optimized forward reshaping mapping and a specific optimized backward reshaping mapping.

In an embodiment, the specific optimized forward reshaping mapping is represented in a forward reshaping three-dimensional lookup table.

In an embodiment, the specific optimized backward reshaping mapping is represented in a backward reshaping three-dimensional lookup table.

In an embodiment, a video encoder applies the optimized forward reshaping mapping to a sequence of input HDR images to generate a sequence of forward reshaped SDR images and encodes the sequence of forward reshaped SDR images into a video signal.

In an embodiment, a video decoder decodes a sequence of forward reshaped SDR images from a video signal and applies the optimized backward reshaping mapping to the sequence of forward reshaped SDR images to generate a sequence of backward reshaped HDR images.

In an embodiment, a sequence of display images derived from the sequence of backward reshaped HDR images is rendered on an image display operating with the video decoder.

In an embodiment, the HDR color space and the input HDR color space share a common white point.

In an embodiment, the reshaping operation optimization algorithm represents a Backward-Error-Subtraction-for-signal-Adjustment (BESA) algorithm.

FIG. 4B illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 422, a system as described herein builds sampled HDR color space points distributed throughout an HDR color space. The HDR color space is parameterized by a color primary scaling parameter with a candidate value selected from among a plurality of candidate values. The color primary scaling parameter is used to compute color space coordinates of at least one of multiple color primaries delineating the HDR color space.

In block 424, the system generates from the sampled HDR color space points in the HDR color space: (a) input SDR color space points represented in an input SDR color space and (b) reference HDR color space points represented in a reference HDR color space.

In block 426, the system executes a reshaping operation optimization algorithm to generate an optimized backward reshaping mapping. the reshaping operation optimization algorithm receives the input SDR color space points and the reference HDR color space points as input.

In an embodiment, the backward reshaping mapping is used to backward reshape SDR images in the input SDR color space into backward reshaped HDR images.

In an embodiment, the sampled HDR color space points are built in the HDR color space without any image.

In an embodiment, a plurality of optimized backward reshaping mappings is generated by the reshaping operation optimization algorithm for the plurality of candidate values for the color primary scaling parameter; each optimized backward reshaping mapping in the plurality of optimized backward reshaping mappings includes a respective optimized backward reshaping mapping.

In an embodiment, a plurality of sets of prediction errors are computed for the plurality of optimized backward reshaping mappings; each set of prediction errors in the plurality of sets of prediction errors is computed for a respective optimized backward reshaping mapping in the plurality of optimized backward reshaping mappings; the plurality of sets of prediction errors is used to select a specific candidate value from among the plurality of candidate values for the color primary scaling parameter.

In an embodiment, the sampled HDR color space points are processed by a programmable ISP pipeline to the input SDR color space points based at least in part on an optimized value for a programmable configuration parameter of the programmable ISP pipeline.

In an embodiment, the optimized value for the programmable configuration parameter of the programmable ISP pipeline is determined by minimizing approximation errors between ISP SDR images generated by the programmable ISP pipeline from HDR images and reference SDR images generated by applying a predefined HDR-to-SDR mapping to the same HDR images.

FIG. 4C illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 442, a system as described herein extracts a set of SDR image feature points from a training SDR image and extracting a set of HDR image feature points from a training HDR image.

In block 444, the system matches a subset of one or more SDR image feature points in the set of SDR image feature points with a subset of one or more HDR image feature points in the set of HDR image feature points.

In block 446, the system uses the subset of one or more SDR image feature points and the subset of one or more HDR image feature points to generate a geometric transform to spatially align a set of SDR pixels in the training SDR image with a set of HDR pixels in the training HDR image.

In block 448, the system determines a set of pairs of SDR and HDR color patches, from the set of SDR pixels in the training SDR image and the set of HDR pixels in the training HDR image after the training SDR and HDR images have been spatially aligned by the geometric transform.

In block 450, the system generates an optimized SDR-to-HDR mapping, based at least in part on the set of pairs of SDR and HDR color patches derived from the training SDR image and the training HDR image.

In block 452, the system applies the optimized SDR-to-HDR mapping to one or more non-training SDR images to generate one or more corresponding non-training HDR images.

In an embodiment, the training SDR image and the training HDR image are captured by a capturing device operating in SDR and HDR capture modes, respectively, from a three-dimensional (3D) visual scene.

In an embodiment, the training SDR image and the training HDR image form a pair of training SDR and HDR images in a plurality of pairs of training SDR and HDR images; the optimized SDR-to-HDR mapping is generated based at least in part on a plurality of sets of pairs of SDR and HDR color patches derived from the plurality of pairs of training SDR and HDR images.

In an embodiment, each SDR image feature point in the subset of one or more SDR image feature points is matched with a respective HDR image feature point in the subset of one or more HDR image feature points; the SDR image feature point and the HDR image feature point are extracted from the training SDR image and the HDR image, respectively, using a common feature point extraction algorithm.

In an embodiment, the common feature point extraction algorithm represents one of: a Binary-Robust-Invariant-Scalable-Keypoints algorithm; a Features-from-Accelerated-Segment-Test algorithm; a KAZE algorithm; a minimum eigenvalue algorithm; a maximally-stable-extremal-regions algorithm; an Oriented-FAST-and-Rotated algorithm; a scale-invariant-feature-transform algorithm; a Speeded-Up-Robust-Features algorithm; etc.

FIG. 4D illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 462, a system as described herein performs respective camera distortion correction operations on each training image in a pair of a training SDR image and a training HDR image to generate a respective undistorted image in a pair of an undistorted training SDR image and an undistorted training HDR image.

In block 464, the system generates a respective projective transform, in a pair of an SDR image projective transform and an HDR image projective transform, using corner pattern marks detected from each undistorted image in the pair of the undistorted training SDR image and the undistorted training HDR image.

In block 466, the system applies each projective transform in the pair of the SDR image projective transform and the HDR image projective transform to a respective undistorted image in the pair of the undistorted training SDR image and the undistorted training HDR image to generate a respective rectified image in a pair of a rectified training SDR image and a rectified training HDR image.

In block 468, the system extracts a set of SDR color patches from the rectified training SDR image and extracting a set of HDR color patches from the rectified training HDR image.

In block 470, the system generates an optimized SDR-to-HDR mapping, based at least in part on the set of SDR color patches and the set of HDR color patches derived from the training SDR image and the training HDR image.

In block 472, the system applies the optimized SDR-to-HDR mapping to one or more non-training SDR images to generate one or more corresponding non-training HDR images.

In an embodiment, the training SDR image and the training HDR image are captured by a first capturing device operating in an SDR capture mode and a second capturing device operating in an HDR capture mode, respectively, from a common color chart image.

In an embodiment, the common color chart image is selected from a plurality of color chart images each of which includes a distinct distribution of color patches arranged in a two-dimensional color chart.

In an embodiment, the distinct distribution of color patches is generated with random colors randomly selected from a common statistical distribution with a specific combination of statistical mean and variance values.

In an embodiment, the common color chart image is rendered on and captured by the first capturing device and the second capturing device from a screen of a common reference image display.

In an embodiment, the respective camera distortion correction operations are based at least in part on camera-specific distortion coefficients generated from a camera calibration process performed with a camera used to acquire the training image.

In an embodiment, the set of SDR color patches and the set of HDR color patches are used to derive a three-dimensional mapping table (3DMT); the optimized SDR-to-HDR mapping is generated based at least in part on the 3DMT.

In an embodiment, the optimized SDR-to-HDR mapping represents one of: TPB based mapping or a non-TPB-based mapping.

In an embodiment, the optimized SDR-to-HDR mapping is one of: a static mapping that is applied to all non-training SDR images represented in a video signal, or a dynamic mapping that is generated based at least in part on a specific value distribution of SDR codewords of a non-training SDR image among non-training SDR images represented in the video signal.

FIG. 4E illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 482, a system as described herein builds sampled HDR color space points distributed throughout an HDR color space used to represent reconstructed HDR images.

In block 484, the system converts the sampled HDR color space points into SDR color space points in a first SDR color space in which SDR images to be edited by an editing device are represented.

In block 486, the system determines a bounding SDR color space rectangle based on extreme SDR codeword values of the SDR color space points in the first SDR color space and determining an irregular 3D shape from a distribution of the SDR color space points.

In block 488, the system builds sampled SDR color space points distributed throughout the bounding SDR color space rectangle in the first SDR color space.

In block 490, the system uses the sampled SDR color space points and the irregular shape to generate a boundary clipping 3D-LUT. The boundary clipping 3D-LUT uses the sampled SDR color space points as lookup keys.

In block 492, the system performs clipping operations, based at least in part on the boundary clipping 3D-LUT, on an edited SDR image in the first SDR color space to generate a boundary clipped edited SDR image in the first SDR color space.

In an embodiment, the clipping operations includes first using the bounding SDR color space rectangle to perform regular clipping on the edited SDR image to generate a regularly clipped edited SDR image and subsequently using the 3D-LUT to perform irregular clipping on the regularly clipped edited SDR image to generate the boundary clipped edited SDR image.

In an embodiment, a set of one or more SDR pixels in the SDR image to be edited is edited from one or more first luminance values to one or more second luminance values in the edited image; the one or more second luminance values are different from the one or more first luminance values.

In an embodiment, a set of one or more SDR pixels in the SDR image to be edited is edited from one or more first chrominance values to one or more second chrominance values in the edited image; the one or more second chrominance values are different from the one or more first chrominance values.

In an embodiment, an image detail depicted in the SDR image to be edited is removed in the edited SDR image.

In an embodiment, an image detail not depicted in the SDR image to be edited is added in the edited SDR image.

In an embodiment, the 3D-LUT includes one or more nodes each of which includes a lookup key and a lookup value; the lookup key equals the lookup value; the lookup key is within the irregular shape.

In an embodiment, the 3D-LUT includes one or more nodes each of which includes a lookup key and a lookup value; the lookup key is outside the irregular shape whereas the lookup value is within the irregular shape.

In an embodiment, the lookup value is determined based on an index function that takes the irregular shape and the lookup key as input and returns a nearest neighbor to the lookup key as output.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the inventio comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
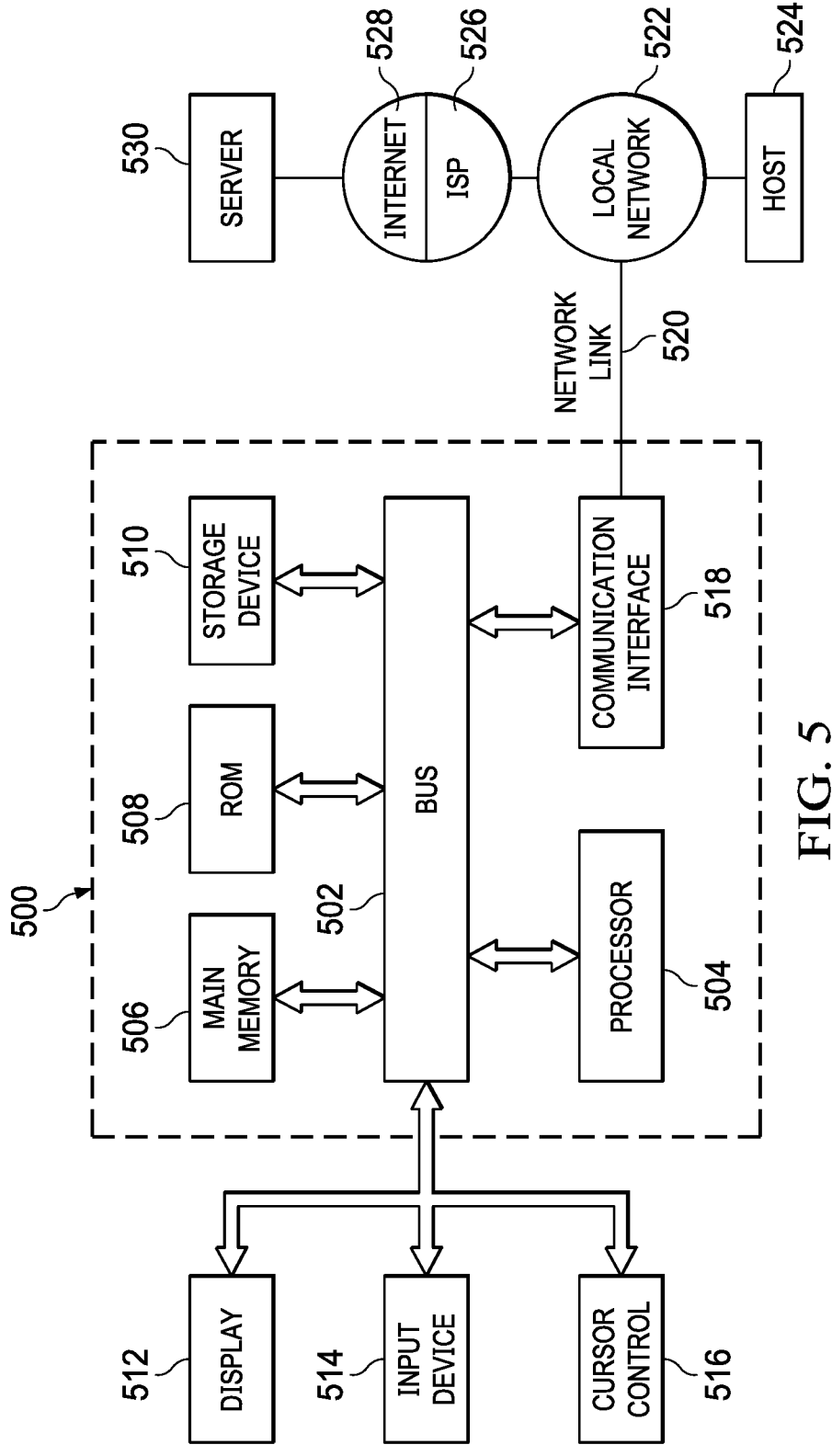
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS,
ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of embodiments of the present invention.

EEE1. A method comprising:

building sampled high dynamic range (HDR) color space points distributed throughout an HDR color space, wherein the HDR color space is parameterized by a color primary scaling parameter with a candidate value selected from among a plurality of candidate values, wherein the color primary scaling parameter is used to compute color space coordinates of at least one of multiple color primaries delineating the HDR color space;

generating from the sampled HDR color space points in the HDR color space: (a) reference standard dynamic range (SDR) color space points represented in a reference SDR color space, (b) input HDR color space points represented in an input HDR color space, and (c) reference HDR color space points represented in a reference HDR color space;

executing a reshaping operation optimization algorithm to generate a chain of an optimized forward reshaping mapping and an optimized backward reshaping mapping, wherein the reshaping operation optimization algorithm uses the reference SDR color space points, the input HDR color space points and the reference HDR color space points as input;

wherein the optimized forward reshaping mapping is used to forward reshape input HDR images in the input HDR color space into forward reshaped SDR images in a forward reshaped SDR color space; wherein the optimized backward reshaping mapping is used to backward reshape the forward reshaped SDR images in the forward reshaped SDR color space into backward reshaped HDR images.

EEE2. The method of EEE1, wherein the sampled HDR color space points are built in the HDR color space without using any image.

EEE3. The method of EEE1 or EEE2, wherein a plurality of chains of optimized forward reshaping mappings and optimized backward reshaping mappings is generated by the reshaping operation optimization algorithm for the plurality of candidate values for the color primary scaling parameter; wherein each chain in the plurality of chains of optimized forward reshaping mappings and optimized backward reshaping mappings includes a respective optimized forward reshaping mapping and a respective optimized backward reshaping mapping.

EEE4. The method of any of EEE1-EEE3, wherein the sampled HDR color space points are mapped to the reference SDR color space points based at least in part on a predefined HDR-to-SDR mapping.

EEE5. The method of any of EEE1-EEE4, wherein a plurality of sets of prediction errors are computed for the plurality of chains of optimized forward reshaping mappings and optimized backward reshaping mappings; wherein each set of prediction errors in the plurality of sets of prediction errors is computed for a respective chain in the plurality of chains of optimized forward reshaping mappings and optimized backward reshaping mappings; wherein the plurality of sets of prediction errors is used to select a specific candidate value from among the plurality of candidate values for the color primary scaling parameter.

EEE6. The method of EEE5, wherein the specific candidate value for the color primary scaling parameter is used to generate a specific chain of a specific optimized forward reshaping mapping and a specific optimized backward reshaping mapping.

EEE7. The method of EEE6, wherein the specific optimized forward reshaping mapping is represented in a forward reshaping three-dimensional lookup table.

EEE8. The method of EEE6 or EEE7, wherein the specific optimized backward reshaping mapping is represented in a backward reshaping three-dimensional lookup table.

EEE9. The method of any of EEE6-EEE8, wherein a video encoder applies the optimized forward reshaping mapping to a sequence of input HDR images to generate a sequence of forward reshaped SDR images and encodes the sequence of forward reshaped SDR images into a video signal.

EEE10. The method of any of EEE6-EEE9, wherein a video decoder decodes a sequence of forward reshaped SDR images from a video signal and applies the optimized backward reshaping mapping to the sequence of forward reshaped SDR images to generate a sequence of backward reshaped HDR images.

EEE11. The method of EEE10, wherein a sequence of display images derived from the sequence of backward reshaped HDR images is rendered on an image display operating with the video decoder.

EEE12. The method of any of EEE1-EEE10, wherein the HDR color space and the input HDR color space share a common white point.

EEE13. The method of any of EEE1-EEE10, wherein the reshaping operation optimization algorithm represents a Backward-Error-Subtraction-for-signal-Adjustment (BESA) algorithm with neutral color preservation.

EEE14. A method comprising:
building sampled high dynamic range (HDR) color space points distributed throughout an HDR color space, wherein the HDR color space is parameterized by a color primary scaling parameter with a candidate value selected from among a plurality of candidate values, wherein the color primary scaling parameter is used to compute color space coordinates of at least one of multiple color primaries delineating the HDR color space;
generating from the sampled HDR color space points in the HDR color space: (a) input standard dynamic range (SDR) color space points represented in an input SDR color space and (b) reference HDR color space points represented in a reference HDR color space;
executing a reshaping operation optimization algorithm to generate an optimized backward reshaping mapping, wherein the reshaping operation optimization algorithm receives the input SDR color space points and the reference HDR color space points as input;

wherein the optimized backward reshaping mapping is used to backward reshape SDR images in the input SDR color space into backward reshaped HDR images.

EEE15. The method of EEE14, wherein the sampled HDR color space points are built in the HDR color space without any image.

EEE16. The method of EEE14 or EEE15, wherein a plurality of optimized backward reshaping mappings is generated by the reshaping operation optimization algorithm for the plurality of candidate values for the color primary scaling parameter; wherein each optimized backward reshaping mapping in the plurality of optimized backward reshaping mappings includes a respective optimized backward reshaping mapping.

EEE17. The method of any of EEE14-EEE16, wherein a plurality of sets of prediction errors are computed for the plurality of optimized backward reshaping mappings; wherein each set of prediction errors in the plurality of sets of prediction errors is computed for a respective optimized backward reshaping mapping in the plurality of optimized backward reshaping mappings; wherein the plurality of sets of prediction errors is used to select a specific candidate value from among the plurality of candidate values for the color primary scaling parameter.

EEE18. The method of any of EEE14-EEE17, wherein the sampled HDR color space points are processed by a programmable image signal processor (ISP) pipeline to the input SDR color space points based at least in part on an optimized value for a programmable configuration parameter of the programmable ISP pipeline.

EEE19. The method of any of EEE14-EEE18, wherein the optimized value for the programmable configuration parameter of the programmable ISP pipeline is determined by minimizing approximation errors between ISP SDR images generated by the programmable ISP pipeline from HDR images and reference SDR images generated by applying a predefined HDR-to-SDR mapping to the same HDR images.

EEE20. The method of any of EEEs 1-19, wherein the distribution of sampled HDR color space points conforms to a predetermined pattern of the sample HDR color space points in the HDR color space.

EEE21. The method of any of EEEs 1-20, wherein at least one color primary of the multiple color primaries delineating the HDR color space corresponds to a linear combination of this color primary in (i) an SDR color space and (ii) an HDR color space, wherein at least one weight factor of the linear combination is based on the color primary scaling parameter.

EEE22. The method of any of EEEs 1-21, wherein the building, generating and executing operations are performed for each candidate value of the color primary scaling parameter from the plurality of candidate values.

EEE23. The method of EEE 22, wherein a specific candidate value from among the plurality of candidate values for the color primary scaling parameter is selected based a comparison of results of executing the reshaping operation optimization algorithm for each candidate value from the plurality of candidate values.

EEE24. The method of any of EEEs 1-23, wherein the reshaping operation optimization algorithm balances achieving a wide HDR color space of the backward reshaped HDR images on the one hand, and achieving low SDR color deviations on the other hand.

EEE25. The method of EEE5 or EEE17, wherein the specific candidate value from among the plurality of candidate values for the color primary scaling parameter is selected to achieve a balance between minimized prediction errors and minimized SDR color deviations.

EEE26. The method of EEE5 or EEE17, wherein the specific candidate value from among the plurality of candidate values for the color primary scaling parameter is selected to achieve minimized prediction errors with SDR color deviations below a predetermined threshold.

EEE27. The method of any of EEEs 1-26, wherein the optimized backward reshaping mapping is a tensor-product B-Spline (TPB) based mapping, and wherein the reshaping operation optimization algorithm generates at least one optimized TPB coefficient for this TPB mapping.

EEE28. A method comprising:

extracting a set of standard dynamic range (SDR) image feature points from a training SDR image and extracting a set of high dynamic range (HDR) image feature points from a training HDR image;

matching a subset of one or more SDR image feature points in the set of SDR image feature points with a subset of one or more HDR image feature points in the set of HDR image feature points;

using the subset of one or more SDR image feature points and the subset of one or more HDR image feature points to generate a geometric transform to spatially align a set of SDR pixels in the training SDR image with a set of HDR pixels in the training HDR image;

determining a set of pairs of SDR and HDR color patches, from the set of SDR pixels in the training SDR image and the set of HDR pixels in the training HDR image after the training SDR and HDR images have been spatially aligned by the geometric transform;

generating an optimized SDR-to-HDR mapping, based at least in part on the set of pairs of SDR and HDR color patches derived from the training SDR image and the training HDR image;

applying the optimized SDR-to-HDR mapping to one or more non-training SDR images to generate one or more corresponding non-training HDR images.

EEE29. The method of EEE28, wherein the training SDR image and the training HDR image are captured by a capturing device operating in SDR and HDR capture modes, respectively, from a three-dimensional (3D) visual scene.

EEE30. The method of EEE28 or EEE29, wherein the training SDR image and the training HDR image form a pair of training SDR and HDR images in a plurality of pairs of training SDR and HDR images; wherein the optimized SDR-to-HDR mapping is generated based at least in part on a plurality of sets of pairs of SDR and HDR color patches derived from the plurality of pairs of training SDR and HDR images.

EEE31. The method of any of EEE28-EEE30, wherein each SDR image feature point in the subset of one or more SDR image feature points is matched with a respective HDR image feature point in the subset of one or more HDR image feature points; wherein the SDR image feature point and the HDR image feature point are extracted from the training SDR image and the HDR image, respectively, using a common feature point extraction algorithm.

EEE32. The method of EEE31, wherein the common feature point extraction algorithm represents one of: a Binary-Robust-Invariant-Scalable-Keypoints algorithm; a Features-from-Accelerated-Segment-Test algorithm; a KAZE algorithm; a minimum eigenvalue algorithm; a maximally-stable-extremal-regions algorithm; an Oriented-FAST-and-Rotated algorithm; a scale-invariant-feature-transform algorithm; or a Speeded-Up-Robust-Features algorithm.

EEE33. A method comprising:

performing respective camera distortion correction operations on each training image in a pair of a training standard dynamic range (SDR) image and a training high dynamic range (HDR) image to generate a respective undistorted image in a pair of an undistorted training SDR image and an undistorted training HDR image;

generating a respective projective transform, in a pair of an SDR image projective transform and an HDR image projective transform, using corner pattern marks detected from each undistorted image in the pair of the undistorted training SDR image and the undistorted training HDR image;

applying each projective transform in the pair of the SDR image projective transform and the HDR image projective transform to a respective undistorted image in the pair of the undistorted training SDR image and the undistorted training HDR image to generate a respective rectified image in a pair of a rectified training SDR image and a rectified training HDR image;

extracting a set of SDR color patches from the rectified training SDR image and extracting a set of HDR color patches from the rectified training HDR image;

generating an optimized SDR-to-HDR mapping, based at least in part on the set of SDR color patches and the set of HDR color patches derived from the training SDR image and the training HDR image;

applying the optimized SDR-to-HDR mapping to one or more non-training SDR images to generate one or more corresponding non-training HDR images.

EEE34. The method of EEE33, wherein the training SDR image and the training HDR image are captured by a first capturing device operating in an SDR capture mode and a second capturing device operating in an HDR capture mode, respectively, from a common color chart image.

EEE35. The method of EEE34, wherein the common color chart image is selected from a plurality of color chart images each of which includes a distinct distribution of color patches arranged in a two-dimensional color chart.

EEE36. The method of EEE35, wherein the distinct distribution of color patches is generated with random colors randomly selected from a common statistical distribution with a specific combination of statistical mean and variance values.

EEE37. The method of any of EEE33-EEE36, wherein the common color chart image is rendered on and captured by the first capturing device and the second capturing device from a screen of a common reference image display.

EEE38. The method of any of EEE33-EEE37, wherein the respective camera distortion correction operations are based at least in part on camera-specific distortion coefficients generated from a camera calibration process performed with a camera used to acquire the training image.

EEE39. The method of any of EEE33-EEE38, wherein the set of SDR color patches and the set of HDR color patches are used to derive a three-dimensional mapping table (3DMT); wherein the optimized SDR-to-HDR mapping is generated based at least in part on the 3DMT.

EEE40. The method of any of EEE33-EEE39, wherein the optimized SDR-to-HDR mapping represents one of: tensor-product B-Spline (TPB) based mapping or a non-TPB-based mapping.

EEE41. The method of any of EEE33-EEE40, wherein the optimized SDR-to-HDR mapping is one of: a static mapping that is applied to all non-training SDR images represented in a video signal, or a dynamic mapping that is generated based at least in part on a specific value distribution of SDR codewords of a non-training SDR image among non-training SDR images represented in the video signal.

EEE42. A method comprising:

building sampled high dynamic range (HDR) color space points distributed throughout an HDR color space used to represent reconstructed HDR images;

converting the sampled HDR color space points into standard dynamic range (SDR) color space points in a first SDR color space in which SDR images to be edited by an editing device are represented;

determining a bounding SDR color space rectangle based on extreme SDR codeword values of the SDR color space points in the first SDR color space and determining an irregular three-dimensional (3D) shape from a distribution of the SDR color space points;

building sampled SDR color space points distributed throughout the bounding SDR color space rectangle in the first SDR color space;

using the sampled SDR color space points and the irregular shape to generate a boundary clipping 3D lookup table (3D-LUT), wherein the boundary clipping 3D-LUT uses the sampled SDR color space points as lookup keys;

performing clipping operations, based at least in part on the boundary clipping 3D-LUT, on an edited SDR image in the first SDR color space to generate a boundary clipped edited SDR image in the first SDR color space.

EEE43. The method of EEE42, wherein the clipping operations includes first using the bounding SDR color space rectangle to perform regular clipping on the edited SDR image to generate a regularly clipped edited SDR image and subsequently using the 3D-LUT to perform irregular clipping on the regularly clipped edited SDR image to generate the boundary clipped edited SDR image.

EEE44. The method of EEE42 or EEE43, wherein a set of one or more SDR pixels in the SDR image to be edited is edited from one or more first luminance values to one or more second luminance values in the edited image; wherein the one or more second luminance values are different from the one or more first luminance values.

EEE45. The method of any of EEE42-EEE44, wherein a set of one or more SDR pixels in the SDR image to be edited is edited from one or more first chrominance values to one or more second chrominance values in the edited image; wherein the one or more second chrominance values are different from the one or more first chrominance values.

EEE46. The method of any of EEE42-EEE45, wherein an image detail depicted in the SDR image to be edited is removed in the edited SDR image.

EEE47. The method of any of EEE42-EEE46, wherein an image detail not depicted in the SDR image to be edited is added in the edited SDR image.

EEE48. The method of any of EEE42-EEE47, wherein the 3D-LUT includes one or more nodes each of which includes a lookup key and a lookup value; wherein the lookup key equals the lookup value; wherein the lookup key is within the irregular shape.

EEE49. The method of any of EEE42-EEE48, wherein the 3D-LUT includes one or more nodes each of which includes a lookup key and a lookup value; wherein the lookup key is outside the irregular shape whereas the lookup value is within the irregular shape.

EEE50. The method of EEE49, wherein the lookup value is determined based on an index function that takes the irregular shape and the lookup key as input and returns a nearest neighbor to the lookup key as output.

EEE51. An apparatus comprising a processor and configured to perform any one of the methods recited in EEEs 1-50.

EEE52. A non-transitory computer-readable storage medium having stored thereon computer-executable instruction for executing a method with one or more processors in accordance with any of the methods recited in EEEs 1-50.

EEE53. A computer system configured to perform any one of the methods recited in EEEs 1-50.

The invention claimed is:

1. A method for tensor-product B-Spline (TPB) based image reshaping of high dynamic range (HDR) input images, the method comprising:

building sampled HDR color space points distributed throughout an HDR color space, wherein sampling the HDR color space points comprises sampling each color primary of the color space by a defined number of units to obtain a sampled data set of color patches representing a subset of the HDR color space, wherein the subset of the HDR color space is delineated as a triangle formed by the color primaries in a color coordinate system and is parameterized by a color primary scaling parameter with a candidate value iteratively selected from among a plurality of candidate values, the color primary scaling parameter serving as an input parameter for executing a reshaping operation optimization algorithm for TPB based image reshaping, wherein the color primary scaling parameter is indicative of the size of the subset of the HDR color space;

generating from the sampled HDR color space points in the HDR color space: (a) reference standard dynamic range (SDR) color space points represented in a reference SDR color space, (b) input HDR color space points represented in an input HDR color space, and (c) reference HDR color space points represented in a reference HDR color space; and executing the reshaping operation optimization algorithm to optimize, in a pipeline of chained reshaping functions comprising a forward reshaping mapping and a corresponding backward reshaping mapping, forward and backward TPB predictors, wherein the reshaping operation optimization algorithm uses the reference SDR color space points, the input HDR color space points and the reference HDR color space points as input to generate an optimized forward reshaping mapping and a corresponding optimized backward reshaping mapping based on a candidate value of the color primary scaling parameter that corresponds to the largest subset of the HDR color space that can achieve minimized HDR prediction errors, wherein the optimized forward reshaping mapping is used to forward reshape input HDR images in the input HDR color space into forward reshaped SDR images in a forward reshaped SDR color space, wherein the optimized backward reshaping mapping is used to backward reshape the forward reshaped SDR images in the forward reshaped SDR color space into backward reshaped HDR images.

2. The method of claim 1, wherein executing the reshaping operation optimization algorithm is iteratively processed to generate a plurality of forward reshaping mappings and corresponding backward reshaping mappings, each forward reshaping mapping and corresponding backward reshaping mapping corresponding to a respective candidate value of the plurality of candidate values for the color primary scaling parameter.

3. The method of claim 1, wherein the sampled HDR color space points are mapped to the reference SDR color space points based at least in part on a predefined HDR-to-SDR mapping.

4. The method of claim 1, wherein a set of prediction errors is computed for each forward reshaping mapping and the corresponding backward reshaping mapping; wherein the sets of prediction errors are used to select a specific candidate value from among the plurality of candidate values for the color primary scaling parameter.

5. The method of claim 1, wherein the HDR color space and the input HDR color space share a common white point.

6. The method of claim 1, wherein the reshaping operation optimization algorithm represents a Backward-Error-Subtraction-for-signal-Adjustment (BESA) algorithm with neutral color preservation.

7. An apparatus comprising a processor and configured to perform the method recited in claim 1.

8. A non-transitory computer-readable storage medium having stored thereon computer-executable instruction for executing a method with one or more processors in accordance with the method recited in claim 1.

9. A method for tensor-product B-Spline (TPB) based image reshaping of standard dynamic range (SDR) input images, the method comprising:

building sampled high dynamic range (HDR) color space points distributed throughout an HDR color space, wherein sampling the HDR color space points comprises sampling each color primary of the color space by a defined number of units to obtain a sampled data set of color patches representing a subset of the HDR color space, wherein the subset of the HDR color space is delineated as a triangle formed by the color primaries in a color coordinate system and is parameterized by a color primary scaling parameter with a candidate value iteratively selected from among a plurality of candidate values, the color primary scaling parameter serving as an input parameter for executing a reshaping operation optimization algorithm for TPB based image reshaping, wherein the color primary scaling parameter is indicative of the size of the subset of the HDR color space;

generating from the sampled HDR color space points in the HDR color space: (a) input standard dynamic range (SDR) color space points represented in an input SDR color space and (b) reference HDR color space points represented in a reference HDR color space;

executing the reshaping operation optimization algorithm to optimize a backward reshaping mapping, wherein the reshaping operation optimization algorithm receives the input SDR color space points and the reference HDR color space points as input to generate an optimized backward reshaping mapping based on a candidate value of the color primary scaling parameter that corresponds to the largest subset of the HDR color space that can achieve minimized HDR prediction errors;

wherein the optimized backward reshaping mapping is used to backward reshape SDR images in the input SDR color space into backward reshaped HDR images.

10. The method of claim 9, wherein executing the reshaping operation optimization algorithm is iteratively processed to generate a plurality of backward reshaping mappings, each backward reshaping mapping corresponding to a respective candidate value of the plurality of candidate values for the color primary scaling parameter.

11. The method of claim 9, wherein a set of prediction errors is computed each of backward reshaping mapping; wherein the sets of prediction errors are used to select a specific candidate value from among the plurality of candidate values for the color primary scaling parameter.

12. The method of claim 9, wherein the sampled HDR color space points are processed by a programmable image signal processor (ISP) pipeline to the input SDR color space points based at least in part on an optimized value for a programmable configuration parameter of the programmable ISP pipeline.

13. The method of claim 9, wherein the optimized value for the programmable configuration parameter of the programmable ISP pipeline is determined by minimizing approximation errors between ISP SDR images generated by the programmable ISP pipeline from HDR images and reference SDR images generated by applying a predefined HDR-to-SDR mapping to the same HDR images.

* * * * *